US012795605B2

(12) United States Patent
Wu

(10) Patent No.: US 12,795,605 B2
(45) Date of Patent: Nov. 10, 2026

(54) ENABLING PAGING SUBGROUPING FOR A USER DEVICE

(71) Applicant: GOOGLE LLC, Mountain View, CA (US)

(72) Inventor: Chih-Hsiang Wu, Taoyuan City (TW)

(73) Assignee: GOOGLE LLC, Mountain View, CA (US)

( * ) Notice: Subject to any disclaimer, the term of this patent is extended or adjusted under 35 U.S.C. 154(b) by 347 days.

(21) Appl. No.: 18/578,149

(22) PCT Filed: Jul. 13, 2022

(86) PCT No.: PCT/US2022/036900
§ 371 (c)(1),
(2) Date: Jan. 10, 2024

(87) PCT Pub. No.: WO2023/287846
PCT Pub. Date: Jan. 19, 2023

(65) Prior Publication Data
US 2024/0323914 A1 Sep. 26, 2024

Related U.S. Application Data

(60) Provisional application No. 63/221,186, filed on Jul. 13, 2021.

(51) Int. Cl.
*H04W 68/02* (2009.01)
*H04W 24/08* (2009.01)
*H04W 60/04* (2009.01)

(52) U.S. Cl.
CPC .......... *H04W 68/02* (2013.01); *H04W 24/08* (2013.01); *H04W 60/04* (2013.01)

(58) Field of Classification Search
CPC ... H04W 68/02; H04W 72/232; H04W 68/00; H04W 4/08; H04W 24/08; H04W 60/04
See application file for complete search history.

(56) References Cited

U.S. PATENT DOCUMENTS 10,880,802 B1 * 12/2020 Bakker .............. H04W 60/005
2014/0192720 A1 7/2014 Lee et al.
(Continued)

FOREIGN PATENT DOCUMENTS

WO WO-2018036455 A1 * 3/2018 ........... H04W 24/02
WO WO-2020/091643 A1 5/2020

OTHER PUBLICATIONS

"5G; NR; Medium Access Control (MAC) Protocol Specification," 3GPP TS 38.321 version 16.5.0 Release 16 (2021).
(Continued)

*Primary Examiner* — Mong-Thuy T Tran
(74) *Attorney, Agent, or Firm* — MARSHALL, GERSTEIN & BORUN LLP

(57) ABSTRACT

A radio access network (RAN), a core network (CN), and a user equipment (UE) can implement a method for managing paging subgrouping for the UE when the UE operates in an inactive or idle state. The method includes: transmitting and/or receiving a configuration for a paging subgroup, determining whether to use the configuration in paging and monitoring procedures, and monitoring or paging the UE in accordance with the determination. The method may further include transitioning between base stations for the UE and pausing any monitoring using the configuration for the paging subgroup during an emergency PDU session.

19 Claims, 28 Drawing Sheets

(56) References Cited

U.S. PATENT DOCUMENTS

| | | | | |
|---|---|---|---|---|
| 2018/0338277 | A1 | 11/2018 | Byun et al. | |
| 2019/0208500 | A1* | 7/2019 | Jia | H04W 72/23 |
| 2021/0014825 | A1 | 1/2021 | Shi et al. | |
| 2022/0046582 | A1* | 2/2022 | Shrivastava | H04W 52/0229 |
| 2022/0369411 | A1* | 11/2022 | Agiwal | H04L 5/0053 |
| 2023/0007622 | A1* | 1/2023 | He | H04W 68/10 |
| 2023/0015708 | A1* | 1/2023 | Gurumoorthy | H04W 68/025 |
| 2023/0093248 | A1* | 3/2023 | Kim | H04W 52/0216 455/458 |
| 2024/0031983 | A1* | 1/2024 | Ye | H04W 52/0219 |
| 2024/0147418 | A1* | 5/2024 | Fu | H04W 72/232 |
| 2024/0276378 | A1* | 8/2024 | Gurumoorthy | H04W 52/0216 |
| 2024/0284403 | A1* | 8/2024 | Agiwal | H04W 68/02 |

OTHER PUBLICATIONS

"5G; NR; Physical Layer Procedures for Control," 3GPP TS 38.213 version 16.6.0 Release 16 (2021).
"5G; NR; Radio Resource Control (RRC); Protocol Specification," 3GPP TS 38.331 version 16.5.0 Release 16 (2021).
"5G; NR-RAN; NG Application Protocol (NGAP)," 3GPP TS 38.413 version 16.6.0 Release 16 (2021).
"5G; NR-RAN; Xn Application Protocol (XnAP)," 3GPP TS 38.423 version 16.6.0 Release 16 (2021).
"LTE; Evolved Universal Terrestrial Radio Access Network (EUTRAN); S1 Application Protocol (S1AP)," 3GPP TS 36.413 version 16.6.0 Release 16 (2021).
"LTE; Evolved Universal Terrestrial Radio Access Network (E-UTRAN); X2 Application Protocol (X2AP)," 3GPP TS 36.423 version 16.6.0 Release 16 (2021).
Ericsson, "Minor Corrections," 3GPP TSG CT WG1 #130e (2021).
Office Action for Japanese Application No. 2024-501881, dated Jul. 1, 2025.
"3rd Generation Partnership Project; Technical Specification Group Radio Access Network; NR; Radio Resource Control (RRC) Protocol Specification (Release 16)," 3GPP Draft (Jul. 6, 2021).
"Digital Cellular Telecommunications System (Phase 2+); Mobile Radio Interface; Layer 3 Specification," 3GPP TS 04.08 V5.18.1 (Nov. 2000).
Intel Corporation,"[POST112-e] [064] [Pow17] Group Determination," 3GPP Draft (Jan. 15, 2021).
International Search Report and Written Opinion for Application No. PCT/US2022/036900, dated Mar. 1, 2023.
LG Electronics Inc., "UE Subgrouping for Paging Enhancement," 3GPP Draft (May 11, 2021).
Mediatek Inc., "Report of [AT114-e] [025] [ePowSav] Subgrouping Network Architecture," 3GPP Draft (May 25, 2021).
Qualcomm Inc., "UE Subgroup for Paging Reception," 3GP Draft (Apr. 2, 2021).

* cited by examiner

ENABLING PAGING SUBGROUPING FOR A USER DEVICE

FIELD OF THE DISCLOSURE

This disclosure relates generally to wireless communications and, more particularly, to paging a user equipment (UE) when the UE operates in an inactive or idle state associated with a protocol for controlling radio resources.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A user equipment (UE) can belong to a certain paging group. The 3rd Generation Partnership Project (3GPP) recently proposed certain paging enhancements to save power at the UE, such as dividing paging groups into subgroups and supporting paging for subgroups. Further paging enhancements include using a downlink control indicator (DCI) to indicate UE subgroup(s), with either same-slot or cross-slot scheduling; using a paging early indication (PEI) or a wake-up signal (WUS) to indicate UE subgroup(s); using multiple paging radio network temporary identifiers (P-RNTIs) for different subgroups; and using different time/frequency resources for different subgroups.

The UE can receive a paging request while in several states of the RRC sublayer. In particular, the RRC sublayer specifies the RRC_IDLE state, in which a UE does not have an active radio connection with a base station; the RRC_CONNECTED state, in which the UE has an active radio connection with the base station; and the RRC_INACTIVE state to allow a UE to more quickly transition back to the RRC_CONNECTED state due to Radio Access Network (RAN)-level base station coordination and RAN-paging procedures.

In some scenarios, a UE can operate in an idle or inactive state (e.g., RRC_IDLE or RRC_INACTIVE state) and subsequently transition to a connected state. Generally speaking, in the idle or inactive state, the radio connection between the UE and the radio access network (RAN) is suspended. When the UE is ready to send uplink data (e.g., for an outgoing phone call or upon browser launch) or receives a paging request from the base station, the UE can transition to the connected state. To carry out the transition, the UE can request that the base station establishes a radio connection (e.g., by sending an RRC Setup Request message to the base station) or resumes the suspended radio connection (e.g., by sending an RRC Resume Request message to the base station), so that the base station can configure the UE to operate in the connected state.

The Packet Data Convergence Protocol (PDCP) sublayer of the radio protocol stack provides services such as transfer of user-plane data, ciphering, integrity protection, etc. For example, the PDCP layer defined for the Evolved Universal Terrestrial Radio Access (EUTRA) radio interface and New Radio (NR) radio interface provides sequencing of protocol data units (PDUs) in the uplink direction (from a user device, also known as a user equipment (UE), to a base station) as well as in the downlink direction (from the base station to the UE). Further, the PDCP sublayer provides services for signaling radio bearers (SRBs) to the Radio Resource Control (RRC) sublayer. The PDCP sublayer also provides services for data radio bearers (DRBs) to a Service Data Adaptation Protocol (SDAP) sublayer or a protocol layer such as an Internet Protocol (IP) layer, an Ethernet protocol layer, and an Internet Control Message Protocol (ICMP) layer. Generally speaking, the UE and a base station can use SRBs to exchange RRC messages as well as non-access stratum (NAS) messages, and can use DRBs to transport data on a user plane.

In some scenarios, different capabilities of the UE and a base station with respect to paging subgrouping cause the UE to miss a paging request. Further, use of paging subgrouping today does not account for different PDU sessions the UE can establish prior to paging.

SUMMARY

A core network (CN) configures a certain paging subgroup for a UE, via a RAN which includes one or more base stations. Each base station may support one cell or multiple cells. The UE may camp on a cell of a base station that supports paging subgrouping for the cell. The base station can indicate to the UE, in a system information block or using a suitable RRC message, that the base station supports paging subgrouping for the cell, and the UE accordingly can monitor the paging DCI and/or PEI in accordance with the configuration for the paging subgroup (e.g., a paging subgroup configuration). Otherwise, when the base station does not indicate support of paging subgrouping for the cell, the UE monitors paging without using paging enhancement, i.e., using legacy techniques.

One example embodiment of these techniques is a method implemented in a user equipment (UE) operating in a cell of a radio access network (RAN). The method includes receiving, by processing hardware from the RAN, a configuration for a paging subgroup; determining, by the processing hardware, whether the UE should use the configuration to monitor paging in the cell, based at least on whether the cell supports paging subgrouping; and monitoring, by the processing hardware, paging in the cell in accordance with the determining.

Another example embodiment of these techniques is a method for managing paging subgrouping for a UE, implemented in a RAN. The method includes receiving, by processing hardware from a core network (CN), a configuration for a paging subgroup, for the UE; determining, by the processing hardware, that a cell in which the UE operates supports paging subgrouping; and in response to the determining, paging, by the processing hardware, the UE in accordance with the configuration.

Still another example embodiment of these techniques is a method for managing paging subgrouping for a UE, implemented in a CN. The method includes transmitting, by processing hardware to a UE via a RAN, a configuration for a paging subgroup; determining, by the processing hardware, whether a message addressed to a base station in the RAN and related to the UE, should include the configuration based at least in part on whether the base station supports paging subgrouping; and transmitting, by the processing hardware to the base station, the message.

DETAILED DESCRIPTION OF THE DRAWINGS

A UE, a base station, and/or a core network implement the techniques of this disclosure to utilize paging subgrouping when the UE and the base station support this functionality in the cell in which the UE currently operates. When the UE or the base station does not support paging subgrouping in the cell, the UE and the base station utilize paging that does not involve paging subgrouping, e.g., legacy paging.

Figure 1A:
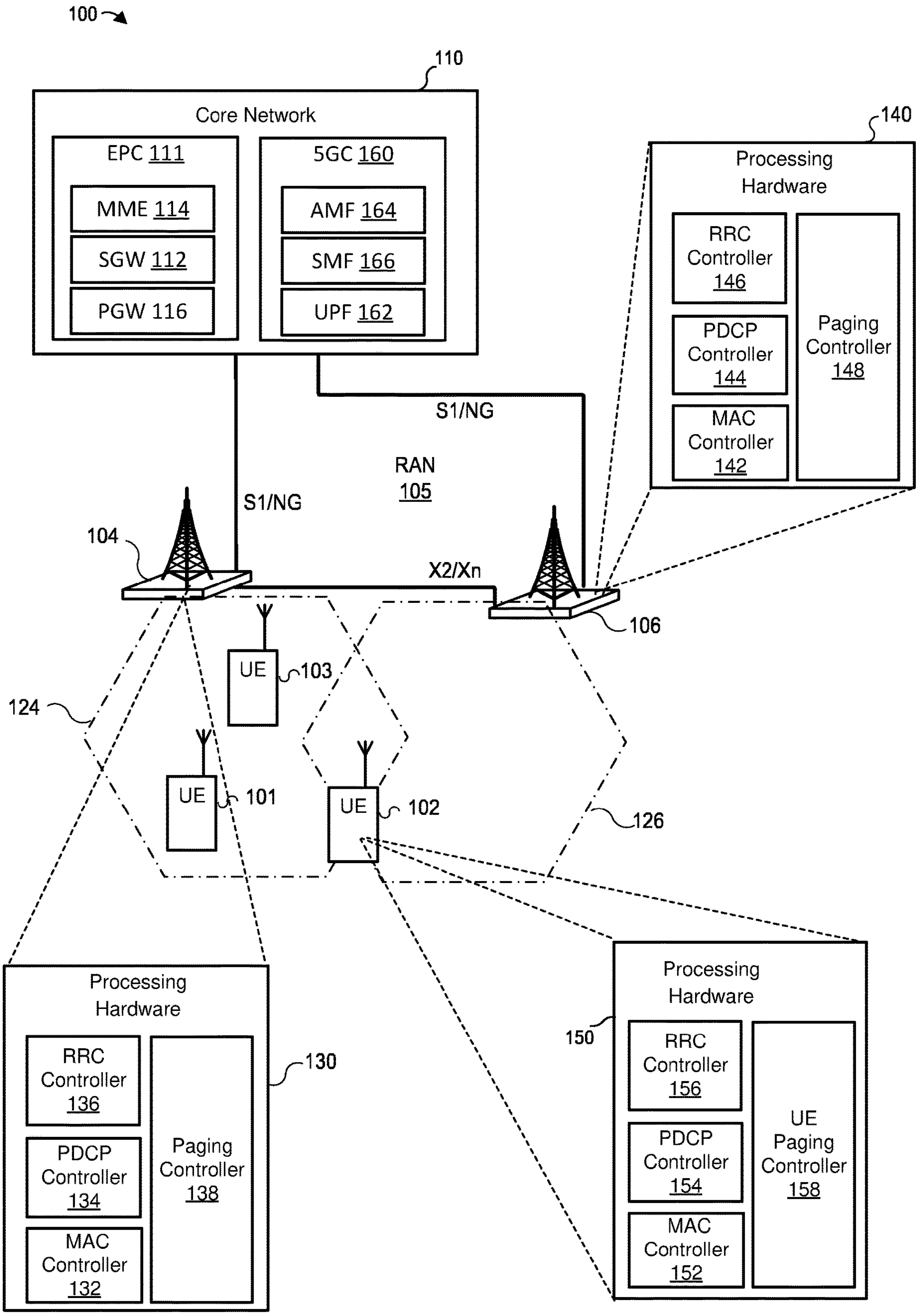
FIG. 1A is a block diagram of an example system in which a base station and/or a user equipment (UE) can implement the techniques of this disclosure for managing paging subgrouping between the UE and a radio access network (RAN)

In particular, referring first to FIG. 1A, an example wireless communication system 100 includes a UE 102, a base station (BS) 104, a base station 106, and a core network (CN) 110. The base stations 104 and 106 can operate in a RAN 105 connected to the core network (CN) 110. The CN 110 can be implemented as an evolved packet core (EPC) 111 or a fifth generation (5G) core (5GC) 160, for example.

The CN 110 can also be implemented as a sixth generation (6G) core in another example.

The base station 104 covers a cell 124, and the base station 106 covers a cell 126. If the base station 104 is a gNB, the cell 124 is an NR cell. If the base station 124 is an ng-eNB, the cell 124 is an evolved universal terrestrial radio access (E-UTRA) cell. Similarly, if the base station 106 is a gNB, the cell 126 is an NR cell, and if the base station 126 is an ng-eNB, the cell 126 is an E-UTRA cell. The cells 124 and 126 can be in the same Radio Access Network Notification Areas (RNA) or different RNAs. In general, the RAN 105 can include any number of base stations, and each of the base stations can cover one, two, three, or any other suitable number of cells. The UE 102 can support at least a 5G NR (or simply, "NR") or E-UTRA air interface to communicate with the base stations 104 and 106. Each of the base stations 104, 160 can connect to the CN 110 via an interface (e.g., S1 or NG interface). The base stations 104 and 106 also can be interconnected via an interface (e.g., X2 or Xn interface) for interconnecting NG RAN nodes.

Among other components, the EPC 111 can include a Serving Gateway (SGW) 112, a Mobility Management Entity (MME) 114, and a Packet Data Network Gateway (PGW) 116. The SGW 112 in general is configured to transfer user-plane packets related to audio calls, video calls, Internet traffic, etc., and the MME 114 is configured to manage authentication, registration, paging, and other related functions. The PGW 116 provides connectivity from the UE to one or more external packet data networks, e.g., an Internet network and/or an Internet Protocol (IP) Multimedia Subsystem (IMS) network. The 5GC 160 includes a User Plane Function (UPF) 162 and an Access and Mobility Management Function (AMF) 164, and/or Session Management Function (SMF) 166. Generally speaking, the UPF 162 is configured to transfer user-plane packets related to audio calls, video calls, Internet traffic, etc.; the AMF 164 is configured to manage authentication, registration, paging, and other related functions; and the SMF 166 is configured to manage PDU sessions.

As illustrated in FIG. 1, the base station 104 supports a cell 124, and the base station 106 supports a cell 126. The cells 124 and 126 can partially overlap, so that the UE 102 can select, reselect, or hand over from one of the cells 124 and 126 to the other. To directly exchange messages or information, the base station 104 and base station 106 can support an X2 or Xn interface. In general, the CN 110 can connect to any suitable number of base stations supporting NR cells and/or EUTRA cells.

The CN 110 may receive DL data for the UE 102. In cases in which the UE operates in an idle state (e.g., RRC_IDLE or CM-IDLE), the CN 110 determines to page the UE 102 to send the DL data to the UE 102. In response to the determination, the CN 110 can perform paging operations with the RAN 105 to page the UE 102 operating in the idle state. More specifically, the CN 110 can send a CN-to-BS paging message (e.g., an NG application protocol (NGAP) Paging message as defined in 3GPP specification 38.413 or an S1 application protocol (S1AP) Paging message as defined in 3GPP specification 36.413) to the RAN 105 to trigger the RAN 105 to send a UE paging message to the UE 102. The CN 110 includes a CN ID of the UE 102 in the NGAP paging message. For example, the CN ID can be an S-TMSI or 5G-S-TMSI. In response to the CN-to-BS paging message, the base station 104 of the RAN 105 generates a UE paging message (e.g., RRC paging message defined in 3GPP specification 38.331) including the CN ID and sends the UE paging message via the cell 124 to page the UE 102. In cases in which the base station 104 has additional cell(s), the base station 104 can also send the UE paging message via the additional cell(s) to page the UE 102. In response to or after receiving the UE paging message from the base station 104 (e.g., via the cell 124), the UE 102 in the idle state can perform an RRC connection establishment procedure with the base station 104 to establish an RRC connection (i.e., SRB1 and/or SRB2) with the base station 104 and send a Service Request message to the CN 110 via the base station 104 and the RRC connection (i.e., either the SRB1 or SRB2). After receiving the Service Request message, the CN 110 can send to the base station 104 a CN-to-BS message (e.g., PDU Session Resources Setup Request message, PDU Session Resources Modification Request message, or an Initial Context Setup Request message) to request the base station 104 to assign resources for the UE 102 to receive the DL data. The CN 110 can include a PDU Session ID and/or a Quality of Service (QOS) flow ID of the UE 102 in the CN-to-BS message to request the base station 104 to assign resources for a PDU Session and/or a QoS flow identified by the PDU Session ID and/or the QoS flow ID respectively. In response to or after receiving the CN-to-BS message, the base station 104 activates security protection for the UE 102 and performs setup for a DRB for the PDU Session and/or QoS flow. The base station 104 can transmit to the UE 102 a security mode command message to activate the security protection, and the UE 102 can transmit a security mode complete message to the base station 104 in response. The base station 104 can transmit to the UE 102 an RRC reconfiguration message configuring the DRB for the PDU Session and/or QoS flow, and the UE 102 can transmit an RRC reconfiguration complete message to the base station 104 in response.

In cases in which the UE 102 operates in an inactive state (e.g., RRC_INACTIVE state), the CN 110 sends the DL data, e.g., via an NG-U connection or interface, to the RAN 105 without sending a CN-to-BS paging message (e.g., an NGAP Paging message as defined in 3GPP specification 38.413 or an S1AP Paging message as defined in 3GPP specification 36.413) for the UE 102 to the RAN 105. After or in response to receiving the DL data, the base station 104 of the RAN 105 generates a UE paging message (e.g., RRC paging message defined in 3GPP specification 38.331) including a RAN ID of the UE 102 and sends the UE paging message via the cell 124 to page the UE 102. In cases in which the base station 104 has additional cell(s), the base station 104 can also send the UE paging message via the additional cell(s) to page the UE 102. For example, the RAN ID can be an inactive radio network temporary identifier (I-RNTI). In some scenarios and implementations, the base station 104 can send to the base station 106 a BS-to-BS paging message (e.g., a Xn Paging message as defined in 3GPP specification 38.423 or an X2 Paging message as defined in 3GPP specification 36.423) including the RAN ID to trigger the base station 106 to page the UE 102. In response to or in accordance with the BS-to-BS paging message, the base station 106 generates a UE paging message (e.g., RRC paging message defined in 3GPP specification 38.331) including the RAN ID and transmits the UE paging message via the cell 126. In cases in which the base station 106 has additional cell(s), the base station 106 can also send the UE paging message via the additional cell(s) to page the UE 102. In response to or after receiving a UE paging message from the base station 104, the UE 102 can perform an RRC connection resume procedure with the base station 104 to transition from the inactive state to a connected state (e.g., RRC_CONNECTED state). If the UE 102 is enabled by the RAN 105 for early data communication (also called small data transmission) and the UE paging message indicates the UE 102 is to perform early data communication (e.g., mobile terminating early data transmission (EDT)), the UE 102 in the inactive state performs early data communication with the base station 104 without a state transition. While in early data communication, the UE 102 can send an UL RRC message (e.g., RRC resume request message) including a message authentication code for integrity (MAC-I) to the base station 104 in response to the UE paging message. In the UL RRC message, the UE 102 can include an indication or cause a value to indicate the EDT to prevent the base station 104 from transitioning the UE 102 to the connected state. After receiving the UL RRC message, the base station 104 can send the DL data to the UE 102 operating in the inactive state.

The base station 104 is equipped with processing hardware 130 that can include one or more general-purpose processors (e.g., CPUs) and a non-transitory computer-readable memory storing instructions that the one or more general-purpose processors execute. Additionally or alternatively, the processing hardware 130 can include special-purpose processing units. The processing hardware 130 in an example implementation includes a Medium Access Control (MAC) controller 132 configured to perform a random access procedure with one or more user devices, receive uplink (UL) MAC protocol data units (PDUs) to one or more user devices, and transmit downlink (DL) MAC PDUs to one or more user devices. The processing hardware 130 can also include a Packet Data Convergence Protocol (PDCP) controller 134 configured to transmit PDCP PDUs in accordance with which the base station 104 can transmit data in the downlink direction, in some scenarios, and receive PDCP PDUs in accordance with which the base station 104 can receive data in the uplink direction, in other scenarios. The processing hardware further can include an RRC controller 136 to implement procedures and messaging at the RRC sublayer of the protocol communication stack. The processing hardware 130 in an example implementation includes a paging controller 138 configured to manage paging operations with one or more UEs operating in the RRC_INACTIVE or RRC_IDLE state. The base station 106 can include generally similar components. In particular, components 142, 144, 146, and 148 can be similar to the components 132, 134, 136, and 138, respectively.

The UE 102 is equipped with processing hardware 150 that can include one or more general-purpose processors such as CPUs and non-transitory computer-readable memory storing machine-readable instructions executable on the one or more general-purpose processors, and/or special-purpose processing units. The processing hardware 150 in an example implementation includes a paging controller 158 configured to manage paging operations when the UE 102 operates in the RRC_IDLE or RRC_INACTIVE states. The processing hardware 150 in an example implementation includes a Medium Access Control (MAC) controller 132 configured to perform a random access procedure with a base station, transmit uplink MAC protocol data units (PDUs) to the base station, and receive downlink MAC PDUs from the base station. The processing hardware 150 can also include a PDCP controller 154 configured to transmit PDCP PDUs in accordance with which the UE 102 can transmit data in the uplink direction, in some scenarios, and receive PDCP PDUs in accordance with which the UE 102 can receive data in the downlink direction, in other scenarios. The processing hardware further can include an RRC controller 156 to implement procedures and messaging at the RRC sublayer of the protocol communication stack.

Figure 1B:
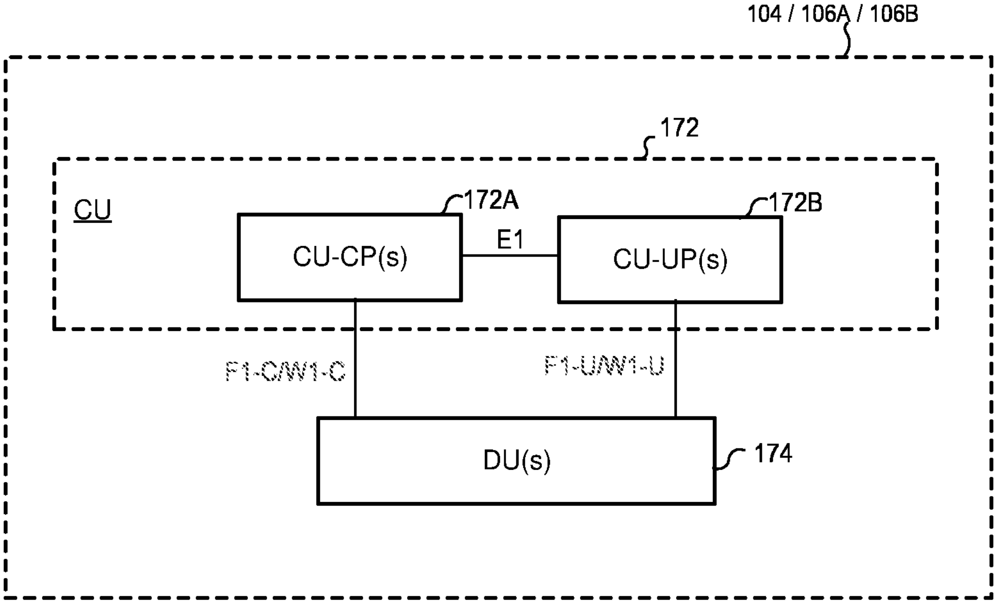
FIG. 1B is a block diagram of an example base station including a central unit (CU) and a distributed unit (DU) that can operate in the system of FIG. 1A.

FIG. 1B depicts an example distributed or disaggregated implementation of any one or more of the base stations 104, 106. In this implementation, the base station 104A, 104B, 106A, or 106B includes a central unit (CU) 172 and one or more DUs 174. The CU 172 includes processing hardware, such as one or more general-purpose processors (e.g., CPUs) and a computer-readable memory storing machine-readable instructions executable on the general-purpose processor(s), and/or special-purpose processing units. For example, the CU 172 can include a PDCP controller, an RRC controller and/or a paging controller such as PDCP controller 134, 144; RRC controller 136, 146; and/or paging controller 138, 148. In some implementations, the CU 172 can include a radio link control (RLC) controller configured to manage or control one or more RLC operations or procedures. In other implementations, the CU 172 does not include an RLC controller.

Each of the DUs 174 also includes processing hardware that can include one or more general-purpose processors (e.g., CPUs) and computer-readable memory storing machine-readable instructions executable on the one or more general-purpose processors, and/or special-purpose processing units. For example, the processing hardware can include a MAC controller (e.g., MAC controller 132, 142) configured to manage or control one or more MAC operations or procedures (e.g., a random access procedure), and/or an RLC controller configured to manage or control one or more RLC operations or procedures. The processing hardware can also include a physical layer controller configured to manage or control one or more physical layer operations or procedures.

In some implementations, the CU 172 can include a logical node CU-CP 172A that hosts the control plane part of the PDCP protocol of the CU 172. The CU 172 can also include logical node(s) CU-UP 172B that host the user plane part of the PDCP protocol and/or Service Data Adaptation Protocol (SDAP) protocol of the CU 172. The CU-CP 172A can transmit control information (e.g., RRC messages, F1 application protocol messages), and the CU-UP 172B can transmit the data packets (e.g., SDAP PDUs or Internet Protocol packets).

The CU-CP 172A can be connected to multiple CU-UP 172B through the E1 interface. The CU-CP 172A selects the appropriate CU-UP 172B for the requested services for the UE 102. In some implementations, a single CU-UP 172B can be connected to multiple CU-CP 172A through the E1 interface. If the CU-CP and DU(s) belong to a gNB, the CU-CP 172A can be connected to one or more DU 174*s* through an F1-C interface and/or an F1-U interface. If the CU-CP and DU(s) belong to a ng-eNB, the CU-CP 172A can be connected to one or more DU 174*s* through a W1-C interface and/or a W1-U interface. In some implementations, one DU 174 can be connected to multiple CU-UPs 172B under the control of the same CU-CP 172A. In such implementations, the connectivity between a CU-UP 172B and a DU 174 is established by the CU-CP 172A using Bearer Context Management functions.

Figure 2:
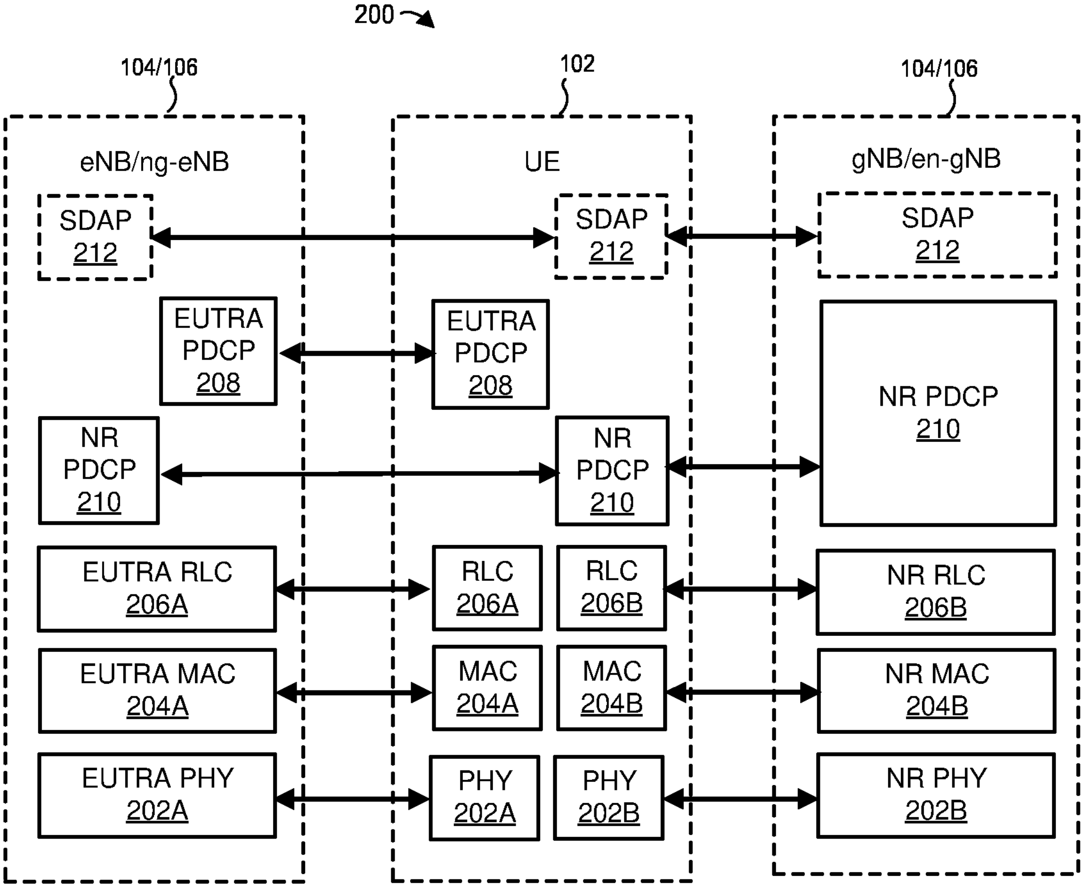
FIG. 2 is a block diagram of an example protocol stack according to which the UE of FIGS. 1A-B can communicate with base stations.

FIG. 2A illustrates, in a simplified manner, an example protocol stack 200 according to which the UE 102 can communicate with an eNB/ng-eNB or a gNB (e.g., one or more of the base stations 104, 106).

In the example stack 200, a physical layer (PHY) 202A of EUTRA provides transport channels to the EUTRA MAC sublayer 204A, which in turn provides logical channels to the EUTRA RLC sublayer 206A. The EUTRA RLC sublayer 206A in turn provides RLC channels to a EUTRA PDCP sublayer 208 and, in some cases, to an NR PDCP sublayer 210. Similarly, the NR PHY 202B provides transport channels to the NR MAC sublayer 204B, which in turn provides logical channels to the NR RLC sublayer 206B. The NR RLC sublayer 206B in turn provides data transfer services to the NR PDCP sublayer 210. The NR PDCP sublayer 210 in turn can provide data transfer services to Service Data Adaptation Protocol (SDAP) 212 or a radio resource control (RRC) sublayer (not shown in FIG. 2A). The UE 102, in some implementations, supports both the EUTRA and the NR stack, as shown in FIG. 2A, to support handover between EUTRA and NR base stations and/or to support DC over EUTRA and NR interfaces. Further, as illustrated in FIG. 2A, the UE 102 can support layering of NR PDCP 210 over EUTRA RLC 206A, and SDAP sublayer 212 over the NR PDCP sublayer 210.

The EUTRA PDCP sublayer 208 and the NR PDCP sublayer 210 receive packets (e.g., from an Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets."

On a control plane, the EUTRA PDCP sublayer 208 and the NR PDCP sublayer 210 can provide signaling radio bearers (SRBs) or an RRC sublayer (not shown in FIG. 2) to exchange RRC messages or non-access-stratum (NAS) messages, for example. On a user plane, the EUTRA PDCP sublayer 208 and the NR PDCP sublayer 210 can provide data radio bearers (DRBs) to support data exchange. Data exchanged on the NR PDCP sublayer 210 can be SDAP PDUs, Internet Protocol (IP) packets, or Ethernet packets.

Thus, it is possible to functionally split the radio protocol stack, as shown by the radio protocol stack 250 in FIG. 2B. The CU at any of the IAB-donors 108A, 108B, or 108C can hold all the control and upper layer functionalities (e.g., RRC 214, SDAP 212, NR PDCP 210), while the lower layer operations (e.g., NR RLC 206B, NR MAC 204B, and NR PHY 202B) are delegated to the DU located at the IAB-node 104. To support connection to a 5GC, NR PDCP 210 provides SRBs to RRC 214, and NR PDCP 210 provides DRBs to SDAP 212 and SRBs to RRC 214.

Figure 3:
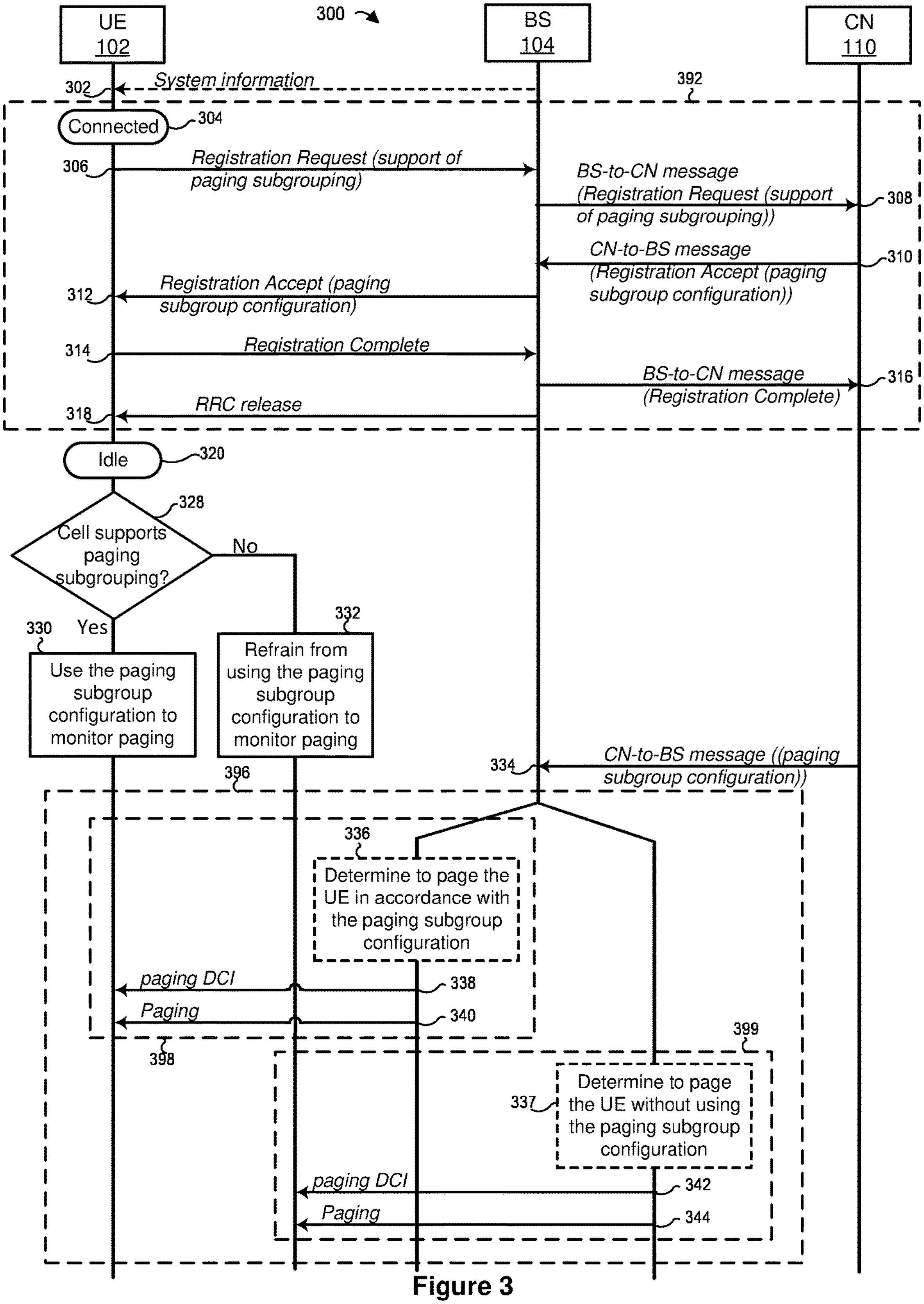
FIG. 3 illustrates an example scenario in which a UE determines whether to use a paging subgroup configuration from the RAN based on whether a cell of the base station supports paging subgrouping.

3-7D are message sequences of example scenarios in which a UE determines whether to monitor paging using a configuration for a paging subgroup. Generally speaking, events in FIGS. 3-7D that are similar are labeled with similar reference numbers (e.g., event 392 in FIG. 3 is similar to event 491/492 in FIGS. 4A-4B and event 592 in FIG. 5, events 394 in FIG. 3 is similar to event 494 in FIGS. 4A-4B, event 594 in FIG. 5, event 694 in FIGS. 6A-6C, and event 794 in FIGS. 7A-7D), with differences discussed below where appropriate. With the exception of the differences shown in the figures and discussed below, any of the alternative implementations discussed with respect to a particular event (e.g., for messaging and processing) may apply to events labeled with similar reference numbers in other figures.

Referring first to FIG. 3, in a scenario 300, the UE 102 initially operates 304 in a connected state (e.g., RRC_CONNECTED) via a cell 124 with the base station 104. The UE 102 may receive 302 system information (e.g., one or more system information blocks (SIBs)) on the cell 124 from the base station 104 before or after entering 304 the connected state. In some implementations, the UE 102 receives 302 a SIB including an indication of whether a certain cell supports paging subgrouping and/or other or additional paging enhancements.

While the UE 102 operates in the connected state, the UE 102 transmits 306 to the base station 104 a Registration Request message including information indicating support of paging subgrouping. In turn, the base station 104 sends 308 a BS-to-CN message including the Registration Request message) to a CN 110 (e.g., AMF 164 or MME 114). After the CN 110 receives the information indicating support of paging subgrouping, the CN 110 may determine to configure a first configuration for a paging subgroup (or simply "paging subgroup configuration") in response to, or in accordance with, the information. In some implementations, the first configuration for the paging subgroup includes a first paging subgroup ID which configures the UE 102 to belong to a first paging subgroup. In response to the determination, the CN 110 generates a Registration Accept message including the first configuration for the paging subgroup and sends 310 a first CN-to-BS message including a Registration Accept message to the base station 104. In turn, the base station 104 sends 312 the Registration Accept message to the UE 102. In response, the UE 102 may send 314 a Registration Complete message to the base station 104, which in turn sends 316 the Registration Complete message to the CN 110.

After a certain period of data inactivity for the UE 102, the base station 104 may determine that neither the base station 104 nor the UE 102 has transmitted any data in the downlink direction or the uplink direction, respectively, during the certain period. In response to the determination, the base station 104 sends 318 an RRC release message (e.g., RRCRelease message) to the UE 102. The UE 102 transitions to an idle state (e.g., RRC_IDLE state) in response to receiving the RRC release message and operates 320 in the idle state. In some implementations (not shown), the CN 110 sends to the base station 104 an additional CN-to-BS message to indicate the base station 104 to transition the UE 102 to an idle state (e.g., RRC_IDLE state). In such cases, the base station 104 transmits the RRC release message to the UE 102 in response to the additional CN-to-BS message. In some implementations, the UE 102 may receive 302 system information on the cell 124 after transitioning to the idle state.

The events 304, 306, 308, 310, 312, 314, 316 and 318 are collectively referred to in FIG. 3 as a registration procedure 392. In some implementations, other UE(s) (e.g., UE 101 and/or UE 103) may receive the system information on the cell 124, perform a registration procedure with the CN 110 via the base station 104, and enter the idle state respectively, similar to events 302, 392 and 320. For example, the CN 110 may send to the UE 101 the first configuration for the paging subgroup in the registration procedure with the UE 101. That is, the UE 101 and UE 102 belong to the same paging subgroup (i.e., a first paging subgroup) identified by the first paging subgroup ID. In another example, the CN 110 may send to the UE 103 a second configuration for a paging subgroup including a second paging subgroup ID in the registration procedure with the UE 103. In other words, the UE 103 belongs to a second paging subgroup, which is identified by the second paging subgroup ID and different from the first paging subgroup. Further, the CN 110 may send to the UE 101 a third paging subgroup configuration including a third paging subgroup ID in the registration procedure with the UE 101. That is, the UE 101 belongs to a third paging subgroup, which is identified by the third paging subgroup ID and different from the first and second paging subgroups. Alternatively, the CN 110 does not send the UE 101 a configuration for a paging subgroup in the registration procedure with the UE 101. In this case, the UE 101 does not belong to a paging subgroup.

In some implementations, the BS-to-CN message and the first CN-to-BS message are NG application protocol (NGAP) messages. For example, the BS-to-CN message is an Initial UE Message or an Uplink NAS Transport message. In another example, the first CN-to-BS message is an Initial Context Setup Request message or a Downlink NAS Transport message. In some implementations, the additional CN-to-BS message is an NGAP message. For example, the additional CN-to-BS message is a UE Context Release Command message.

After transitioning to the idle state from the connected state, the UE 102 in the idle state monitors paging. The UE 102 in the idle state determines 328 whether the cell 124 (or the base station 104) supports paging subgrouping. If the UE 102 in the idle state determines that the cell 124 (or the base station 104) supports paging subgrouping, the UE 102 uses 330 the first paging subgroup configuration to monitor paging.

In some implementations, the UE 102 receives 338 a first paging DCI and a cyclic redundancy check (CRC) of the first paging DCI on a physical downlink control channel (PDCCH) on the cell 124 irrespective of whether the cell 124 (or the base station 104) supports paging subgrouping. The UE 102 uses a P-RNTI to verify whether the CRC is valid. If the UE 102 verifies that the CRC is not valid, the UE 102 may discard the first paging DCI. If the cell 124 (or the base station 104) supports paging subgrouping (similar to FIGS. 8 and 9B below), and the UE 102 verifies that the CRC is valid, the UE 102 determines whether the first paging DCI indicates the first paging subgroup ID. If the first paging DCI indicates the first paging subgroup ID, the UE 102 attempts to receive a physical downlink shared channel (PDSCH) transmission in accordance with the first paging DCI. If the UE 102 receives the PDSCH transmission, the UE 102 decodes the PDSCH transmission to obtain 340 a Paging message. If the cell 124 (or the base station 104) supports paging subgrouping and the first paging DCI does not indicate the first paging subgroup ID, the UE 102 may refrain from receiving or attempting to receive a PDSCH transmission in accordance with the first paging DCI. Alternatively, if the first paging DCI does not indicate the first paging subgroup ID, the UE 102 may (attempt to) receive the PDSCH transmission in accordance with the first paging DCI and subsequently discard the PDSCH transmission.

In some implementations, if the cell 124 (or the base station 104) supports paging subgrouping, the base station 104 may include, in the first paging DCI, a subgroup field to indicate paging subgroup ID(s) to page UE(s) associated with the paging subgroup(s) (similar to FIGS. 8 and 9B below). For example, the base station 104 may indicate the first paging subgroup ID, the second paging subgroup ID, and/or the third paging subgroup ID in the first paging DCI. In some implementations, the first paging subgroup configuration can configure the P-RNTI (value) (i.e., subgroup-specific P-RNTI). Similarly, each of the second/third paging subgroup configurations may configure a particular P-RNTI (value) different from each other and the P-RNTI (value) in the first paging subgroup configuration. In other implementations, the UE 102 may determine or derive the P-RNTI (value) from the first paging subgroup ID. In cases where the UE 101 receives the first paging subgroup configuration, the UE 101 may determine or derive the same P-RNTI (value) as the UE 102. In cases where the UE 101 receives the third paging subgroup configuration, the UE 101 may determine or derive a second P-RNTI value from the second paging subgroup ID. Similarly, the UE 103 may determine or derive a third P-RNTI (value) from the second paging subgroup ID. The P-RNTI (value) of the UE 102, the second P-RNTI (value) and the third P-RNTI (value) are different. In other implementations, the P-RNTI (value) is predefined in a 3GPP specification (e.g., 3GPP specification 38.321) and UEs (e.g., the UE 101, UE 102 and UE 103) use the predefined P-RNTI (value) to receive paging DCIs.

In further implementations, the base station 104 may include an indication in the system information (see event 302) to indicate that the cell 124 (or the base station 104) supports paging subgrouping. If the cell 124 does not support paging subgrouping, the base station 104 does not include the indication in the system information. Thus, the UE 102 may determine the cell 124 (or the base station 104) supports paging subgrouping if the system information includes the indication. In other implementations, the base station 104 may include an indication in the RRC release message (see event 318) to indicate that the cell 124 (or the base station 104) supports paging subgrouping. If the cell 124 does not support paging subgrouping, the base station 104 does not include the indication in the RRC release message. Thus, the UE 102 may determine that the cell 124 (or the base station 104) supports paging subgrouping if the RRC release message includes the indication.

In other implementations, if the cell 124 (or the base station 104) supports paging subgrouping, the UE 102 attempts to receive or detect a PEI (not shown) before attempting to receive a paging DCI. In some implementations, the PEI may be associated with the first paging subgroup ID. In some implementations, the UE 102 may determine or derive (a sequence or a signal of) the PEI from the first paging subgroup ID. If the UE 102 receives or detects the PEI, the UE 102 may (attempt to) receive a second paging DCI, similar to event 338, and a CRC of the second paging DCI on a PDCCH on the cell 124. In some implementations, the second paging DCI including one or more paging subgroup IDs, similar to the first paging DCI. The UE 102 receives the second paging DCI similarly to receiving the first paging DCI as described above. In other implementations, the base station 104 may not include a subgroup field in the second paging DCI which is similar to the first paging DCI. The UE 102 uses the P-RNTI to verify whether the CRC is valid. If the UE 102 verifies that the CRC is valid, the UE 102 attempts to receive a PDSCH transmission in accordance with the second paging DCI. If the UE 102 receives the PDSCH transmission, the UE 102 decodes the PDSCH transmission to obtain a Paging message, similar to event 340. If the UE 102 verifies that the CRC is not valid, the UE 102 discards the second paging DCI. In some implementations, the PEI signal may be a wake-up signal (WUS) for paging.

In yet other implementations, if the cell 124 (or the base station 104) supports paging subgrouping, the UE 102 attempts to receive or detects the paging DCI or the PEI on a time and/or frequency resource specific to the first paging subgroup ID. The UE 102 determines the time and/or frequency resource in accordance with the first paging subgroup configuration. For example, the first paging subgroup configuration may include configuration parameters configuring time and/or frequency resources for the UE 102 to receive paging DCIs (including the first/second paging DCI) or the PEI. In another example, the UE 102 may derive the time and/or frequency resources to receive paging DCIs (including the first/second paging DCI) and/or the PEI from the first paging subgroup configuration. In some implementations, the time and/or frequency resources may be subgroup-specific paging occasions (POs) which are a subset of POs that the UE 102 monitors as described below. Similarly, if the UE 101 receives the first paging subgroup configuration, the UE 101 attempts to receive or detects the paging DCIs or the PEI on the time and/or frequency resources specific to the first paging subgroup ID. If the UE 101 receives the third paging subgroup configuration, the UE 101 attempts to receive or detects a paging DCI or a PEI on the time and/or frequency resource specific for the third paging subgroup ID. Similarly, the UE 103 attempts to receive or detects a paging DCI or a PEI on a time and/or frequency resource specific to the second paging subgroup ID.

Alternatively, the UE 102 attempts to receive or detect the first/second paging DCI or the PEI on a time and/or frequency resource (i.e., a PO) which is non-subgroup specific. The UE monitors the PO per DRX cycle. A PO is a set of PDCCH monitoring occasions and may consist of multiple time slots (e.g., subframe or OFDM symbol) where paging DCI is sent (3GPP specification 38.213). One Paging Frame (PF) is one Radio Frame and may contain one or more PO(s) or starting point of a PO. In some implementations, the UE 102 may determine paging occasion(s) (PO(s)) and paging frame(s) (PF(s)) in accordance with the following formula.

Then, the UE 102 determines the subgroup-specific PO. The base station 104 may also determine the PO(s) and PF(s) in accordance with the following formula.

SFN for the PF is determined by:

$$(SFN+PF\_\text{offset})\bmod T=(T\text{ div }N)*(UE\_ID\bmod N)$$

Index (i_s), indicating the index of the PO is determined by:

$$i\_s=\text{floor}(UE\_ID/N)\bmod Ns$$

The PDCCH monitoring occasions for paging are determined according to pagingSearchSpace as specified in 3GPP specification 38.213 and firstPDCCH-MonitoringOccasionOfPO and nrofPDCCH-MonitoringOccasionPerSSB-InPO if configured as specified in 3GPP specification 38.331. When SearchSpaceid=0 is configured for paging-SearchSpace, the PDCCH monitoring occasions for paging are the same as for RMSI as defined in clause 13 in 3GPP specification 38.213.

When SearchSpaceid=0 is configured for paging-SearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceid other than 0 is configured for pagingSearchSpace, the UE monitors the $(i\_s+1)^{th}$ PO. A PO is a set of 'S*X' consecutive PDCCH monitoring occasions where 'S' is the number of actual transmitted SSBs determined according to ssb-PositionsInBurst in SIB1 and X is the nrofPDCCH-MonitoringOccasionPerSSB-InPO if configured or is equal to 1 otherwise. The $[x*S+K]^{th}$ PDCCH monitoring occasion for paging in the PO corresponds to the $K^{th}$ transmitted SSB, where x=0, 1, . . . , X−1, K=1, 2, . . . , S. The PDCCH monitoring occasions for paging which do not overlap with UL symbols (determined according to tdd-UL-DL-ConfigurationCommon) are sequentially numbered from zero starting from the first PDCCH monitoring occasion for paging in the PF. When firstPDCCH-MonitoringOccasionOfPO is present, the starting PDCCH monitoring occasion number of $(i\_s+1)^{th}$ PO is the $(i\_s+1)^{th}$ value of the firstPDCCH-MonitoringOccasionOfPO parameter; otherwise, it is equal to i_s*S*X. If X>1, when the UE detects a PDCCH transmission addressed to P-RNTI within its PO, the UE is not required to monitor the subsequent PDCCH monitoring occasions for this PO.

In some implementations, a PO associated with a PF may start in the PF or after the PF. In some implementations, the PDCCH monitoring occasions for a PO may span multiple radio frames. When a SearchSpaceid other than 0 is configured for paging-SearchSpace the PDCCH monitoring occasions for a PO may span multiple periods of the paging search space.

The following parameters are used for the calculation of PF and i_s above: (i) T refers to the DRX cycle of the UE (T is determined by the shortest of the UE-specific DRX value(s), if configured by RRC and/or upper layers, and a default DRX value broadcast in system information. In the RRC_IDLE state, if the UE-specific DRX is not configured by upper layers, the default value is applied); (ii) N refers to the number of total paging frames in T; (iii) Ns refers to the number of paging occasions for a PF; (iv) PF_offset refers to the offset used for PF determination; and (v) UE_ID refers to 5G-S-TMSI (e.g., 5G-S-TMSI of the UE 102) mod 1024.

Parameters Ns, nAndPagingFrameOffset, nrofPDCCH-MonitoringOccasionPerSSB-InPO, and the length of default DRX Cycle are signaled in SIB1. The values of N and PF_offset are derived from the parameter nAndPaging-FrameOffset as defined in 3GPP specification 38.331. The parameter first-PDCCH-MonitoringOccasionOfPO is signaled in SIB1 for paging in initial downlink bandwidth part (BWP). For paging in a downlink BWP other than the initial downlink BWP, the parameter first-PDCCH-MonitoringOccasionOfPO is signaled in the corresponding BWP configuration.

If the UE 102 determines that the cell 124 does not support paging subgrouping, the UE 102 refrains 332 from using the first paging subgroup configuration to monitor paging and monitors paging using techniques that do not involve paging subgrouping. In some implementations, the UE 102 may monitor POs on cell 124 in accordance with the formula described above. In some scenarios or implementations, the UE 102 may receive 342 a third paging DCI and a CRC of the third paging DCI on a PDCCH on a PO on cell 124. The UE 102 uses a P-RNTI to verify whether the CRC is valid. The third paging DCI does not include a subgroup field. If the UE 102 verifies the CRC is valid, the UE 102 attempts to receive a PDSCH transmission in accordance with the third paging DCI. If the UE 102 receives the PDSCH transmission, the UE 102 decodes the PDSCH transmission to obtain 344 a Paging message.

At a later time, the CN 110 determines to page the UE 102, e.g., for a mobile terminating call or to transmit DL data to the UE 102. In response to the determination, the CN 110 sends 334 to the base station 104 a second CN-to-BS message including the first configuration for the paging subgroup. In the second CN-to-BS message, the CN 110 in some implementations includes a NAS ID of the UE 102, one or more capabilities of the UE 102 for paging, and/or paging assistance information, for paging the UE 102. In some implementations, the NAS ID may be a S-TMSI or a 5G-S-TMSI. In one implementation, the CN 110 includes the NAS ID in the Registration Accept message 310. In another implementation, the CN 110 may send a DL NAS message including the NAS ID to the UE 102 via the RAN 105 before the registration procedure 392.

In some implementations, a UE paging capability IE (e.g., a UERadioPagingInformation IE) includes the one or more capabilities for paging, and the CN 110 includes the UE paging capability IE in the second CN-to-BS message. In some implementations, a UE full capability IE (e.g., UE-NR-Capability IE) of the UE 102 includes the one or more capabilities. The UE full capability IE includes other capabilities, in addition to the one or more capabilities in the UE paging capability IE. In some implementations, the CN 110 may receive the UE paging capability IE and/or the UE full capability IE from the RAN 105 (e.g., the base station 104 or base station 106). In other implementations, the CN 110 may pre-store the UE full capability IE. In such implementations, the CN 110 either pre-stores the UE paging capability IE or dynamically generates the UE paging capability IE from the UE full capability IE. In some implementations, the CN 110 may associate a capability ID with the UE full capability IE and/or the UE paging capability.

In some implementations, the one or more capabilities include a frequency band list for paging (e.g., supportedBandListNRForPaging field) including frequency band(s) supported by the UE 102. In some implementations, the UE full capability IE includes a full frequency band list (e.g., supportedBandListNR field) including full frequency bands supported by the UE 102. In some implementations, the UE 102 may pre-determine or pre-configure the full frequency bands in accordance with a public land mobile network (PLMN) ID. The PLMN ID can be a PLMN ID of a serving cell (e.g., the cell 124) or a Home PLMN ID of a Universal Subscriber Identity Module (USIM) in the UE 102. In other implementations, the UE 102 may pre-determine or pre-configure the full frequency bands in accordance with hardware capability of the UE 102. The RAN 105 or the CN 110 generates the frequency band list for paging from the full frequency band list. In some implementations, the RAN 105 or the CN 110 may include a subset of the full frequency bands in the frequency band list for paging. For example, the RAN 105 or the CN 110 may select frequency band(s) supported by the RAN 105 from the full frequency bands. In other implementations, the RAN 105 or the CN 110 may include the full frequency bands in the frequency band list for paging.

In other implementations, the one or more capabilities include one or more downlink scheduling slot offset capabilities (e.g., dl-SchedulingOffset-PDSCH-TypeA-FDD-FRI-r15, dl-SchedulingOffset-PDSCH-TypeA-TDD-FRI-r15, dl-SchedulingOffset-PDSCH-TypeB-FDD-FRI-r15 and/or dl-SchedulingOffset-PDSCH-TypeB-FDD-FRI-r15) to indicate that the UE 102 supports cross-slot scheduling. In yet other implementations, the one or more capabilities include a single capability field/IE to indicate support of a PEI signal while the UE 102 operates in the idle state or an inactive state (e.g., RRC_INACTIVE). Alternatively, the one or more capabilities include a first capability field/IE and a second capability field/IE to indicate support of a PEI signal while the UE 102 operates in the idle state and support of a PEI signal while the UE 102 operates in the inactive state, respectively.

In some implementations, the paging assistance information includes a paging discontinuous reception (DRX) configuration, paging priority, paging origin, and/or a tracking area identity (TAI) list for paging. The paging DRX information includes a paging DRX cycle value. The paging DRX configuration may be paging discontinuous reception (DRX) information (e.g., Paging DRX IE) or paging extended DRX (eDRX) information (e.g., Paging eDRX Information IE). In some implementations, the paging eDRX information includes a paging eDRX cycle value and/or a paging time window value.

In some implementations, the second CN-to-BS message is a NGAP Paging message described in 3GPP specification 38.413. In some implementations, the CN 110 includes the paging DRX information or the paging eDRX information in one of the Registration Accept message 310 or in the DL NAS message.

In response to or after receiving the second CN-to-BS message, the base station 104 may determine 336 to page the UE 102 in accordance with the first paging subgroup configuration in cases where the cell 124 (or the base station 104) supports paging subgrouping. In response to the determination, the base station 104 transmits the PEI and/or transmit 338 the first/second paging DCI and the CRC of the first/second paging DCI on the PDCCH as described above. After transmitting the first/second paging DCI, the base station 104 transmits 340 the Paging message that the UE 102 receives as described above.

In response to or after receiving the second CN-to-BS message, the base station 104 may determine 337 to page the UE 102 without using the first paging subgroup configuration in cases where the cell 124 (or the base station 104) does not support paging subgrouping. In response to the determination, the base station 104 transmits 342 the third paging DCI and the CRC of the third paging DCI on the PDCCH as described above. After transmitting the third paging DCI, the base station 104 transmits 344 the Paging message that the UE 102 receives as described above.

In some implementations, the UE 102 indicates, in the UE full capability IE, support of a paging DCI indicating a paging subgroup (e.g., support of a paging DCI including a subgroup field). In some implementations, the CN 110 includes the support indication in the paging capability IE. In such implementations, the base station 104 may indicate the first paging subgroup in a paging DCI (e.g., the first/second paging DCI as described above) in accordance with the support indication. If the base station 104 does not receive the support indication, the base station 104 may not indicate the first paging subgroup ID in the first paging DCI.

In some implementations the UE 102 indicates support of a PEI in the UE full capability IE. In some implementations, the CN 110 includes the support indication in the paging capability IE. In such implementations, the base station 104 may transmit a PEI corresponding to the first paging subgroup ID in accordance with the support indication, as described above. If the base station 104 does not receive the support indication, the base station 104 does not transmit a PEI for the UE 102.

In some implementations, the UE 102 indicates support of a subgroup-specific P-RNTI in the UE full capability IE. In some implementations, the CN 110 includes the support indication in the paging capability IE. In such implementations, the base station 104 may generate a paging DCI (e.g., the first/second paging DCI described above) and a CRC of the paging DCI, scramble the CRC with the subgroup-specific P-RNTI, and transmit the paging DCI and the CRC on a PDCCH, as described above.

The events 336, 337, 338, 340, 342, 344 are collectively referred to in FIG. 3 as an enhanced or legacy paging procedure 396. The events 336, 338 and 340 are collectively referred to in FIG. 3 as an enhanced paging procedure 398 and the events 337, 342, 344 are collectively referred to in FIG. 3 as a legacy paging procedure 399.

When the UE 102 receives 340, 344 the Paging message via the cell 124, the UE 102 verifies that the NAS ID addresses the UE 102. In response to the identification, the UE 102 may initiate a paging response procedure (e.g., service request procedure) to respond to the Paging message. In response to the initiation, the UE 102 performs (not shown) an RRC connection establishment procedure with the base station 104 via the cell 124. To perform the RRC connection establishment procedure, the UE 102 sends an RRC request message (e.g., RRCConnectionRequest or RRCSetupRequest message) to the base station 104 via the cell 124. In response, the base station 104 may transmit an RRC response message (e.g., RRCConnectionSetup or RRCSetup message) to the UE 102 via the cell 124. The UE 102 may transmit an RRC complete message (e.g., RRC-ConnectionSetupComplete or RRCSetupComplete message) to the base station 104 via the cell 124. The UE 102 transitions to a connected state (e.g., RRC_CONNECTED state) in response to the RRC response message. After the UE 102 transitions to the connected state, the base station 104 may perform a security mode procedure with the UE 102 via the cell 124 to activate security (e.g., integrity protection and/or encryption) for data communication between the UE 102 and base station 104. After activating the security, the base station 104 may perform at least one RRC reconfiguration procedure with the UE 102 via the cell 124 to configure a signaling radio bearer (SRB) and/or a data radio bearer (DRB). Then, the UE 102 may communicate (e.g., transmit and/or receive) data with the CN 110 via the base station 104. The data may include user-plane data packets (e.g., IP packets) and/or control-plane messages (e.g., NAS messages). In some implementations, the UE 102 communicates the user-plane data packets on the DRB with the base station 104, where the base station 104 communicates the user-plane data packets to the CN 110. In other implementations, the UE 102 communicates control-plane messages on the SRB with the base station 104, where the base station 104 communicates the control-plane messages to the CN 110.

Figure 4A:
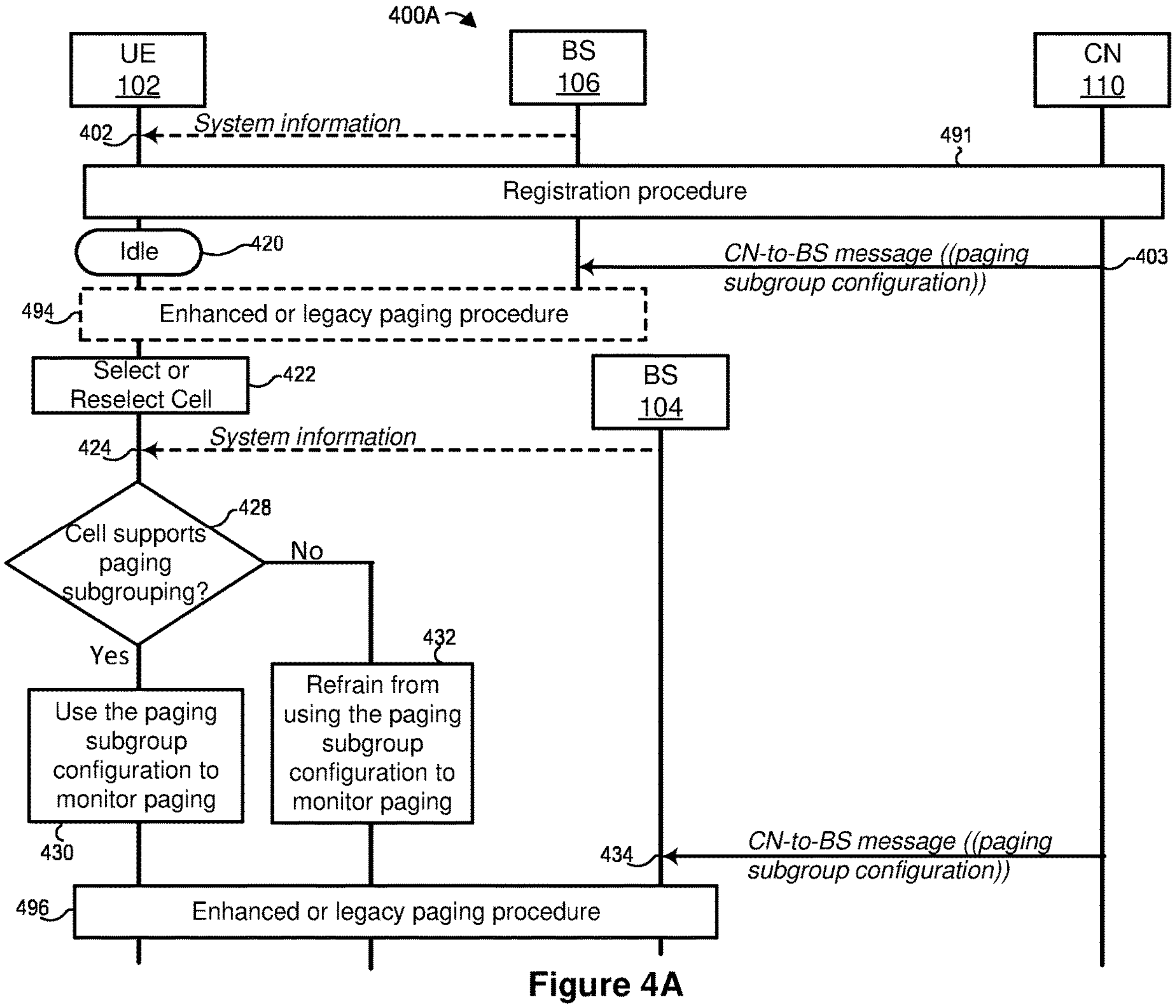
FIG. 4A illustrates a scenario in which a UE selects (or reselects) a new cell of a second base station of the RAN and determines whether the new cell belongs to the same RAN notification area as a cell in which a base station supports paging subgrouping.

Referring now to FIG. 4A, the UE 102 in a scenario 400A determines whether to use a paging subgroup configuration when operating in a cell of the base station 106 (e.g., cell 126), before the UE 102 selects (or reselects) a cell of the base station 104 (e.g., cell 124). The UE 102 then determines whether the base station 104 supports paging subgrouping in the cell 124 based on the relationship between the cells 124 and 126, e.g., based on whether these cells belong to the tracking area.

The UE 102 initially performs a registration procedure 491 with the base station 106 and the core network 110. The registration procedure 491 may be similar or identical to registration procedure 392 of FIG. 3. Similar to FIG. 3, the UE 102 may initially operate in a connected state (e.g., RRC_CONNECTED) in a cell 126 of the base station 106. In some implementations, the UE 102 receives 402 system information in the cell 126 from the base station 106 before or after entering the connected state.

After performing the registration procedure 491, the UE 102 may operate 420 in an idle state (e.g., RRC_IDLE). In some implementations, the UE 102 and the base station 106 performs an enhanced or legacy paging procedure 494 in response to receiving 403 a CN-to-BS message from the CN 110, for example. Depending on the implementation, the enhanced or legacy paging procedure 494 is similar to the paging procedure 396 of FIG. 3. More specifically, the enhanced paging procedure is similar to the paging procedure 398, and the legacy paging procedure is similar to the paging procedure 399.

The UE 102 then selects (or reselects) 422 a cell 124 of a base station 104. The UE may receive 424 system information on the cell 124 from the base station 104, similar to event 302.

The UE 102 determines 428 whether to use 430, or refrain 432 from using, a configuration for a paging subgroup to monitor paging. In some implementations, the UE 102 makes the determination based on whether the cell 124 belongs to the same tracking area as the cell 126. The UE 102 can determine that the cells 124 and 126 belong to the same tracking area from the system information 402 and 424. The UE 102 can determine that the cell 124 supports paging subgrouping upon determining that the cells 124 and 126 are in the same tracking area. Thus, the UE 102 in this case determines 428 whether the same MME or AMF controls the cells 124 and 126 and accordingly uses (or does not use) enhanced paging techniques in all controlled cells. In other implementations, the UE 102 makes 428 the determination based on the system information that the UE 102 received at event 424, similar to event 328.

In some implementations, the base station 106 performs an enhanced or legacy paging procedure 494 with the UE 102 in response to receiving a downlink data packet from the CN 110 instead of the CN-to-BS message, such as in cases where the UE 102 operates in the idle state with a suspended RRC connection. The downlink data packet can be a user-plane data packet. In some implementations, the UE 102 makes the determination based on whether the cell 124 belongs to the same RAN notification area (RNA) as the cell 126. The UE 102 can determine that the cell 124 supports paging subgrouping upon determining that the cells 124 and 126 are in the same RNA. Thus, the UE 102 in this case determines 428 whether the same MME or AMF controls the cells 124 and 126 and accordingly uses enhanced paging techniques in all cells. In some implementations, the base station 104 can receive from the CN 110 (e.g., UPF 162) a tunnel packet including the downlink data packet and a tunnel endpoint ID (TEID) that the base station 104 allocated for the UE 102. The base station 104 can identify that the downlink data packet addresses the UE 102 from the TEID and determine to page the UE 102 in response to the identification.

If the UE 102 determines 428 that the cell 124 does not support paging subgrouping, then the UE 102 refrains 432 from using the configuration for the paging subgroup to monitor paging. If the UE 102 determines that the cell 124 supports 428 paging subgrouping, then the UE 102 uses 430 the configuration for the paging subgroup to monitor paging.

The base station 104 receives 434 a message from the CN 110 containing the configuration for the paging subgroup. Depending on the implementation, the message may be a CN-to-BS message. The base station 104 may subsequently use the configuration for the paging subgroup to perform an enhanced paging procedure, or refrain from using the configuration for the paging subgroup and perform a legacy paging procedure in a paging procedure 496, similar to paging procedure 494. Similar to event 494, the base station 106 can perform an enhanced or legacy paging procedure 496 with the UE 102 in response to receiving a downlink data packet from the CN 110 instead of the CN-to-BS message, such as in cases where the UE 102 operates in the idle state with a suspended RRC connection.

In some implementations, the UE 102 receives a configuration for a paging subgroup from the base station 106 during the registration procedure 491. The UE 102 may then retain the configuration for the paging subgroup after selecting (or reselecting) 422 the new cell.

Figure 4B:
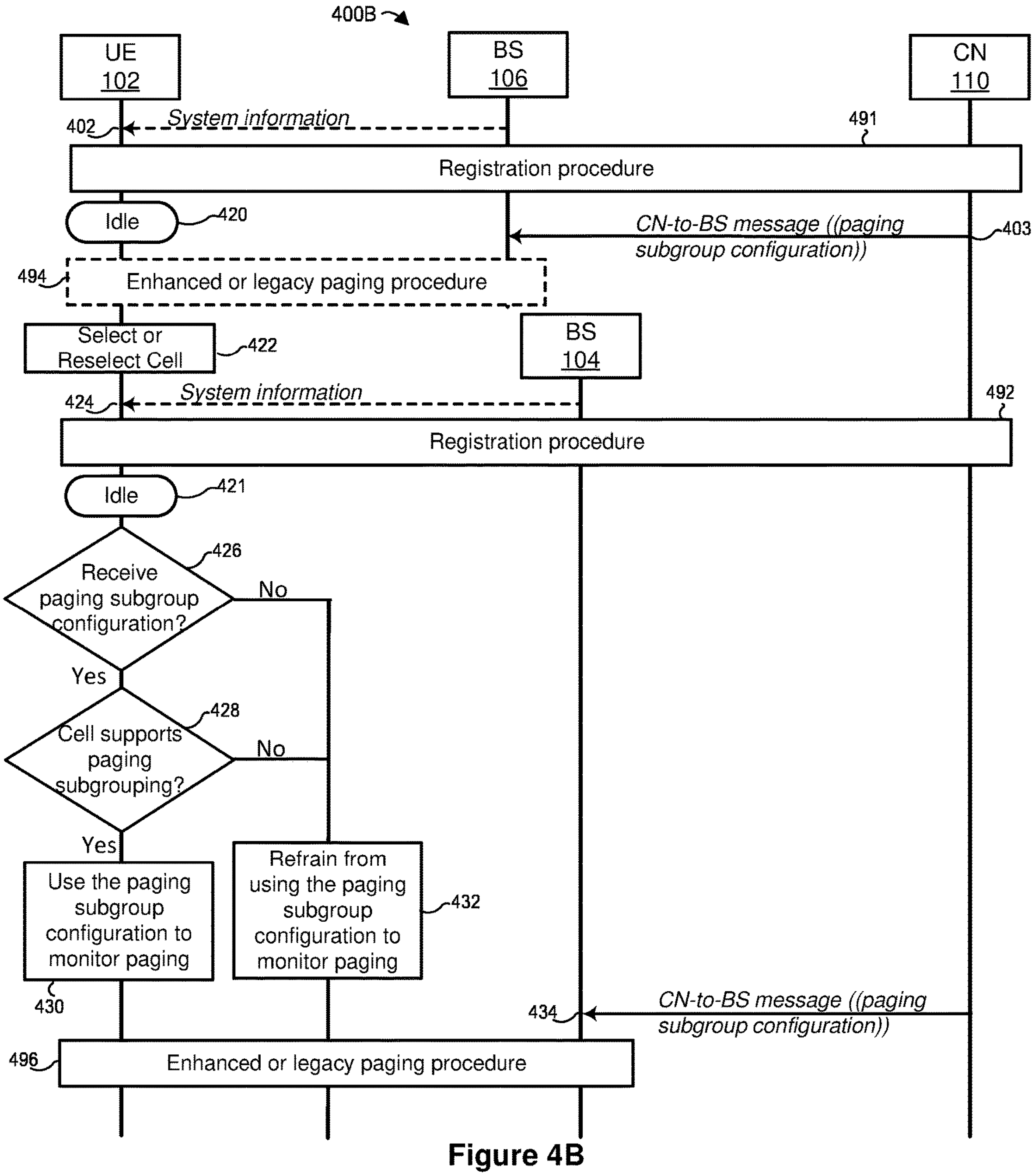
FIG. 4B illustrates a scenario similar to that of 4A, but in which the UE further determines whether to use a configuration to monitor a paging subgroup based on whether the UE receives the configuration from the cell.

Referring next to FIG. 4B, a scenario 400B is similar to 400A and similarly involves a UE 102 selecting (or reselecting) a cell 124 and subsequently determining whether to monitor paging using a configuration for a paging subgroup.

However, unlike scenario 400A, the UE 102 performs an additional registration procedure with the CN 110 to complete mobility and further bases the determination on whether the UE receives a configuration for a paging subgroup in the cell 124.

After selecting (or reselecting) the cell 124, the UE 102 performs a registration procedure 492 with the base station 104, similar to registration procedure 491 described in FIG. 4A above. The cells 124 and 126 may not belong to the same tracking area, unlike the scenario of FIG. 4A. The UE 102 can determine that the cells 124 and 126 belong to different tracking area from the system information 402 and 424. After completing the registration procedure 492. the UE 102 determines 426 whether the UE 102 has received a paging subgroup configuration as a part of the registration procedure 492. The UE 102 then determines 428 whether to use 430, or refrain from using 432, the paging subgroup configuration based at least in part on whether the cell 124 of the base station 104 supports paging subgrouping.

Figure 5:
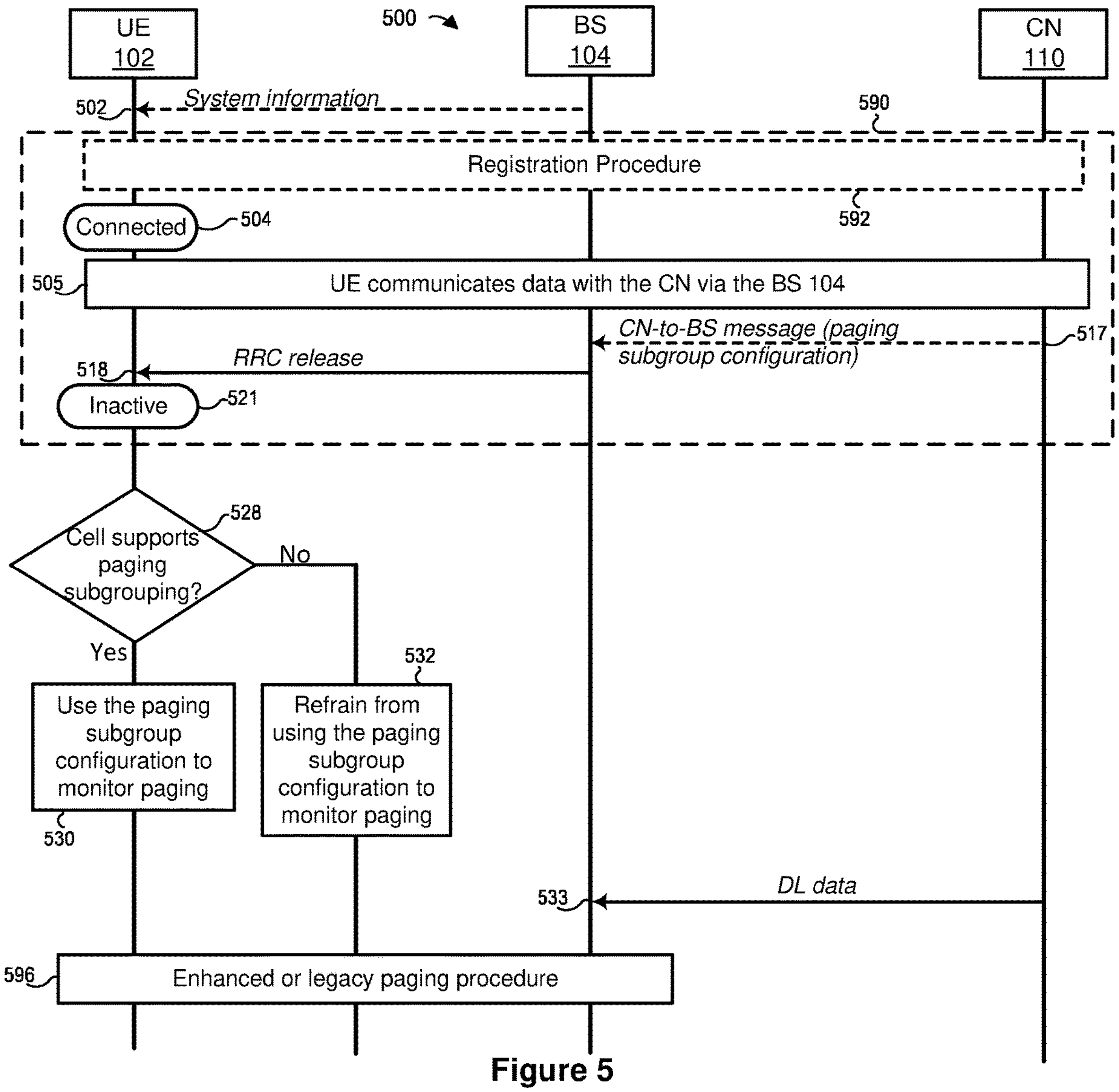
FIG. 5 illustrates a scenario similar to that of FIG. 3, but in which the UE monitors paging in an inactive state.

Referring now to FIG. 5, in a scenario 500 the CN 110 communicates with a UE 102 via the base station 104 and provides a paging subgroup configuration to the UE 102, before the UE 102 transitions to an inactive state (e.g., RRC_INACTIVE) and begins to monitor paging. FIG. 5 is similar to FIGS. 3, 4A, and 4B, but with the UE transitioning to an inactive state rather than an idle state.

The UE 102 may receive 502 system information in the cell 124 from the base station 104, perform 592 a registration procedure, and operate 504 in a connected state (e.g., RRC_CONNECTED) in the cell 124. The UE 102 can communicate 505 data with the CN 110 via the base station 104, until the base station 104 transmits 518 an RRC release message to the UE 102. The base station 104 can transmit 518 the RRC release message to the UE 102 in response to detecting data inactivity for the UE 102. Before transmitting 518 the RRC release message to the UE 102, the base station 104 can receive 517 a CN-to-BS message with a paging subgroup configuration for the UE 102 from the CN 110 (e.g., AMF 164). For example, the CN-to-BS message can be an NGAP message or an SAP message. In another example, the CN-to-BS message can be a Path Switch Request Acknowledge message, a Downlink NAS Transport message, a Handover Request message, PDU Session Resources Setup Request message, PDU Session Resources Modification Request message or an Initial Context Setup Request message. In other scenarios, the base station 104 can receive a paging subgroup configuration from another base station rather than the CN 110, e.g., in a handover request message. The UE 102 then transitions 521 to the inactive state. A procedure for transitioning to an inactive state 590 collectively includes events 592, 504, 505, 517, 518, and 521.

After the UE 102 begins operating 521 in an inactive state, the UE 102 determines 528 whether the cell 124 supports paging subgrouping. If the UE 102 determines 528 that the cell 124 supports paging subgrouping, then the UE 102 uses 530 the configuration for the paging subgroup to monitor paging. Otherwise, the UE 102 refrains 532 from using the configuration for the paging subgroup to monitor paging. The base station 104 may then determine to perform one of an enhanced or legacy paging procedure 596 as discussed in scenario 300 above (e.g., in response to receiving 533 a downlink data packet for the UE 102 from the CN 110). The downlink data packet can be a user-plane data packet.

In this scenario, the CN 110 can simply transmit 533 the downlink data packet for the UE 102, without transmitting a CN-to-BS message with paging subgroup configuration as in event 434 of scenarios 400A and 400B, because the UE 102 has not transitioned to the RRC_IDLE state. In some implementations, the base station 104 can receive from the CN 110 (e.g., UPF 162) a tunnel packet including the downlink data packet and a TEID that the base station 104 allocated for the UE 102. The base station 104 can identify that the downlink data packet addresses the UE 102 from the TEID and determine to page the UE 102 in response to the identification.

Figure 6A:
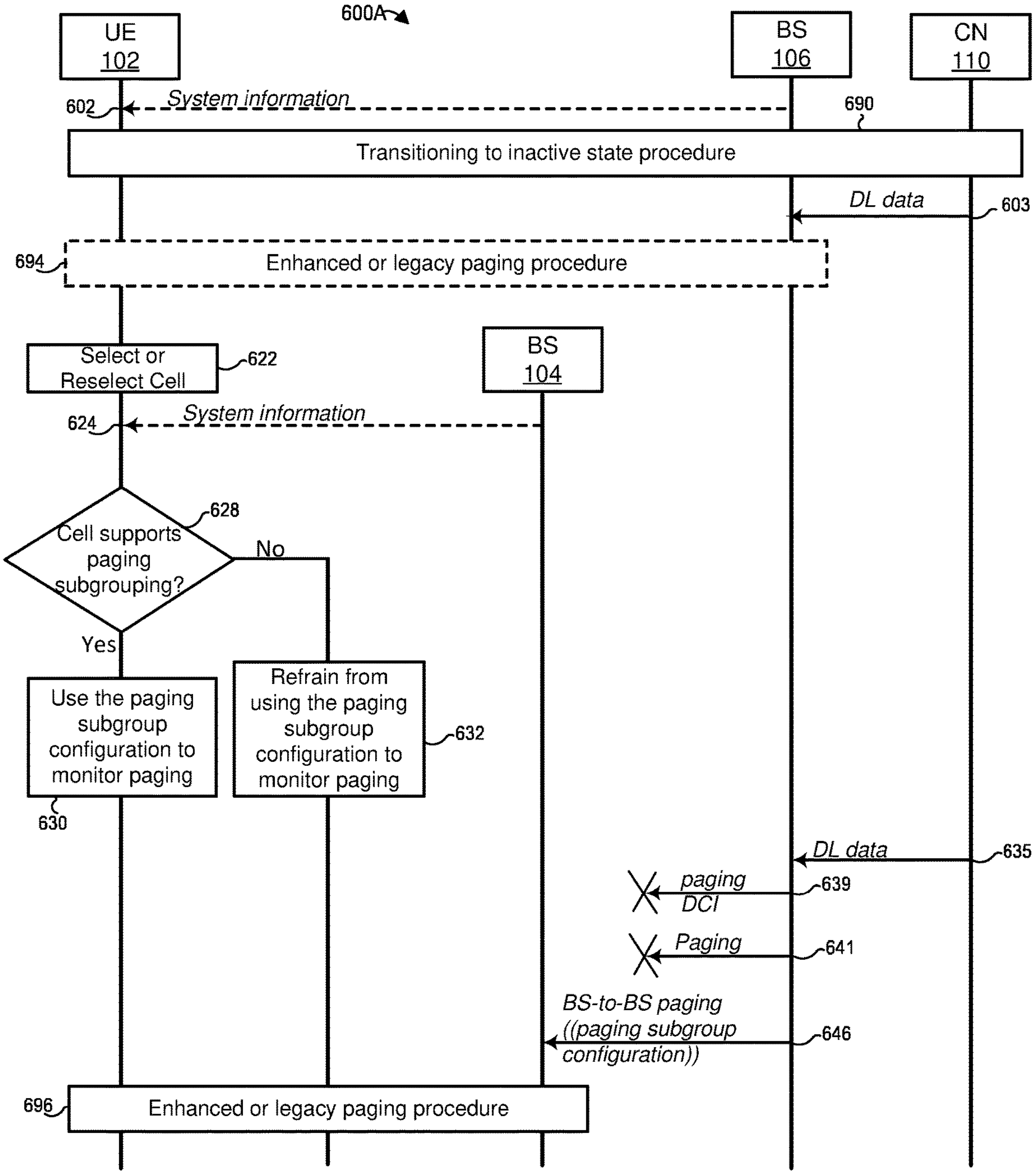
FIG. 6A illustrates a scenario similar to that of FIG. 4A, but in which the UE monitors paging in an inactive state.

Referring now to FIG. 6A, in a scenario 600A the UE 102 determines whether to use a configuration for a paging subgroup before the UE 102 selects (or reselects) the new cell 124 of the base station 104. After selecting the new cell 124, the UE 102 continues to operate in an inactive state. Similar to the scenario of FIG. 4A, the UE 102 can determine whether to use paging subgrouping based on the system information of the cell 124 or whether the previous cell 126 and the new cell 124 belong to the same RNA and, accordingly, whether the prior determination with respect to support of paging subgrouping in cell 126 also applies to cell 124.

The UE 102 performs a procedure for transitioning to an inactive state 690 with the CN 110 via the base station 106 and may receive 602 system information on the cell 124 from the base station 104 before performing the procedure 690. In some implementations, the UE 102 and the base station 106 then perform an enhanced or legacy paging procedure 694 similar to the procedure 494 discussed above.

The UE 102 then selects (or reselects) 622 a new cell 124. Depending on the implementation, the UE 102 continues to communicate in the same RNA after selecting a new cell 124. In some implementations, the UE 102 receives 624 system information from the base station 104. The UE 102 then determines whether to use 630, or refrain 632 from using, a configuration for the paging subgroup to monitor paging. In some implementations, the UE 102 makes the determination based on whether the cell 124 supports 628 paging subgrouping, which in turn is based on whether the cells 124 and 126 belong to the same RNA. In other implementations, the UE 102 makes 628 the determination based on the system information that the UE 102 received at event 624. In cases where the base station 106 and the base station 104 are in the same RNA, the base station 106 transmits 646 a paging subgroup configuration to the base station 104. In some implementations, the base station 106 transmits 646 the configuration by way of a BS-to-BS paging message. In some implementations, the base station 106 receives 635 downlink data from the CN 110, similar to event 533. Depending on the implementation, the base station 106 transmits the downlink data to the base station 104. In some implementations, the base station 106 determines that the UE 102 does not successfully receive the paging 639/641 after a pre-determined time period has passed without receiving an indication (e.g., RRC resume request message) from the UE 102. In response to or after receiving 646 the BS-to-BS paging message or the downlink data, the base station 104 determines to perform one of an enhanced or legacy paging procedure 696 as discussed in scenario 300 above.

Figure 6B:
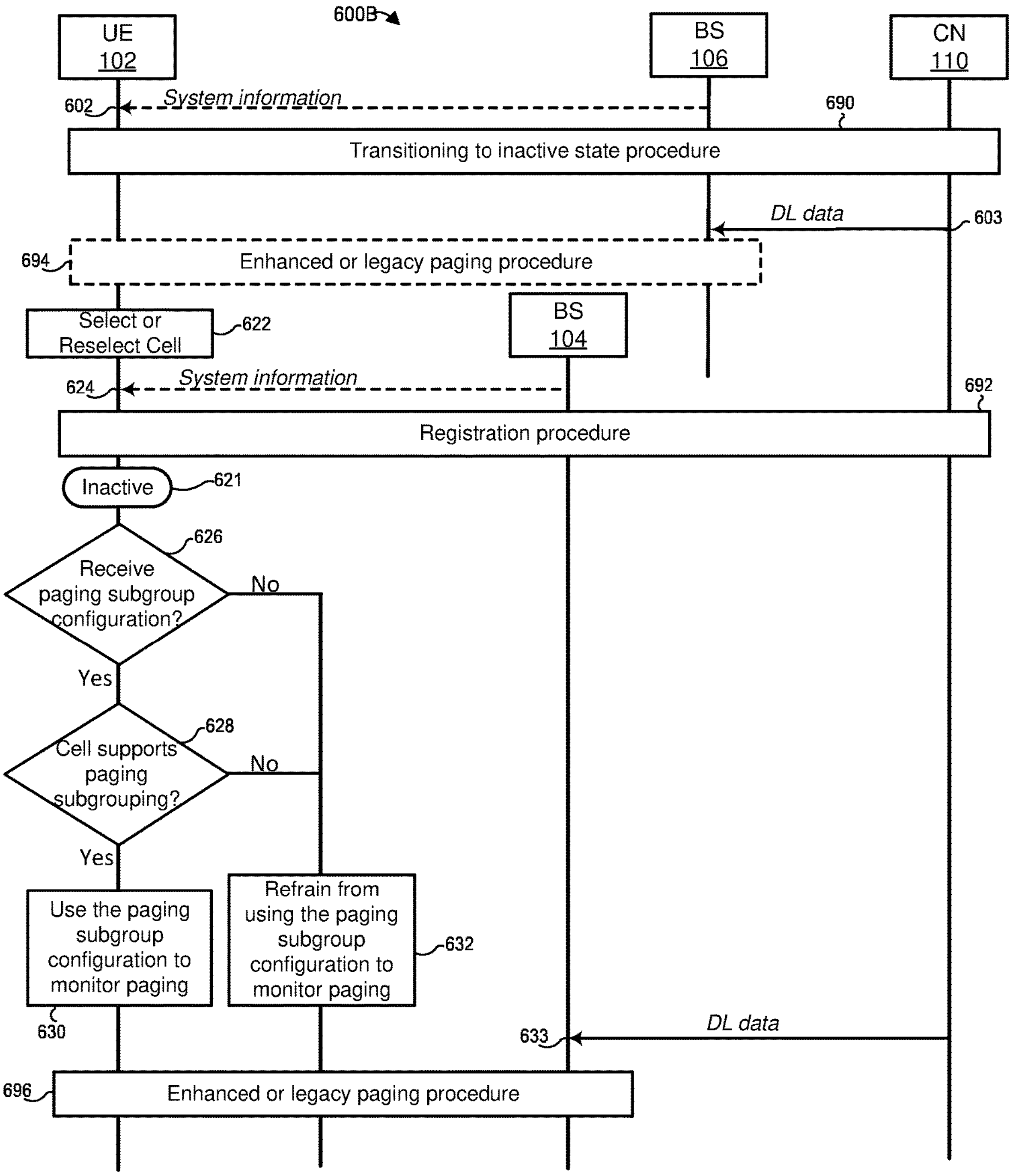
FIG. 6B illustrates a scenario similar to that of FIG. 6A, but in which the UE further determines whether to use a configuration to monitor a paging subgroup based on whether the UE receives the configuration from the cell.

Referring next to FIG. 6B, a scenario 600B is similar to the scenario 600A, but here the UE 104 and the base station 104 perform 692 a registration procedure, and the UE 102 determines whether to monitor paging using a paging subgroup configuration further based on whether the UE 102 received the configuration during the registration procedure

692, which the UE performs upon mobility from the base station 106 to the base station 104.

Figure 6C:
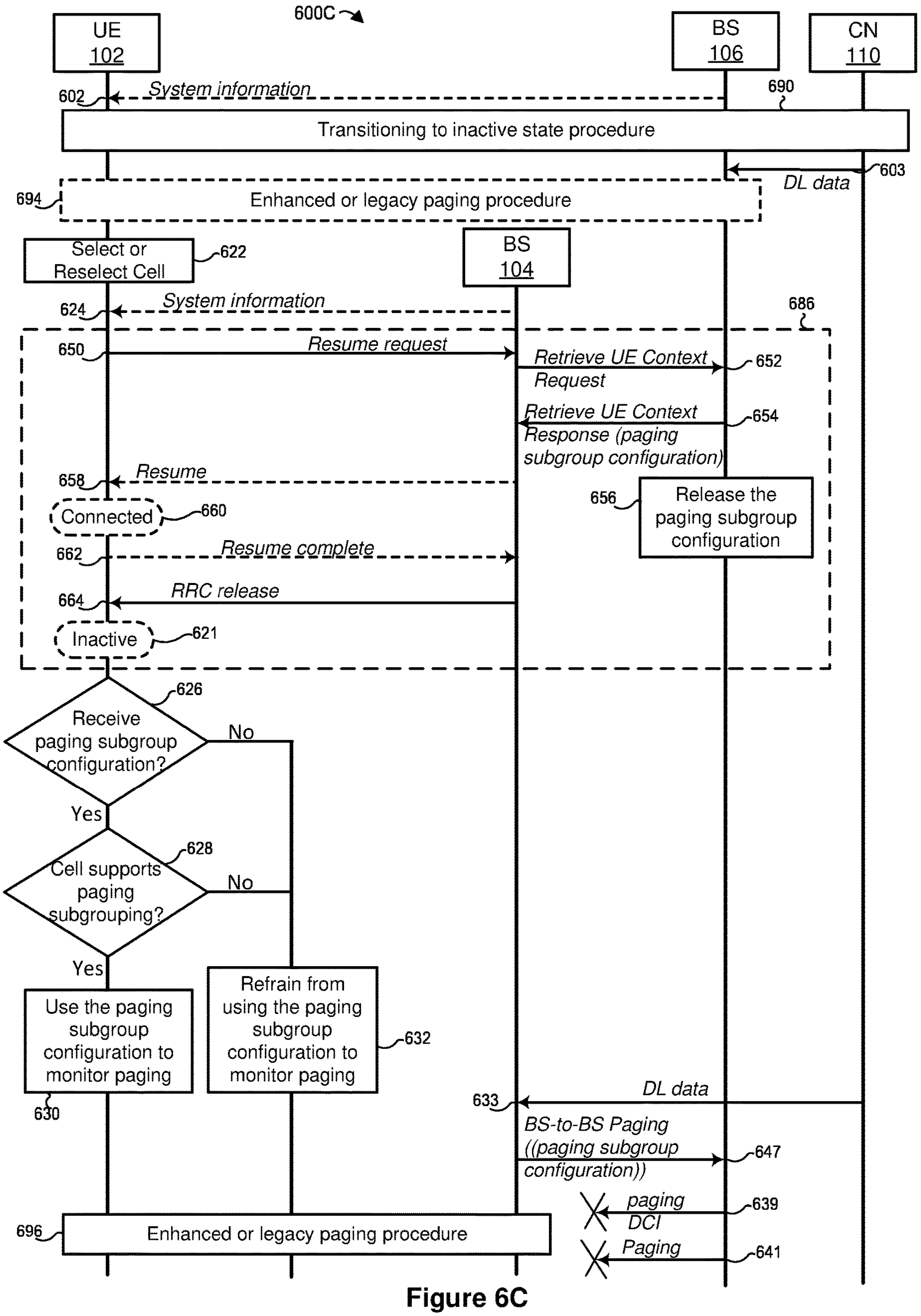
FIG. 6C illustrates a scenario similar to that of FIG. 6A, but in which the UE performs a resume procedure with the second base station, which retrieves a paging subgroup configuration from the first base station.

Referring next to FIG. 6C, a scenario 600C is generally similar to 600A, but here the UE 102 performs a resume procedure with the base station 104 after transitioning to an inactive state (e.g., RRC_INACTIVE), and the base station 104 retrieves a paging subgroup configuration for the UE 102 from the base station 106 during or in response to the resume procedure.

In particular, after selecting (or reselecting) 622 the new cell 124, the UE 102 transmits 650 a resume request message (e.g., RRCResumeRequest message) to the base station 104 to resume a radio connection with the RAN 105 or perform an RNA update. In some implementations, the cells 124 and 126 are in the same RNA. In other implementations, the cell 124 is in a new RNA relative to the cell 126. The base station 104 then transmits 652 a request (e.g., Retrieve UE Context Request message) to the base station 106 to retrieve a UE context of the UE 102. The base station 106 transmits a UE context response (e.g., Retrieve UE Context Response message) including a configuration for a paging subgroup, to the base station 104. After receiving the configuration, the base station 104 may transmit 658 a resume message (e.g., RRCResume message) to the UE 102 in response to the resume request message. In response to receiving 658 the resume message, the UE 102 begins operating 660 in a connected state (e.g., RRC_CONNECTED) and transmits 662 to the base station 104 a resume complete message (e.g., RRCResumeComplete message). After transmitting 654 the configuration for the paging subgroup to the base station 104, the base station 106 may release 656 the configuration.

The base station 104 then transmits 664 to the UE 102 an RRC release message with an indication to suspend radio resources, causing the UE 102 to operate 621 in the inactive state after receiving 662 the resume complete message from the UE 102. A resume procedure 686 collectively includes steps 650, 652, 654, 656, 658, 660, 662, 664, and 621.

After performing the resume procedure 686, the base station 104 may transmit 647 the configuration for the paging subgroup to the base station 106, which may attempt to page 639/641 the UE 102, similar to event 646. In some implementations, the base station 104 transmits the configuration after determining to do so based on downlink data received 633 from the CN 110. Similarly, the base station 106 may cease attempting to page the UE 102 after failing to transmit 639/641 a paging DCI and/or a paging message. The base station 104 can identify that the downlink data packet addresses the UE 102 from a TEID, similar to event 533. In response to the identification, the base station 104 can determine to page 696 the UE 102 and transmit 647 the configuration to the base station 106.

Figure 7A:
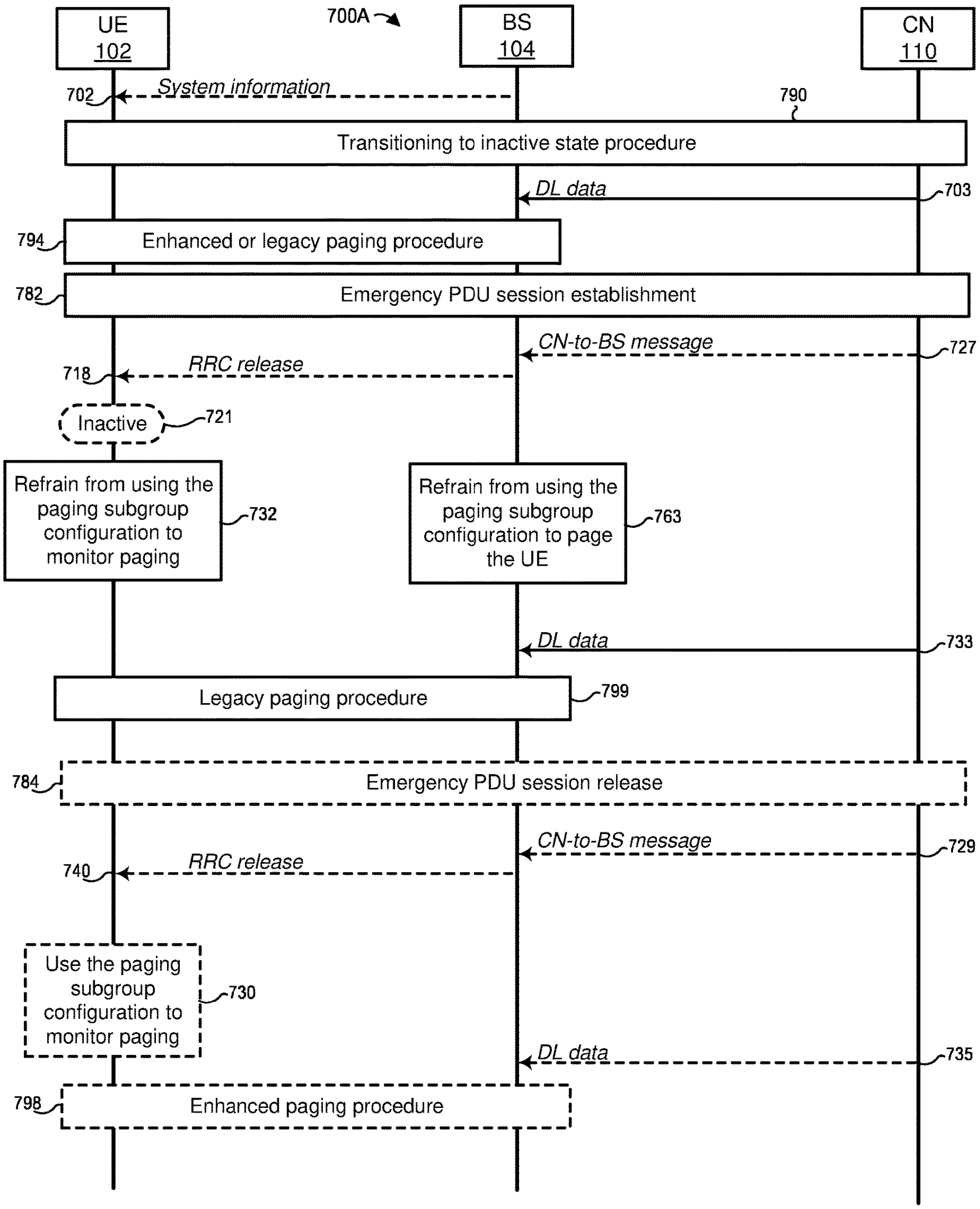
FIG. 7A illustrates a scenario in which the UE establishes an emergency PDU session and accordingly refrains from using a paging subgroup configuration.

Next, referring to FIG. 7A, a UE 102 in a scenario 700A establishes an emergency PDU session and refrains from using a paging subgroup configuration until the emergency PDU session is released. Because there are generally fewer paging occasions associated with a paging subgroup relative to a paging group, the UE 102 can prioritize speed over power saving by forgoing a paging subgroup configuration even when the serving base station supports this paging enhancement. The base station 104 similarly refrains from using the configuration for the paging subgroup. However, after the UE 102 releases the emergency PDU session, the UE 102 can use the configuration to monitor paging.

As illustrated in FIG. 7A, the UE 102 performs a procedure for transitioning to an inactive state 790 similar to the procedures 590 and 690 discussed above. The base station 106 can perform an enhanced or legacy paging procedure 794 with the UE 102 in response to a downlink data packet for the UE 102 from the CN 110 (event 703), similar to event 533. The UE 102 then establishes 782 an emergency PDU session with the CN 110.

After the UE 102 establishes 782 the emergency PDU session, the base station 104 transmits 718 an RRC release message to the UE 102, similar to event 518. In cases where the UE 102 operating in a connected state receives 718 the RRC release message, the UE 102 transitions 721 to the inactive state. In cases where the UE 102 operating in the inactive state receives 718 the RRC release message, the UE 102 remains in the inactive state. Before the base station 104 transmits the RRC release message or during the emergency PDU session establishment, the CN 110 can transmit 727 a CN-to-BS message (e.g., a Downlink NAS Transport message, PDU Session Resources Setup Request message or PDU Session Resources Modification Request message) to the base station 104. In some implementations, the CN 110 refrains 727 from including a paging subgroup configuration in the CN-to-BS message. The base station 104 accordingly refrains 763 from using the configuration in response to receiving 727 the CN-to-BS message. In other implementations, the CN 110 includes a flag or a field in the CN-to-BS message to explicitly indicate to the base station 104 that the base station 104 should not use the paging subgroup configuration which the base station 104 may have stored for the UE 102. The base station 104 accordingly refrains 763 from using the configuration in response to receiving 727 the flag or field. In other implementations, the base station 104 determines that the UE 102 established 782 the emergency PDU session and refrains 763 from using the paging subgroup configuration regardless of whether the CN 110 provides such a flag or field. The base station 104 may determine that the UE 102 established 782 the emergency PDU session based on a CN-to-BS message including at least one of: (i) an ID of the PDU session, (ii) QoS parameters associated with the PDU session, or (iii) an ID of a QoS flow associated with the PDU session.

In some implementations (not shown), the UE 102 in the inactive state performs a procedure for resuming a radio connection with the base station 104 to establish 782 the emergency PDU session. To perform 782 the procedure, the UE 102 transmits an RRC resume request message including an emergency cause value to the base station 104. In response to the RRC resume request message, the base station 104 transmits an RRC resume message to the UE 102. In response to the RRC resume message, the UE 102 transitions to the connected state and transmits an RRC resume complete message. To perform 782 the emergency PDU establishment procedure, the UE 102 in the connected state transmits a PDU Session Establishment Request message to the CN 110 via the base station 104. In response, the CN 110 transmits a PDU Session Establishment Accept message to the UE 102 via the base station 104.

After establishing 782 the emergency PDU session, the UE 102 in the inactive state refrains 732 from using the paging subgroup configuration to monitor paging. In some implementations, during the emergency PDU session, the UE 102 and the base station 104 perform a legacy paging procedure 799 for paging rather than an enhanced paging procedure.

The UE 102 may eventually release 784 the emergency PDU session with the CN 110. The UE 102 can perform 784 an emergency PDU session release procedure with the CN 110 to release the emergency PDU session. After releasing 784 the emergency PDU session, the UE 102 in the inactive state uses 730 the paging subgroup configuration to monitor paging and performs 798 an enhanced paging procedure. In some implementations, the UE 102 performs a second procedure for resuming the radio connection with the base station 104 in order to perform the emergency PDU session release procedure. In such implementations, the UE 102 transmits a second RRC resume request message including a non-emergency cause to the base station 104. Depending on the implementation, the non-emergency cause may be mobile originating signaling. The base station 104 may subsequently transmit a second RRC resume message in response to the second RRC resume request message. In response to the second RRC resume message, the UE 102 transitions to the connected state and transmits a second RRC resume complete message. To perform 784 the emergency PDU session release procedure, the UE 102 in the connected state transmits a PDU Session Release Request message to the CN 110 via the base station 104. In response, the CN 110 sends a PDU Session Release Command message to the UE 102 via the base station 104. The UE 102 can send a PDU Session Release Complete message to the CN 110 via the base station 104 in response to the PDU Session Release Command message. After completing the second resume procedure or the emergency PDU session release procedure, the base station 104 may transmit 740 an RRC release message to the UE 102 to transition the UE 102 to the inactive state.

After or while the UE 102 releases 784 the emergency PDU session, the CN 110 may transmit 729 a CN-to-BS message (e.g., a Downlink NAS Transport message, a PDU Session Resources Release Command message or an Initial Context Setup Request message) to the base station 104. In some implementations, the CN 110 can indicate to the base station 104 to use the paging subgroup configuration (i.e., the first paging subgroup configuration) in the CN-to-BS message 729. For example, the CN 110 can include, in the CN-to-BS message, the paging subgroup configuration or a field or IE to indicate to the base station 104 to use the paging subgroup configuration. Accordingly, the base station 104 pages the UE 102 using the paging subgroup configuration in response to receiving 729 the CN-to-BS message.

After receiving the indication, the base station 104 performs 798 an enhanced paging procedure with the UE 102 using the paging subgroup configuration upon receiving 735 a downlink data packet for the UE 102. The UE 102 in the inactive state uses 730 the first paging subgroup configuration to monitor paging after releasing 784 the emergency PDU session. In other implementations, the base station 104 determines that the UE 102 releases 784 the emergency PDU session regardless of whether the CN 110 provides such an indication of using the paging subgroup configuration. The base station 104 may determine that the UE 102 releases 784 the emergency PDU session based on (i) the ID of the PDU session, (ii) the QoS parameters associated with the PDU session, or (iii) the ID of the QoS flow associated with the PDU session, in the CN-to-BS message 729. In response to the determination, the base station 104 pages the UE 102 using the paging subgroup configuration. After determining that the UE 102 releases the emergency PDU session, the base station 104 performs 798 an enhanced paging procedure with the UE 102 using the paging subgroup configuration upon receiving 735 a downlink data packet for the UE 102. The UE 102 in the inactive state uses 730 the first paging subgroup configuration to monitor paging after releasing the 784 the emergency PDU session.

In yet other implementations, the CN 110 includes a second paging subgroup configuration in the CN-to-BS message of event 729. The base station 104 then uses the second paging subgroup configuration to page the UE 102. In such cases, the base station 104 performs 798 an enhanced paging procedure with the UE 102 using the second paging subgroup configuration upon receiving 735 a downlink data packet for the UE 102. Depending on the implementation, the second paging subgroup configuration may be different from or the same as the first paging subgroup configuration.

In some implementations, the CN 110 transmits a NAS message including the second paging subgroup configuration for the UE 102 during or after the emergency PDU session release procedure 784. In further implementations, the base station 104 transmits the second paging subgroup configuration to the UE 102 while transmitting 740 the release command. The UE 102 in the inactive state uses 730 the second paging subgroup configuration to monitor paging upon receiving the NAS message.

In some implementations, the UE 102 in the inactive state moves from base station 104 to a new base station (e.g., base station 106) after releasing 784 the emergency PDU session. In some implementations, the base stations 104 and 106 belongs to the same RNA. Thus, the UE 102 in the inactive state avoids performing a resume procedure similar to 686 in FIG. 6C. Upon receiving 733 the downlink data packet, the base station 104 determines to send a BS-to-BS paging message to page the UE 102 operating in the inactive state. In such implementations, the base station 104 determines not to include the paging subgroup configuration in the BS-to-BS paging message because of the emergency PDU session. In response to the determinations, the base station 104 generates a BS-to-BS paging message excluding the paging subgroup configuration and transmits the BS-to-BS paging message to the base station 106. Thus, the base station 106 uses a legacy paging procedure to page to the UE after or in response to receiving the BS-to-BS paging message excluding the paging subgroup configuration.

In some implementations, the base station 104 can include an indication to the UE 102 to transition to an idle state in the RRC release message 718/740, and the UE 102 transitions to the idle state in response to the RRC release message. The UE 102 in the idle state can perform an RRC connection procedure to release 784 the emergency PDU session. The UE 102 operating in the idle state with the emergency PDU session refrains 732 from using paging subgroup configuration and performs 799 the legacy paging procedure. The UE 102 operating in the idle state without the emergency PDU session can use 730 the paging subgroup configuration and performs 798 the enhanced paging procedure. The example implementations described above can apply to the UE 102 operating in the idle state.

Figure 7B:
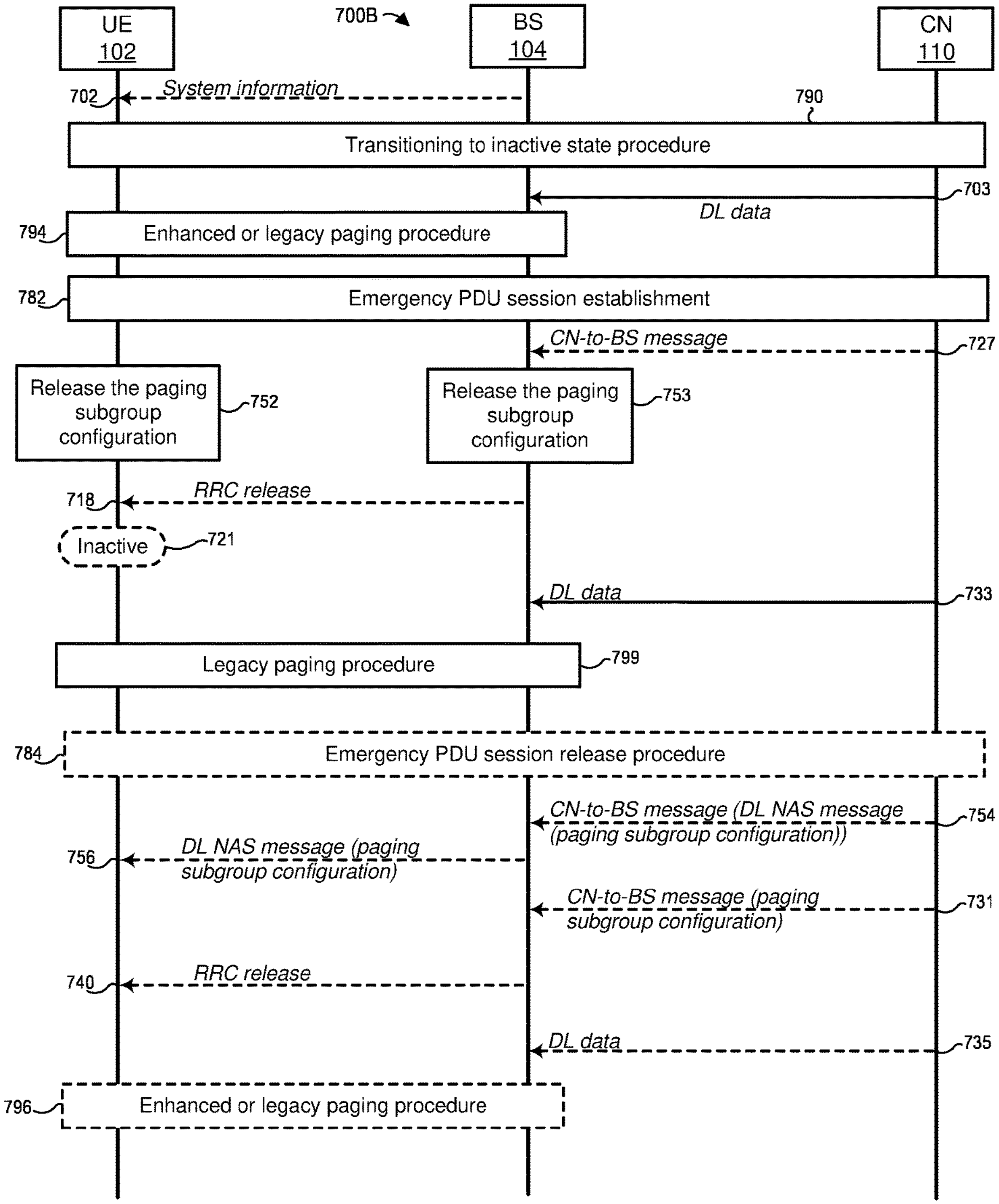
FIG. 7B illustrates a scenario similar to that of FIG. 7A, but in which the RAN and the UE release the configuration for the paging subgroup in response to the UE establishing an emergency PDU session.

Referring next to FIG. 7B, a scenario 700B is generally similar to the scenario 700A. However, unlike scenario 700A, the RAN 105 and the UE 102 here release the paging subgroup configuration in response to the UE 102 establishing the emergency PDU session After or while the UE 102 establishes 782 an emergency PDU session, the CN 110 may transmit 727 an indication to the base station 104 to release 753 the paging subgroup configuration. Depending on the implementation, the CN 110 may transmit the indication by transmitting 727 a CN-to-BS message to the base station 104. In other implementations, the base station 104 instead determines that the UE 102 has an emergency PDU session in accordance with information relevant to the PDU session, as described in scenario 700A above. The base station 104 then releases the paging subgroup configuration. The UE 102 also releases 752 the paging subgroup configuration after or in response to establishing 782 the emergency PDU session.

The UE 102 may eventually release 784 the emergency PDU session. After or in response to the UE 102 releasing 784 the session, the CN 110 may transmit 754 a CN-to-BS message to the base station 104. In some implementations, the CN-to-BS message includes a downlink NAS message. The downlink NAS message may include a second paging subgroup configuration. The base station 104 may transmit 756 the downlink NAS message including the second paging subgroup configuration to the UE 102. Depending on the implementation, the second paging subgroup configuration may be the same as or different than the first paging subgroup configuration. In further implementations, the CN 110 transmits 731 a second CN-to-BS message including the second paging subgroup configuration to the base station 104. Depending on the implementation, the CN-to-BS message 754 instead includes the second paging subgroup configuration for the base station 104, and the CN-to-BS message 731 can be omitted. Depending on the implementation, the second paging subgroup configuration may be different from or the same as the first paging subgroup configuration. After transmitting the DL NAS message, the base station 104 may transmit 740 an RRC release message to the UE 102 to transition the UE 102 to the inactive state or idle state.

Figure 7C:
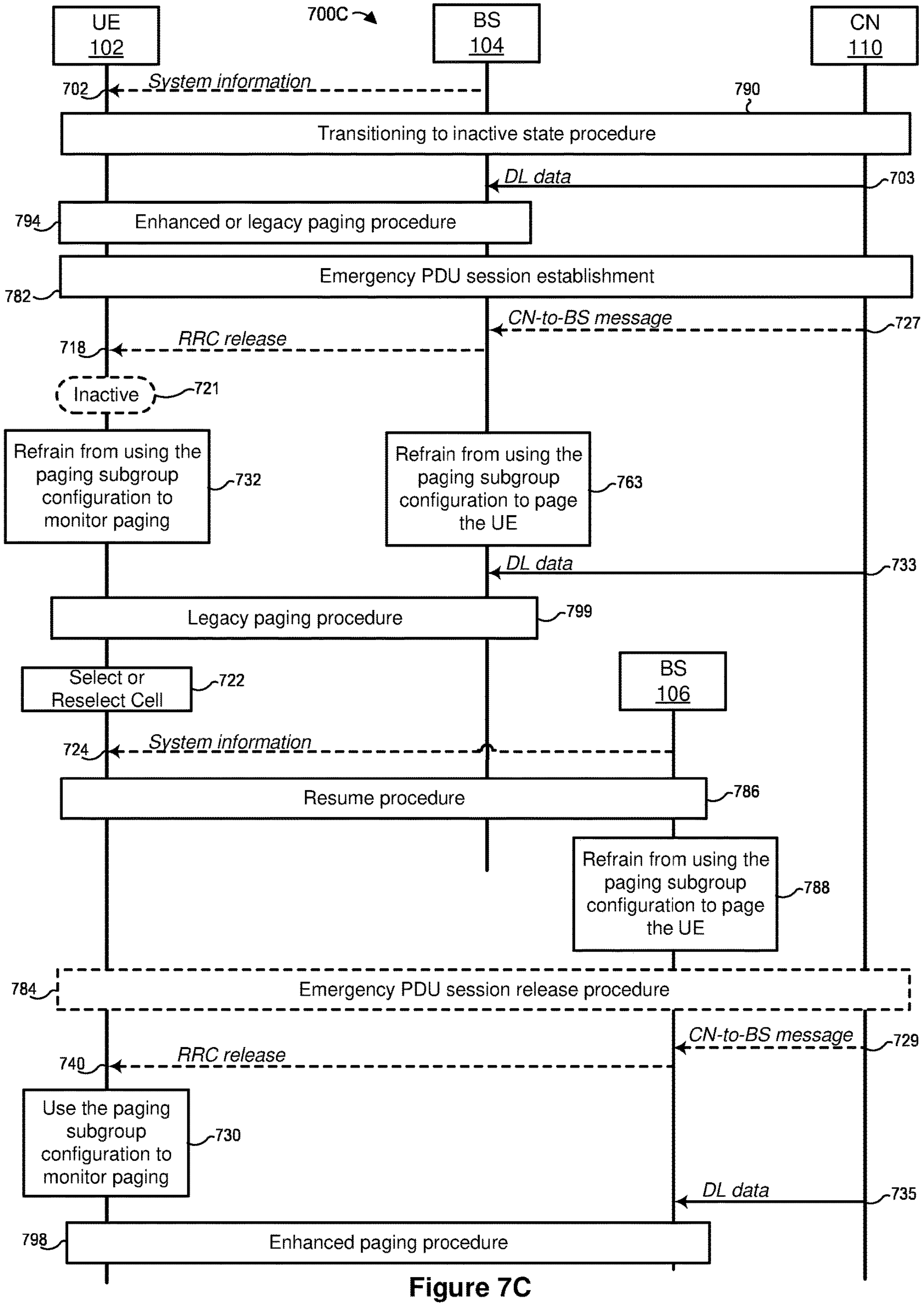
FIG. 7C illustrates a scenario similar to that of FIG. 7A, but in the UE also selects or reselects a new cell while the emergency PDU session is active.

Referring next to FIG. 7C, a scenario 700C also is generally similar to 700A. In this scenario, however, the UE 102 also selects (or reselects) a new cell 126 while the emergency PDU session is active.

After establishing 782 the emergency PDU session, the UE 102 may select (or reselect) 722 a new cell 126. Depending on the implementation, the UE 102 performs the selection (or reselection) due to a change in location. As such, the UE 102 performs a resume procedure 786 with the base station 104 and a base station 106 as described in scenarios 500 and 600C above. After performing the resume procedure 786, the base station 106 then refrains 788 from using the paging subgroup configuration to page the UE 102. In some implementations, the base station 106 refrains 788 from using the paging subgroup configuration in response to the base station 104 transmitting an indication to suspend application of the configuration to the base station 106 during the resume procedure 786. For example, the base station can include the indication in a Retrieve UE Context Response message during the resume procedure 786. In other implementations, the base station 106 refrains 788 from using the configuration in response to the base station 104 including information associated with the emergency PDU session in transmissions to the base station 106 during the resume procedure 786. In such implementations, the base station 106 may determine that the UE 102 has established 782 an emergency PDU session based on the information. For example, the information can include (i) an ID of the emergency PDU session, (ii) QoS parameters associated with the emergency PDU session, or (iii) an ID of a QoS flow associated with the emergency PDU session. In yet other implementations, the base station 104 refrains from transmitting the paging subgroup configuration to the base station 106 in the resume procedure. For example, the base station 104 may refrain from including the paging subgroup configuration in the Retrieve UE Context Response message.

Figure 7D:
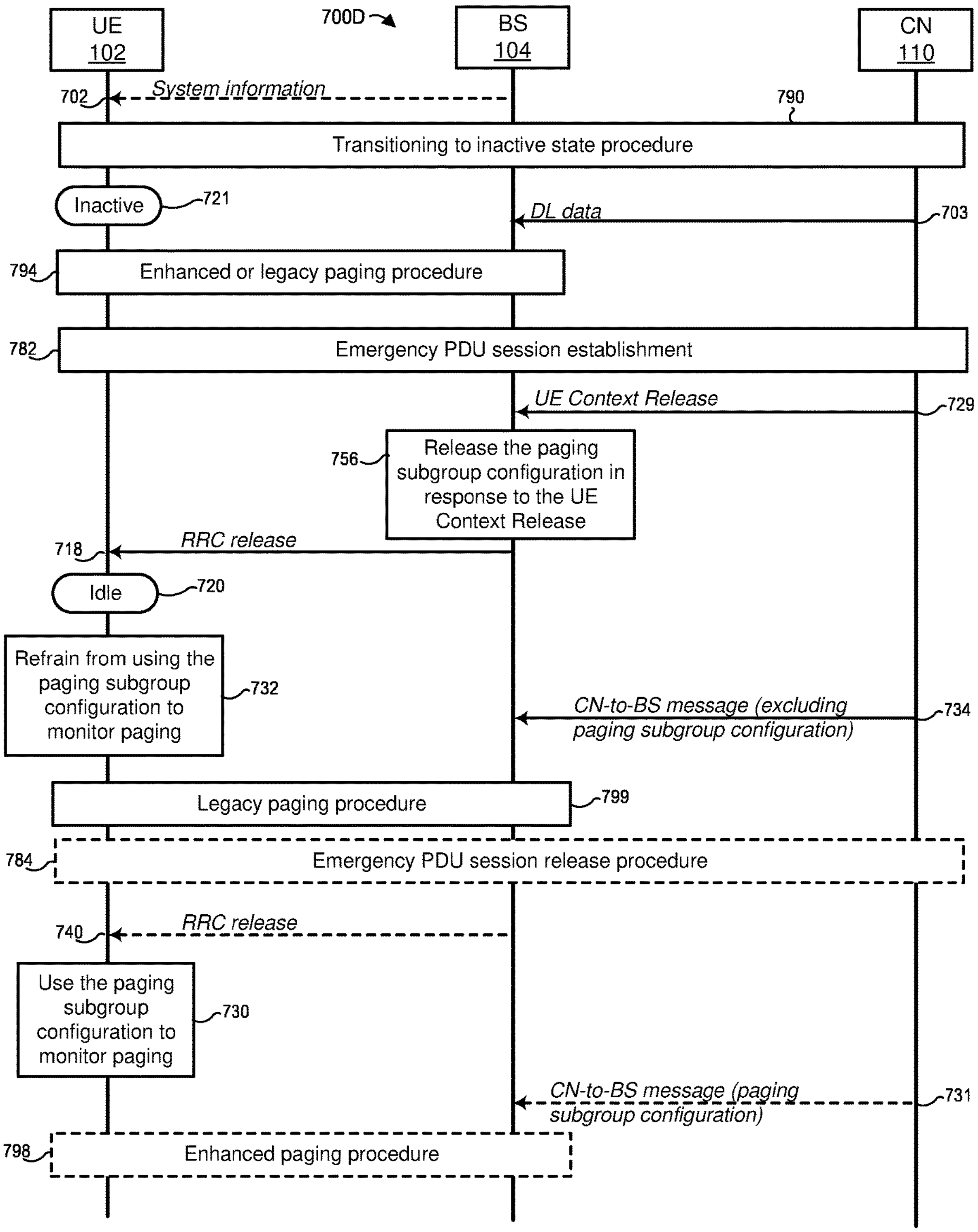
FIG. 7D illustrates a scenario similar to that of FIG. 7A, but in which the UE uses paging subgroup configuration after the emergency PDU session ends.

Referring next to FIG. 7D, a scenario 700D is generally similar to scenario 700A. However, here the UE 102 retains a configuration for a paging subgroup for use after the emergency session ends when the base station 104 releases the configuration and receives a configuration from the CN 110.

After the UE 102 establishes 782 the emergency PDU session, the CN 110 transmits 729 a UE context release message (e.g., UE Context Release Command message) to the base station 104. In response to receiving 729 the UE context release message, the base station 104 releases 756 the paging subgroup configuration. The UE 102, however, retains the paging subgroup configuration after establishing 782 the emergency PDU session and refrains 732 from using the configuration to monitor paging. After releasing 756 the configuration, the base station 104 transmits 718 an RRC release message to the UE 102 to release radio resources and transition the UE 102 to an idle state. In response to the RRC release message, the UE 102 releases radio resources, retains the paging subgroup configuration, and begins operating 720 in an idle state. Depending on the implementation, the UE 102 refrains 732 from using the paging subgroup configuration after the UE 102 begins to operate 720 in the idle state. The CN 110 transmits 734 a CN-to-BS message (e.g., an S1AP Paging message or an NGAP Paging message) to the base station 104 to page the UE 102. In some implementations, the CN 110 transmits 734 the message while the emergency session is ongoing and may exclude a paging subgroup configuration. In response to or after receiving the CN-to-BS message, the base station 104 performs 799 the legacy paging procedure with the UE 102 as described above. The CN 110 may transmit 731 a second CN-to-BS message (e.g., an S1AP Paging message or an NGAP Paging message) including the paging subgroup configuration to page the UE 102 after the UE 102 releases 784 the emergency session. In response to or after receiving the second CN-to-BS message, the base station 104 performs 798 the legacy paging procedure with the UE 102 as described above.

Next, several example methods that can be implemented in a UE, a RAN, a CU, or a CN are discussed with reference to FIGS. 8-20. Each of these methods can be implemented using processing hardware such as one or more processors to execute instructions stored on a non-transitory computer-readable medium such as computer memory.

Figure 8:
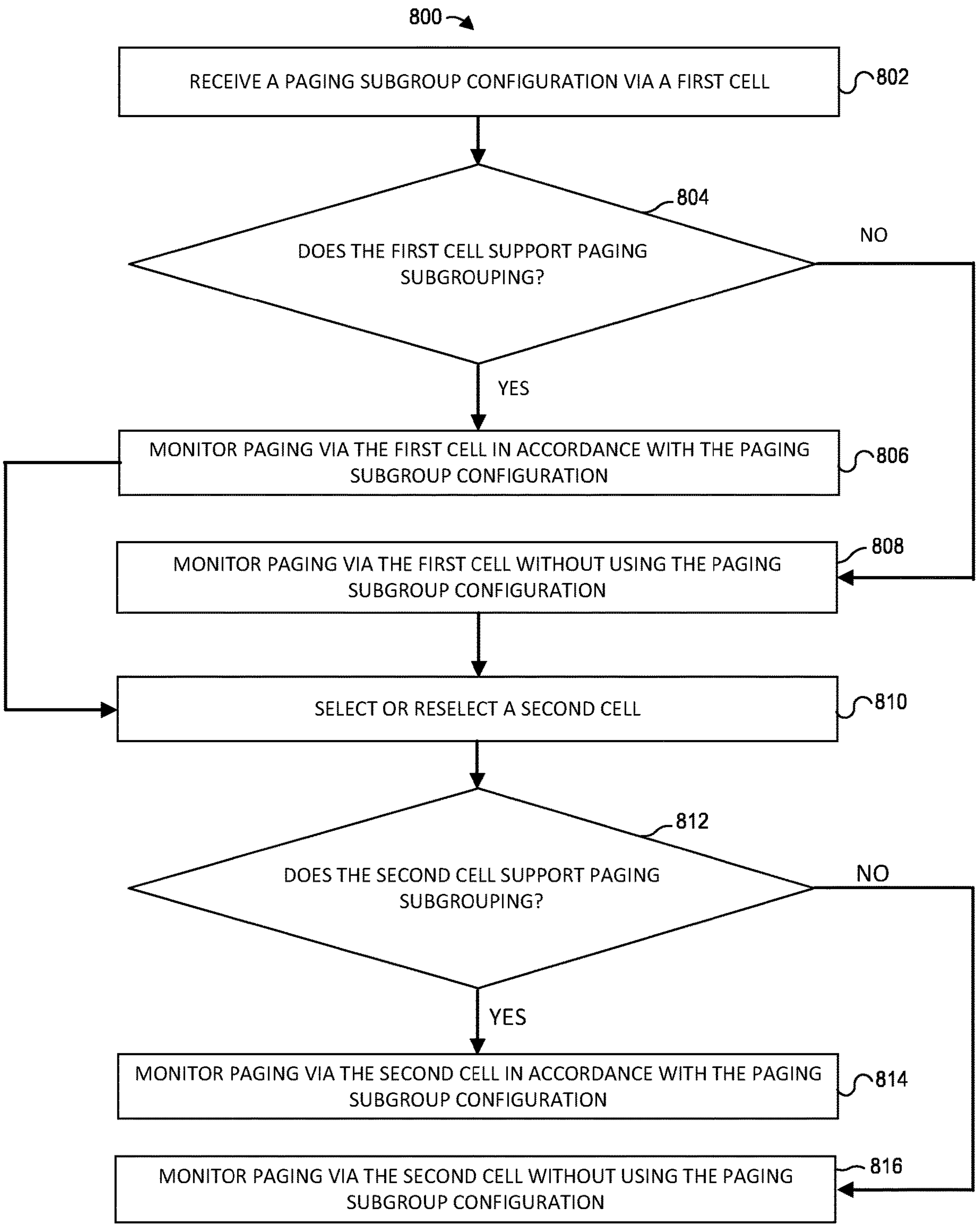
FIG. 8 is a flow diagram of an example method for determining whether to monitor paging using a configuration for a paging subgroup, implemented in a UE.

Referring first to FIG. 8, a method 800 can be implemented in a suitable UE and includes determining whether to monitor paging using a configuration for a paging subgroup based on support for paging subgrouping from a first cell and a second cell. For clarity, the method 800 is discussed with specific reference to the cell 124, the cell 126, and the UE 102.

At block 802, the UE 102 receives a configuration for a paging subgroup via a first cell 124 (e.g., events 312, 491, 505, 690, and 790 of FIGS. 3-7D). At block 804, the UE 102 determines whether the first cell 126 supports paging subgrouping (e.g., events 328, 428, 528, and 628 of FIGS. 3-6C). If the cell 126 supports paging subgrouping, the flow proceeds to block 806, where the UE 102 monitors paging via the cell 126 in accordance with the configuration (e.g., events 330, 430, 530, 630, 730 of FIGS. 3-7D). If the cell 126 does not support paging subgrouping, the flow proceeds to block 808, where the UE 102 monitors paging via the cell 126 without using the configuration (e.g., events 332, 432, 532, 632, 732, and 752 of FIGS. 3-7D).

At block 810, the UE 102 selects (or reselects) a new cell 124 (422, 622, and 722 of FIGS. 4A-B. 6A-D, and 7C). At block 812, the UE 102 determines whether the new cell 124 supports paging subgrouping (e.g., events 428 and 628 of FIGS. 4A-B and 6A-D). As discussed above, the determination can be based, for example, on whether the previous cell and the cell belong to the same RNA or on a configuration the UE receives for the new cell. If the cell 124 supports paging subgrouping, the flow continues to block 814, where the UE 102 monitors paging via the cell 124 in accordance with the configuration (e.g., events 430 and 630 of FIGS. 4A-B and 6A-D). If the cell 124 does not support paging subgrouping, the flow continues to block 816, where the UE 102 monitors paging via the cell 124 without using the configuration (e.g., events 432 and 632 of FIGS. 4A-B and 6A-D).

Figure 9A:
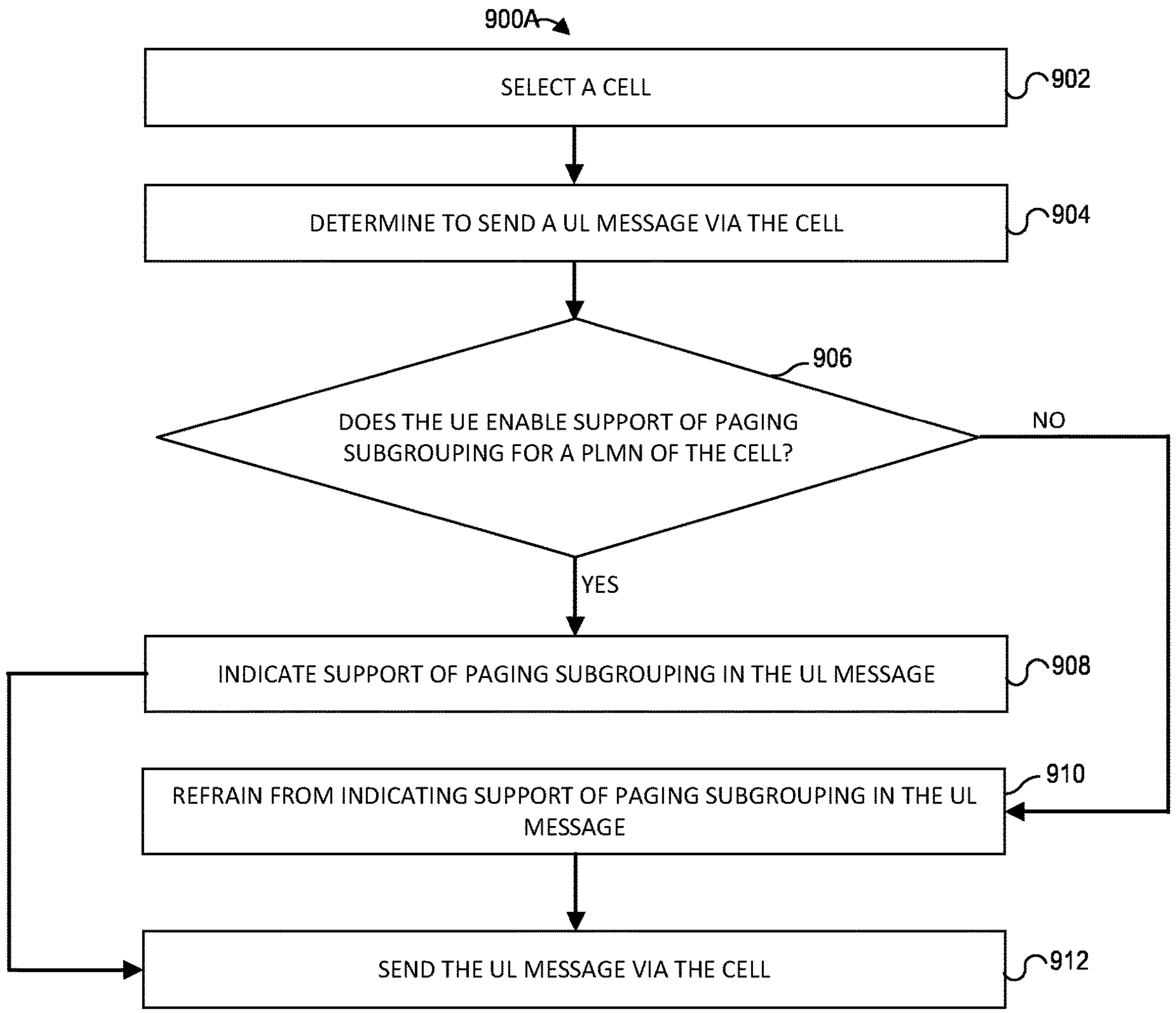
FIG. 9A is a flow diagram of an example method for determining whether to indicate support of paging subgrouping in an uplink message based on whether the UE enables support of paging subgrouping for a public land mobile network (PLMN) of a cell, implemented in a UE.

Referring now to FIG. 9A, a method 900A can be implemented in a suitable UE and includes determining whether to indicate support of paging subgrouping in an uplink message based on whether the UE enables support of paging subgrouping for a public land mobile network (PLMN) of a cell. For clarity, the method 900A is discussed with specific reference to the UE 102 and the cell 124.

At block 902, the UE 102 selects (or reselects) a cell 124 (e.g., events 422 and 622 of FIGS. 4A-B and 6A-C). At block 904, the UE 102 determines to send an uplink message via the cell 124 (e.g., events 492 and 650/692 of FIGS. 4B and 6B-C). In some implementations, the uplink message is an uplink NAS message and the UE 102 transmits the uplink NAS message to a CN via the cell 124. Depending on the implementation, the uplink NAS message is a registration request message. In other implementations, the uplink message is an uplink RRC message, and the UE 102 transmits the uplink RRC message to a RAN via the cell. Depending on the implementation, the uplink RRC message is a UE capability information message.

At block 906, the UE 102 determines whether the UE 102 enables support of paging subgrouping for a PLMN of the cell 124. In some implementations, the UE 102 stores different configurations for different network operators. In one implementation, the UE 102 can determine to use a configuration for a network operator of the cell 124. In another implementation, the UE 102 can determine to use a configuration for a network operator of a USIM in the UE 102. If the UE 102 uses a configuration for a network operator that supports paging subgrouping, then the UE 102 may determine that the UE 102 enables support of paging subgrouping. If the UE 102 enables support, the flow continues to block 908, where the UE 102 indicates support of paging subgrouping in the uplink message. If the UE 102 does not enable support, the flow continues to block 910, where the UE 102 refrains from indicating support of paging subgrouping in the uplink message. The UE 102 then transmits the uplink message via the cell 124 at block 912 (e.g., events 492 and 650/692 of FIGS. 4B and 6B-C).

Figure 9B:
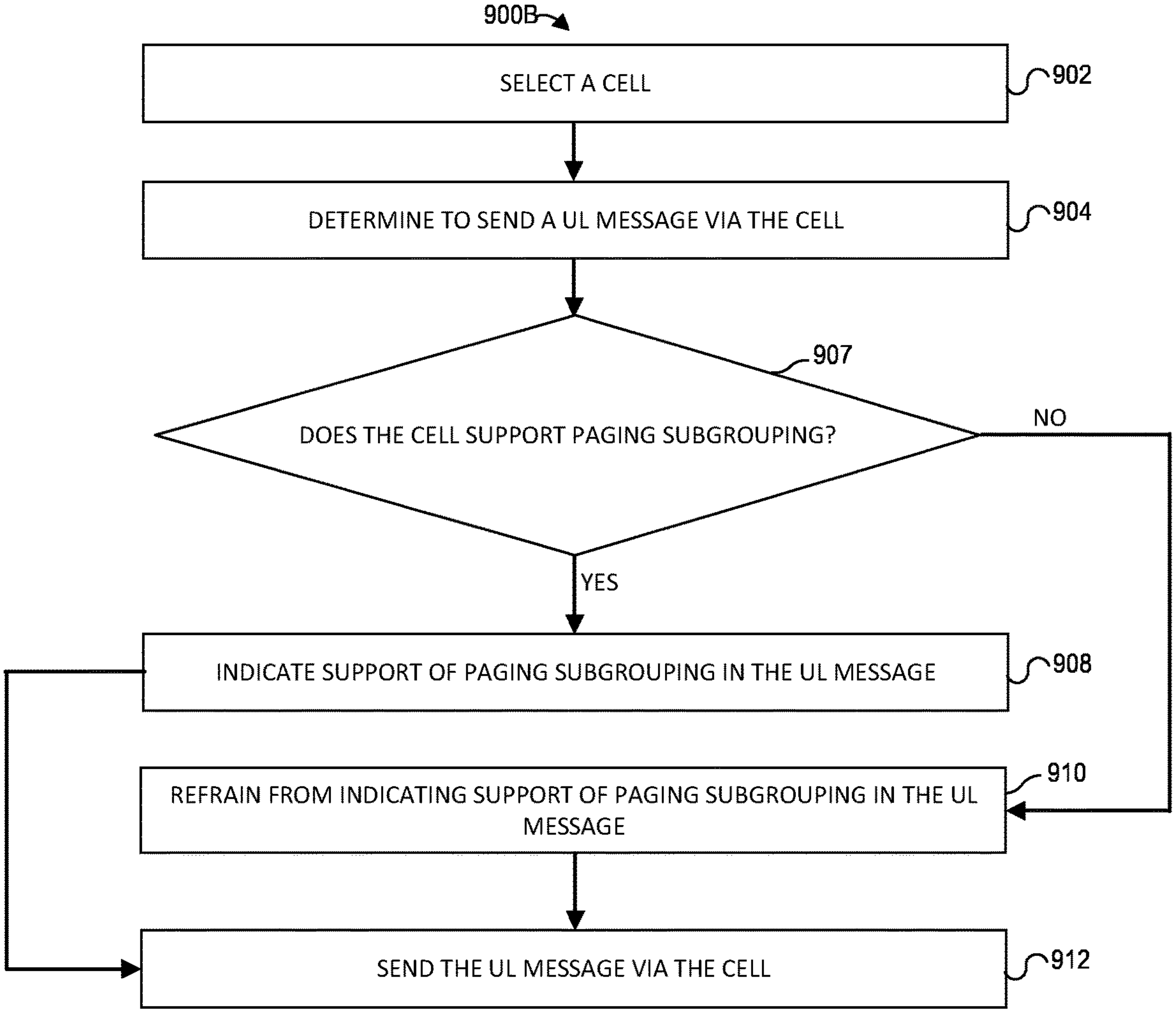
FIG. 9B is a flow diagram of an example method similar to FIG. 9A, but in which the UE determines whether to indicate support based on whether the cell supports paging subgrouping.

Referring next to FIG. 9B, a method 900B is generally similar to the method 900A, but here the UE determines whether to indicate support based on whether the cell supports paging subgrouping. More specifically, the differences between the methods of FIG. 9A and FIG. 9B are discussed below.

After the UE 102 determines to transmit an uplink message via the cell 124 at block 904, the UE 102 determines at block 907 whether the cell 124 supports paging subgrouping. If the cell 124 does support paging subgrouping, then the flow continues to blocks 908 and 912 as described in method 900A above (e.g., events 492 and 650/692 of FIGS. 4B and 6B-C). If the cell does not support paging subgrouping, then the flow continues to blocks 910 and 912 as described in method 900A above (e.g., events 492 and 650/692 of FIGS. 4B and 6B-C).

Figure 10:
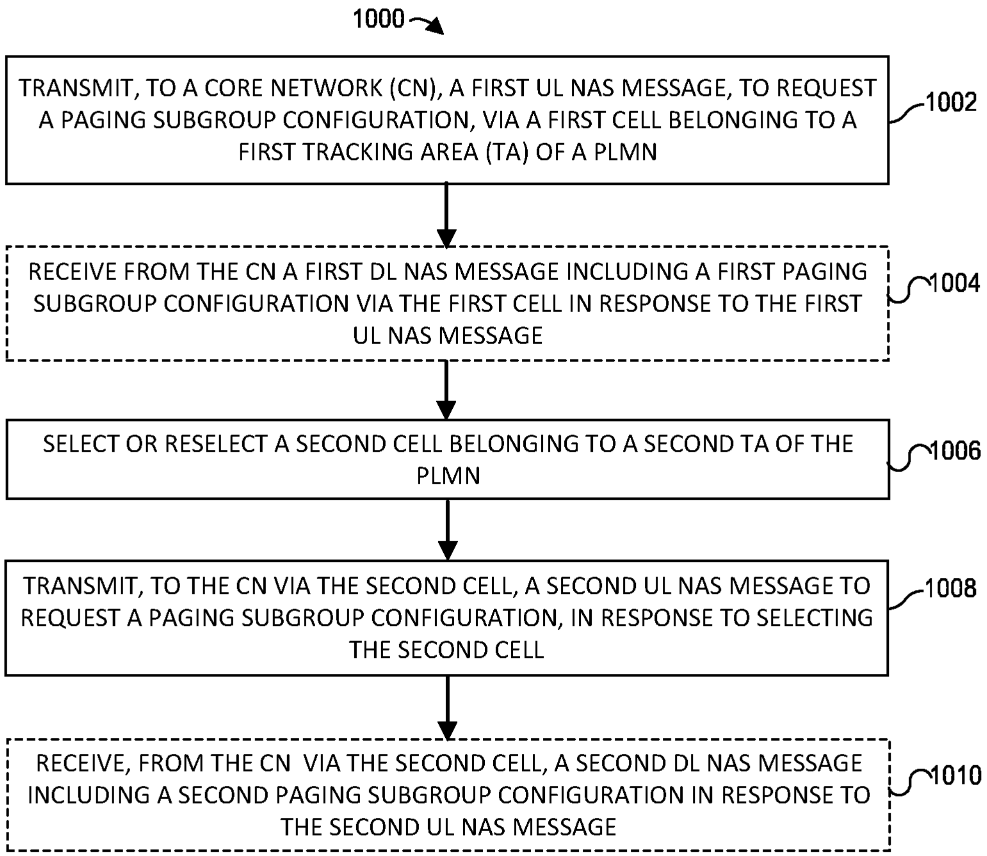
FIG. 10 is a flow diagram of an example method for obtaining a first and second paging subgroup configurations from a CN via a first and second cell, respectively, implemented in a UE.

Referring now to FIG. 10, a method 1000 can be implemented in a suitable UE and includes obtaining a first and second configurations for a paging subgroup from a CN via a first and second cell, respectively, belonging to a PLMN. For clarity, the method 1000 is discussed with specific reference to the UE 102 and the CN 110.

At block 1002, the UE 102 transmits a first uplink NAS message to a CN 110 via a first cell belonging to a first tracking area (TA) of a PLMN to request a configuration for a paging subgroup (e.g., events 306, 491, 592, 690, and 790 of FIGS. 3-7D). In some implementations, the flow continues to block 1004, where the UE 102 receives a first downlink NAS message from the CN 110, the message including a first configuration for a paging subgroup via the first cell (e.g., events 312, 491, 592, 690, and 790 of FIGS. 3-7D). Depending on the implementation, the UE 102 includes an indication to indicate support of paging subgrouping in the first uplink NAS message.

At block 1006, the UE 102 then selects (or reselects) a second cell belonging to a second TA of the PLMN (e.g., events 422 and 622 of FIGS. 4A-B and 6A-C). At block 1008, the UE 102 transmits a second uplink NAS message to the CN 110 via the second cell to request a configuration for a paging subgroup (e.g., events 492 and 692/650 of FIGS. 4B and 6B-C). In some implementations, the UE 102 indicates support of paging subgrouping through the request for the configuration. In further implementations, the flow continues to block 1010, where the UE 102 receives a second downlink NAS message from the CN 110 via the second cell, the message including a second configuration for a paging subgroup (e.g., events 492 and 692/650 of FIGS. 4B and 6B-C). Depending on the implementation, the UE 102 includes an indication to indicate support of paging subgrouping in the uplink NAS message. In some implementations, the UE 102 determines whether to continue to enable support of paging subgrouping after selecting (or reselecting) the second cell at block 1006. If the UE 102 determines to continue to enable support, the UE 102 transmits an indication of support in the second uplink NAS message at block 1008. If the UE 102 determines to stop enabling support, the UE 102 excludes the indication of support in the second uplink NAS message. In some implementations, the first and second configurations can be the same or different.

Figure 11:
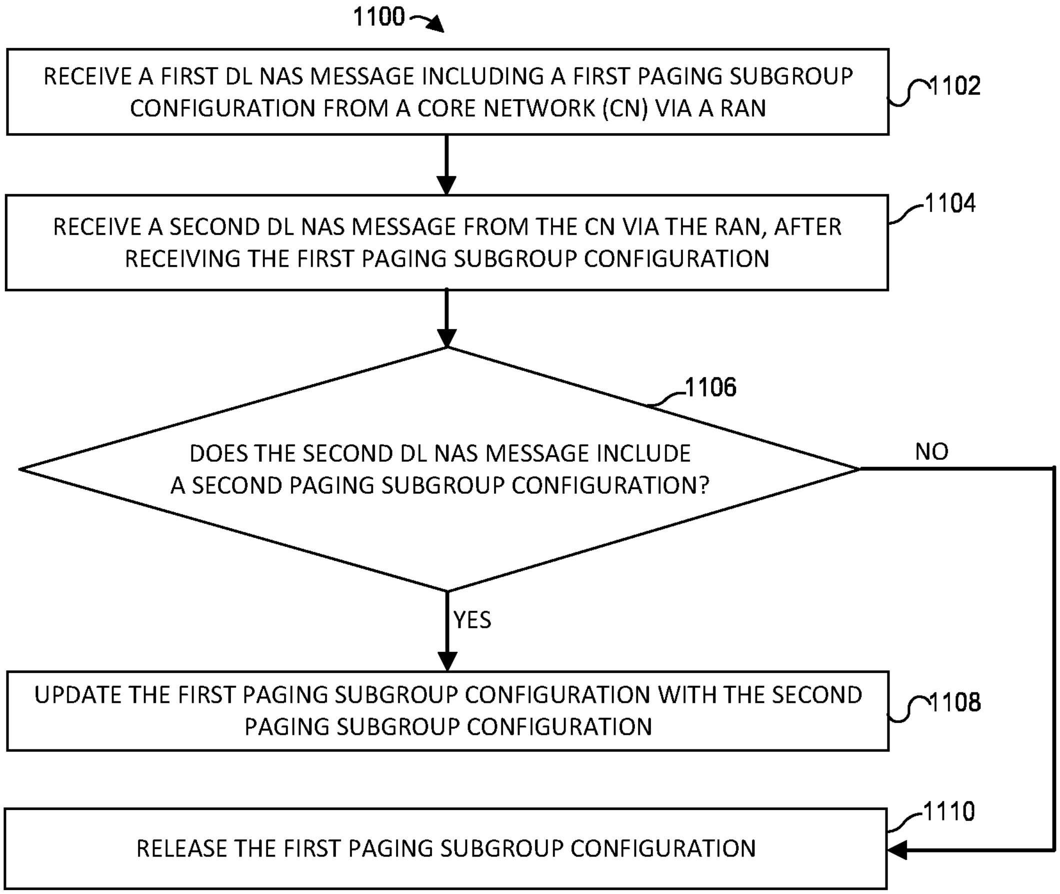
FIG. 11 is a flow diagram of an example method for determining whether a UE should update or release the first paging subgroup configuration with the second paging subgroup configuration, implemented in a UE.

Referring now to FIG. 11, a method 1100 can be implemented in a suitable UE and includes determining whether a UE should update or release the first configuration for the paging subgroup with the second configuration for the paging subgroup. For clarity, the method 1100 is discussed with specific reference to the UE 102, the CN 110, and the RAN 105.

At block 1102, the UE 102 receives a first downlink NAS message from a CN 110 via a RAN 105, the message including a first configuration for a paging subgroup (e.g., events 312, 491, 505, 690, and 790 of FIGS. 3-7D). At block 1104, the UE 102 receives a second downlink NAS message from the CN 110 via the RAN 105 after receiving the first configuration (e.g., events 492 and 692 of FIGS. 4B and 6B). At block 1106, the UE 102 determines whether the second downlink NAS message includes a second configuration for the paging subgroup (e.g., events 426 and 626 of FIGS. 4B and 6B-C). If the second downlink NAS message includes a second configuration, the flow continues to block 1108, where the UE 102 updates the first configuration with the second configuration for the paging subgroup. If the second downlink NAS message does not include a second configuration, the flow continues to block 1110, where the UE 102 releases the first configuration for the paging subgroup. In some implementations, the UE 102 retains the first configuration at block 1110 instead. Depending on the implementation, the first configuration may be the same as the second configuration, or the two configurations may be different. In some implementations, the second downlink NAS message also does not include an explicit indication to indicate to the UE 102 to release the first configuration in cases where the second downlink NAS message does not include the second configuration.

Figure 12A:
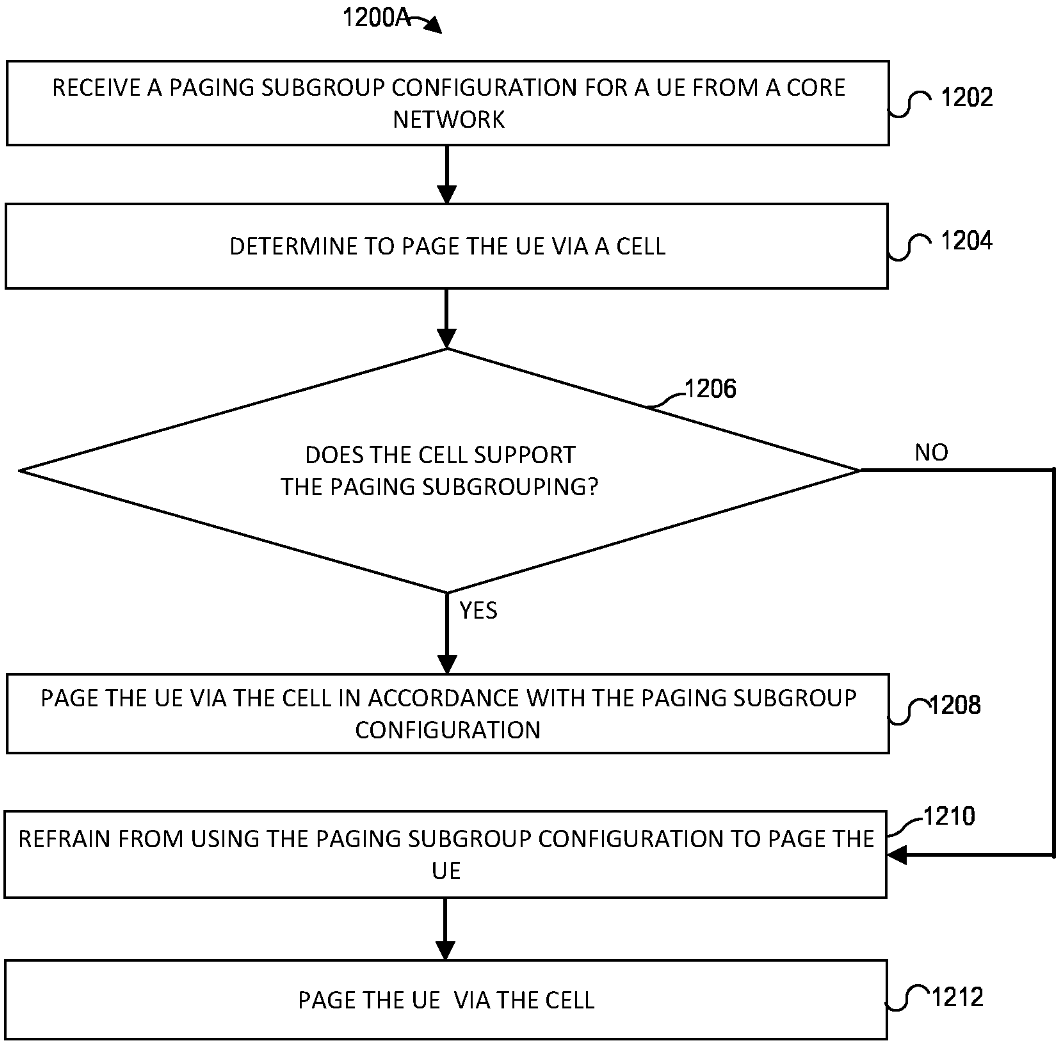
FIG. 12A is a flow diagram of an example method for determining whether to page the UE in accordance with a paging subgroup configuration based on whether a cell supports paging subgrouping, implemented in a RAN.

Referring now to FIG. 12A, a method 1200A can be implemented in a suitable RAN and includes determining whether to page the UE in accordance with a configuration for a paging subgroup based on whether a cell supports paging subgrouping. For clarity, the method 1200A is discussed with specific reference to the UE 102, the CN 110, and the RAN 105.

At block 1202, the RAN 105 receives a configuration for a paging subgroup for a UE 102 from a CN 110 (e.g., events 310, 491, 505, 690, and 790 of FIGS. 3-7D). In some implementations, the CN 110 transmits a downlink NAS message to the UE 102 by way of the RAN 105 at the same time as or after the RAN 105 receives the configuration. Depending on the implementation, the configuration that the CN 110 transmits to the UE 102 may be the same as the configuration the RAN 105 receives. At block 1204, the RAN 105 determines to page the UE 102 via a cell (e.g., events 336/337, 494/496, 596, 694/696, and 794/796 of FIGS. 3-7D). At block 1206, the RAN 105 determines whether the cell supports paging subgrouping. If the cell does support paging subgrouping, the flow continues to block 1208, where the RAN 105 pages the UE 102 via the cell in accordance with the configuration (e.g., events 336, 494/496, 596, 694/696, and 794/796 of FIGS. 3-7D). If the cell does not support paging subgrouping, the flow continues to block 1210, where the RAN 105 refrains from using the configuration to page the UE 102 (e.g., events 337, 494/496, 596, 694/696, and 794/796 of FIGS. 3-7D). At block 1212, the RAN 105 pages the UE 102 via the cell without using the configuration for the paging subgroup (e.g., events 342/344, 494/496, 596, 694/696, and 794/796 of FIGS. 3-7D).

Figure 12B:
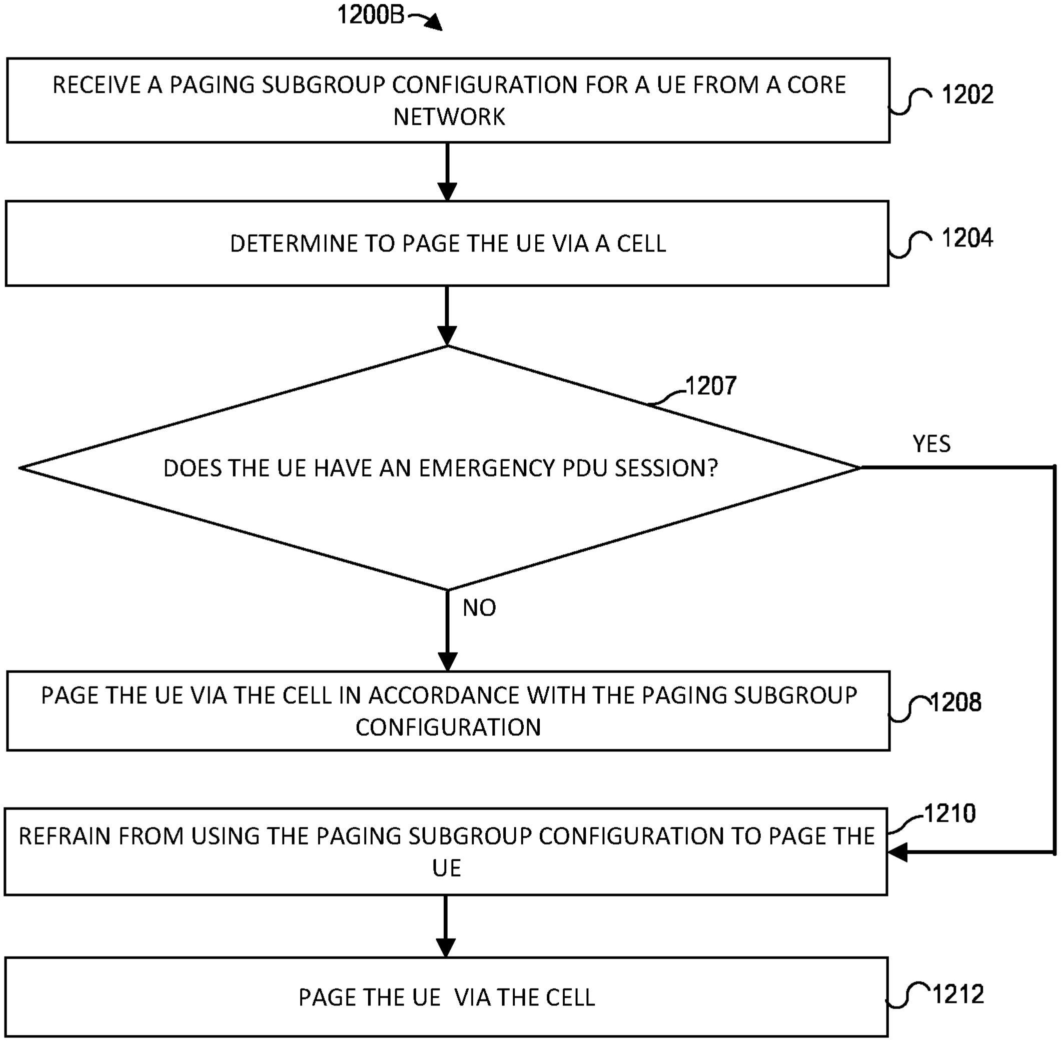
FIG. 12B is a flow diagram of an example method similar to FIG. 12A, but in which the RAN further determines whether the UE has established an emergency PDU session, implemented in a RAN.

Referring next to FIG. 12B, a method 1200B is generally similar to the method 1200A, but the RAN further determines whether the UE has established an emergency PDU session. More specifically, the differences between the methods of FIG. 12A and FIG. 12B are discussed below.

After the RAN 105 determines to page the UE 102 via a cell at block 1204, the flow continues to block 1207, where the RAN 105 determines whether the UE 102 has an emergency PDU session (e.g., event 782 of FIGS. 7A-D). In some implementations, the RAN 105 determines whether the UE 102 has an emergency PDU session as described in FIGS. 7A and 7B above. If the UE 102 does not have an emergency PDU session, the flow continues to block 1208 as described in method 1200A. If the UE 102 does have an emergency PDU session, the flow continues to blocks 1210 and 1212 as described in method 1200A (e.g., events 763/753/756 and 799 of FIGS. 7A-D).

Figure 13A:
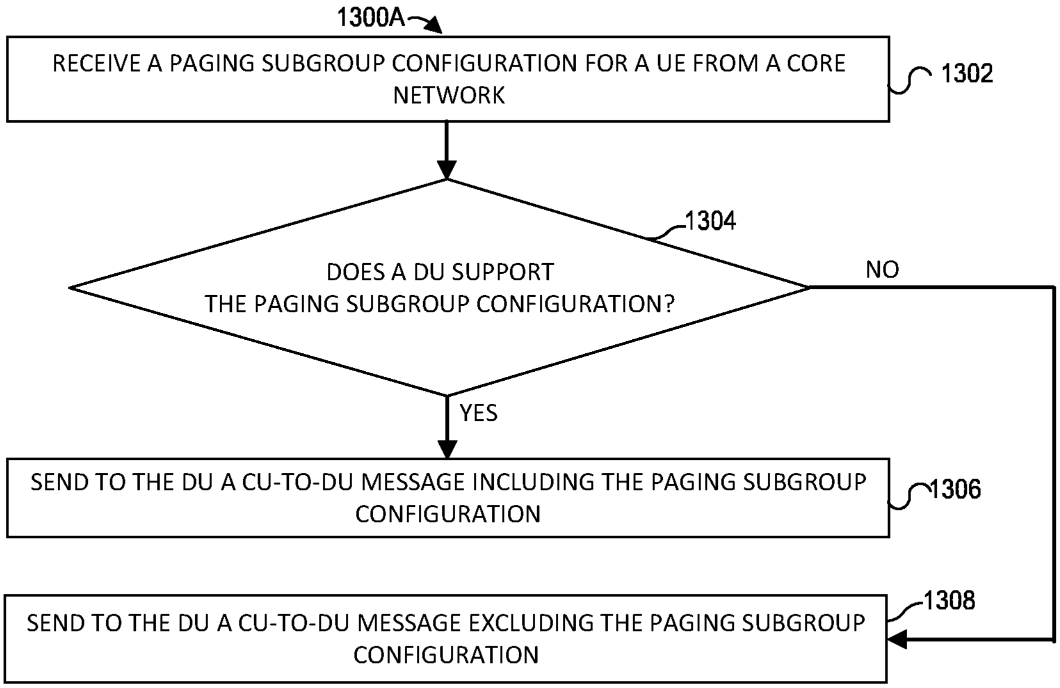
FIG. 13A is a flow diagram of an example method for determining whether to include paging subgroup configuration in a CU-to-DU message based on whether a DU supports the configuration for the paging subgroup, implemented in a CU.

Referring now to FIG. 13A, a method 1300A can be implemented in a suitable CU and includes determining whether to include a configuration for a paging subgroup in a CU-to-DU message based on whether a DU supports the configuration for the paging subgroup. For clarity, the method 1300A is discussed with specific reference to the DU 174, the CU 172, the CN 110, and the UE 102.

At block 1302, the CU 172 receives a configuration for a paging subgroup for a UE 102 from a CN 110 (e.g., events 310, 491, 505/517, 690, 790 of FIGS. 3-7D). At block 1304, the CU 172 determines whether the DU 174 supports the configuration for the paging subgroup. If the DU 174 supports the configuration, the flow continues to block 1306, where the CU 172 transmits a CU-to-DU message to the DU 174 including the configuration. If the DU 174 does not support the configuration, the flow continues to block 1308, where the CU 172 transmits a CU-to-DU message to the DU 174 excluding the configuration.

Figure 13B:
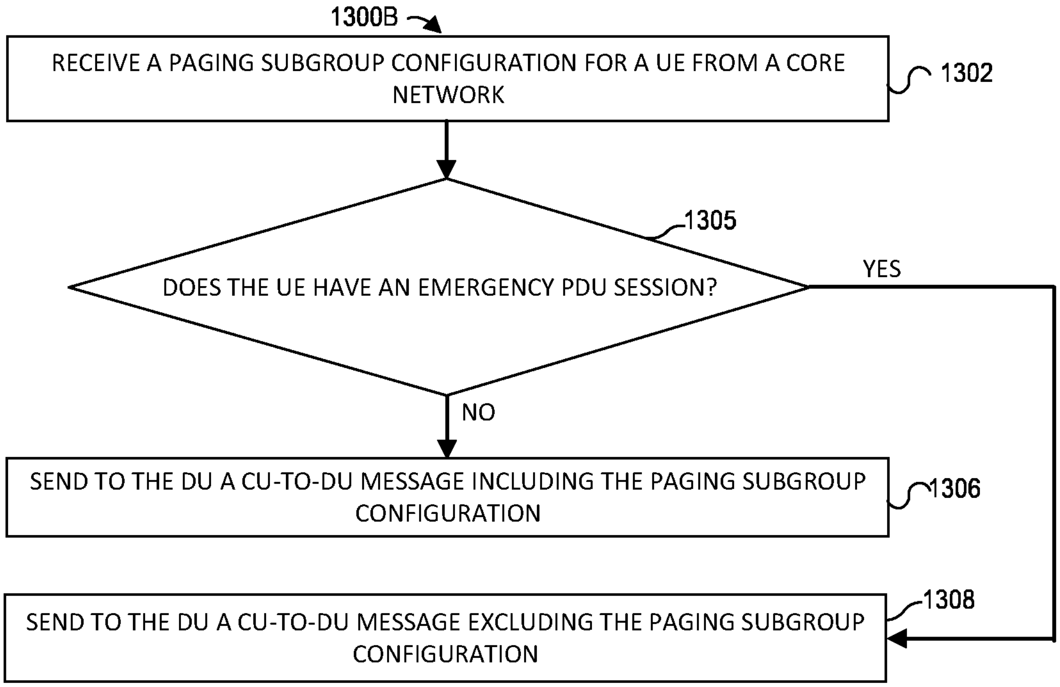
FIG. 13B is a flow diagram of an example method similar to FIG. 13A, but in which the CU further determines based on whether the UE has established an emergency PDU session, implemented in a CU.

Referring next to FIG. 13B, a method 1300B is generally similar to the method 1300A, but the CU further determines based on whether the UE has established an emergency PDU session. More specifically, the differences between the methods of FIGS. 13A and 13B are discussed below.

After receiving a configuration for a paging subgroup at block 1302, the CU 172 determines at block 1305 whether the UE 102 has an emergency PDU session. If the UE 102 does not have an emergency PDU session, the flow continues to block 1306 as described in method 1300A. If the UE 102 does have an emergency PDU session, the flow continues to block 1308 as described in method 1300A. In some implementations, the CU 172 performs block 1304 as described in method 1300A in addition to block 1305 and only transmit the CU-to-DU message including the configuration when the UE 102 does not have an emergency session and the DU 174 supports the configuration.

Figure 13C:
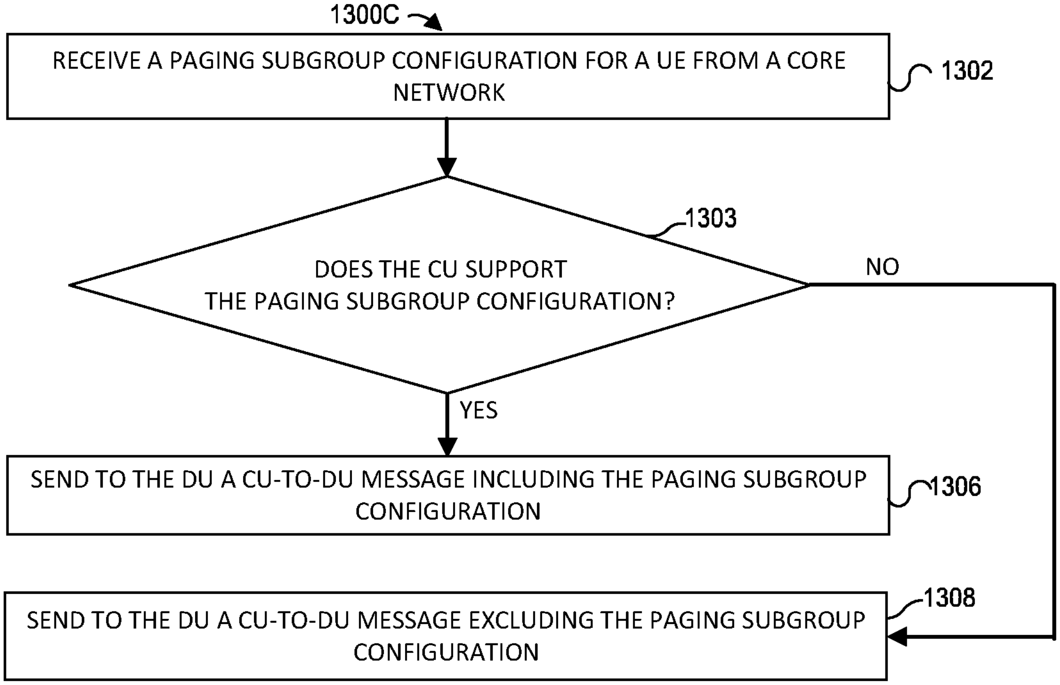
FIG. 13C is a flow diagram of an example method similar to FIG. 13A, but in which the CU further determines whether the CU supports the paging subgroup configuration, implemented in a CU.

Referring next to FIG. 13C, a method 1300C is generally similar to the method 1300A, but the CU further determines based on whether the CU supports the configuration for the paging subgroup. More specifically, the differences between the methods of FIGS. 13A and 13C are discussed below.

After receiving a configuration for a paging subgroup at block 1302, the CU 172 determines at block 1303 whether the CU 172 supports the configuration. If the CU 172 supports the configuration, the flow continues to block 1306 as described in method 1300A. If the CU 172 does not support the configuration, the flow continues to block 1308 as described in method 1300A. In some implementations, if the CU 172 does not support the configuration, the CU 172 transmits the configuration to the CN 110. Depending on the implementation, the CU 172 may determine that it does not recognize the configuration and forwards a message including any unrecognized data to the CN 110 or the CU 172 may determine that it recognizes the configuration but cannot support it and forwards just the configuration to the CN 110. In some implementations, the CU 172 performs either or both of blocks 1304 and 1305 as described in methods 1300A and 1300B in addition to block 1303. Depending on the implementation, the CU 172 may only transmit the CU-to-DU message including the configuration when the UE 102 does not have an emergency session, the DU 174 supports the configuration, and the CU 172 supports the configuration. Depending on the implementation, the CU 172 may also transmit the CU-to-DU message including the configuration when some subset of the conditions in blocks 1303, 1304, and 1305 are met.

Figure 14A:
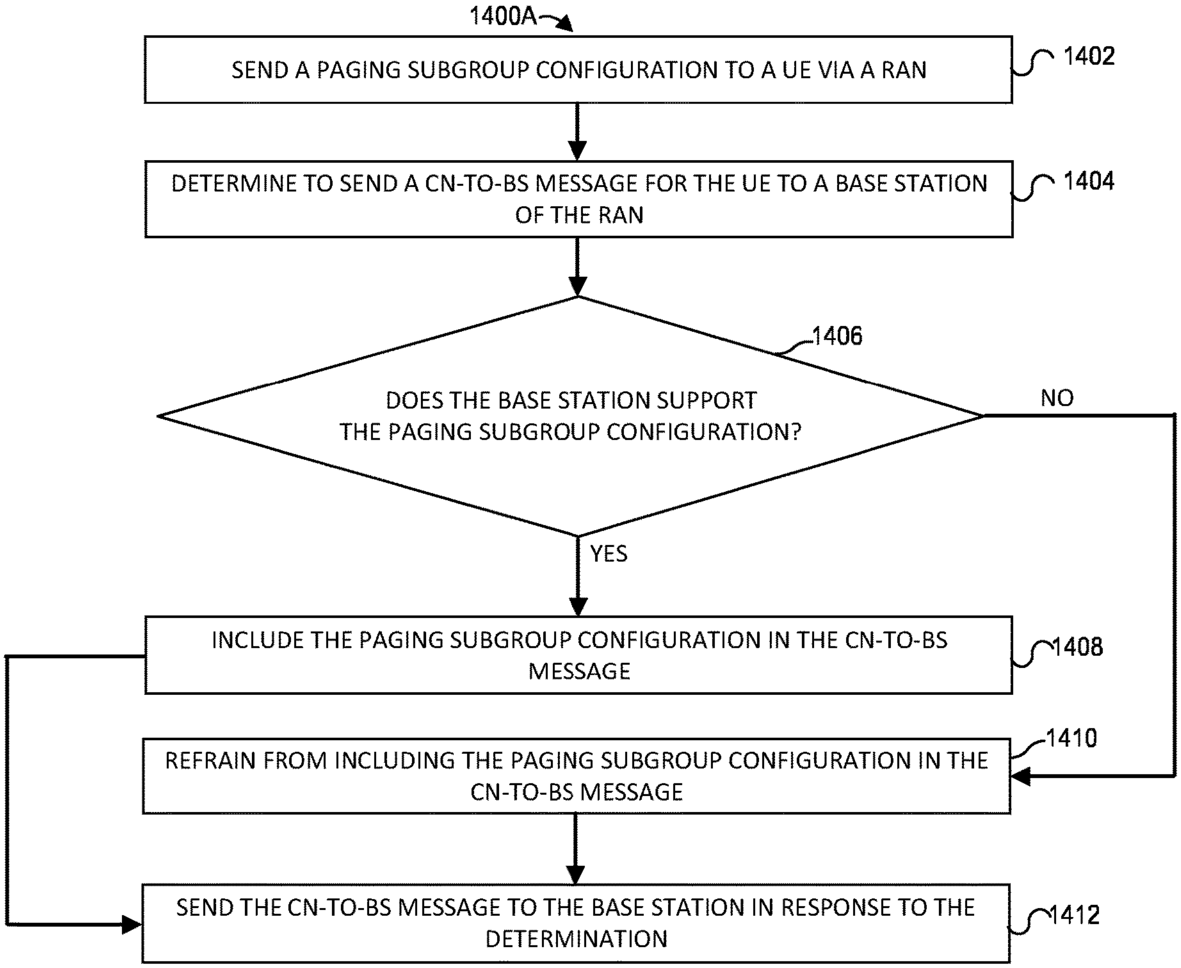
FIG. 14A is a flow diagram of an example method for determining whether to transmit a paging subgroup configuration to a base station based on whether the base station supports paging subgroup, implemented in a CN.

Referring now to FIG. 14A, a method 1400A can be implemented in a suitable CN and includes determining whether to transmit a configuration for a paging subgroup to a base station based on whether the base station supports paging subgrouping. For clarity, the method 1400A is discussed with specific reference to the CN 110, the RAN 105, the base station 104, and the UE 102.

At block 1402, the CN 110 transmits a configuration for a paging subgroup to a UE 102 via a RAN 105 (e.g., events 310/312, 491, 505/517, 690, and 790 of FIGS. 3-7D). At block 1404, the CN 110 determines to transmit a CN-to-BS message for the UE 102 to a base station 104 of the RAN 105. At block 1406, the CN 110 determines whether the base station 104 supports the configuration for the paging subgroup. If the CN 110 determines that the base station 104 supports the configuration, the flow continues to block 1408, where the CN 110 includes the configuration in the CN-to-BS message. If the CN 110 determines that the base station 104 does not support the configuration, the flow continues to block 1410, where the CN refrains from including the configuration in the CN-to-BS message. After either of blocks 1408 or 1410, the flow continues to block 1412, where the CN 110 transmits the CN-to-BS message to the base station 104 (e.g., events 334, 434, 517, 690, and 797/727/729/754/731/734 of FIGS. 3-7D).

Figure 14B:
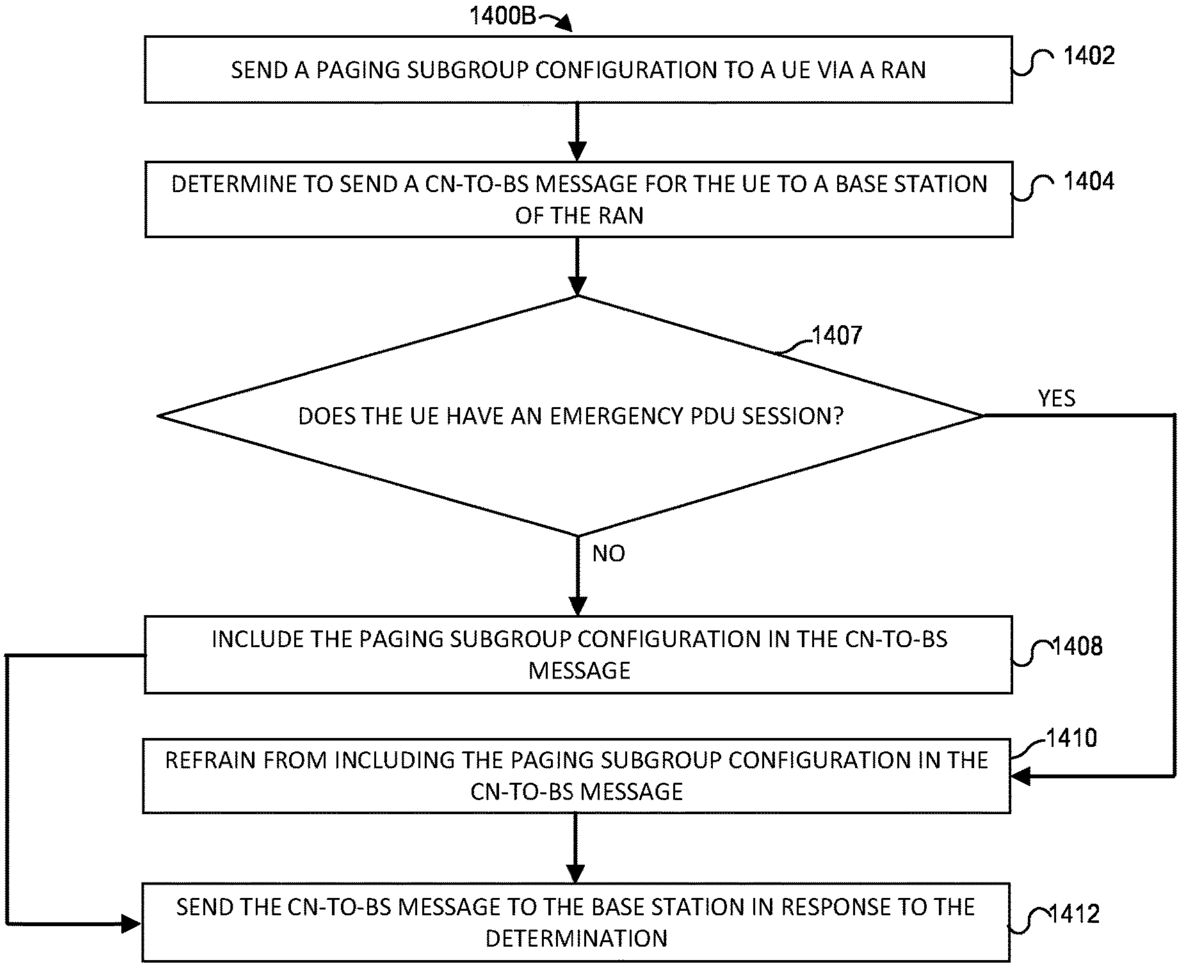
FIG. 14B is a flow diagram of an example method similar to FIG. 14A, but in which the CN further determines whether the UE has established an emergency PDU session, implemented in a CN.

Referring next to FIG. 14B, a method 1400B is generally similar to the method 1400A, but the CN further determines whether the UE has established an emergency PDU session. More specifically, the differences between the methods of FIGS. 14A and 14B are discussed below.

After the CN 110 determines to transmit a CN-to-BS message for the UE 102 to a base station 104 of the RAN 105 at block 1404, the flow proceeds to block 1407, where the CN 110 determines whether the UE 102 has an emergency PDU session (e.g., event 782 of FIGS. 7A-D). If the UE 102 does not have an emergency PDU session, the flow continues to blocks 1408 and 1412 as described in method 1400A (e.g., events 797, 727, 729, 754, 731, or 734 of FIGS. 7A-D). If the UE 102 has an emergency PDU session, the flow continues to blocks 1410 and 1412 as described in method 1400A (e.g., events 797, 727, 729, 754, 731, or 734 of FIGS. 7A-D).

Figure 15:
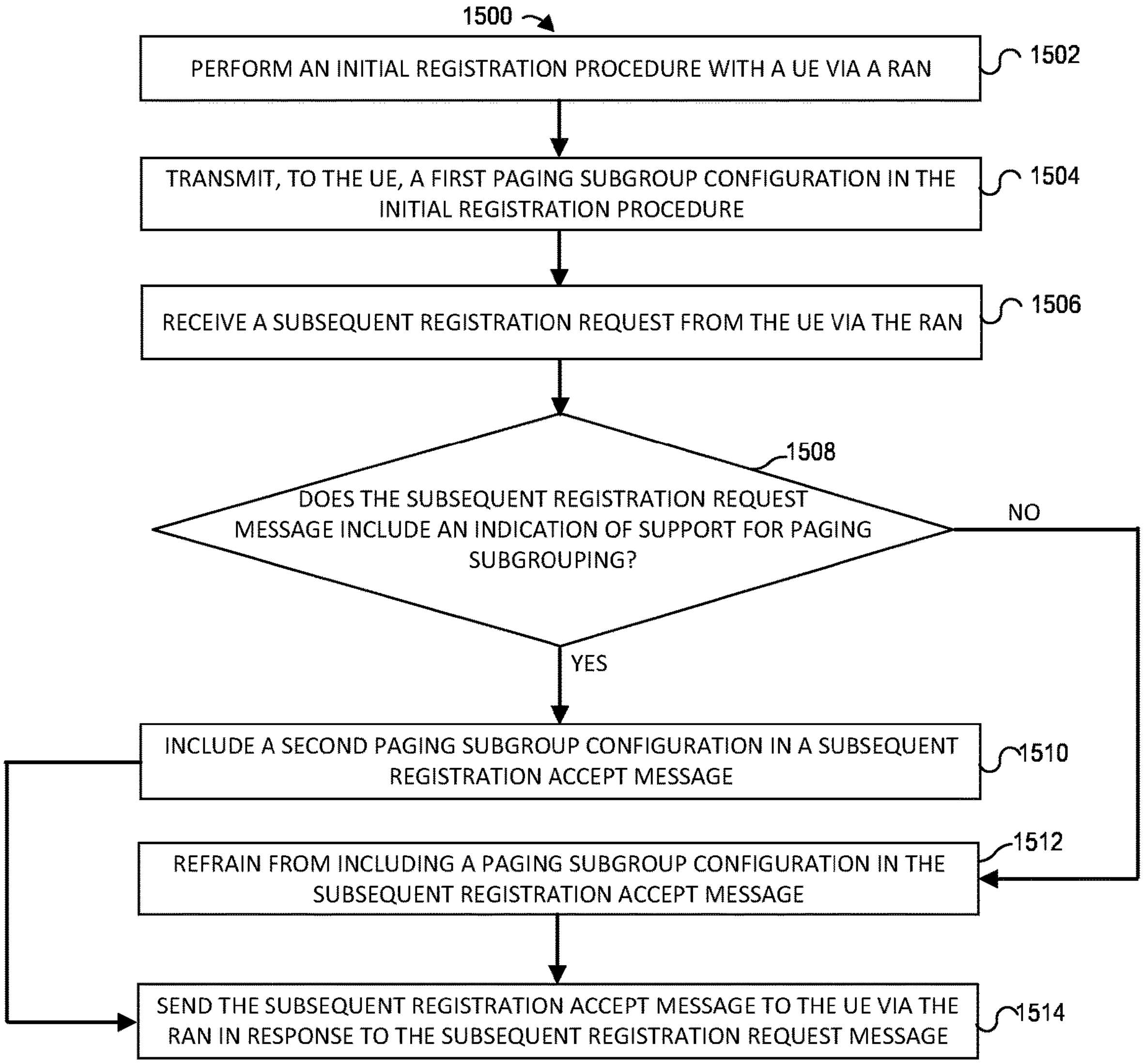
FIG. 15 is a flow diagram of an example method for determining whether to transmit second paging subgroup configuration to a UE via a RAN based on whether a registration request from the UE indicates support for paging subgrouping, implemented in a CN.

Referring now to FIG. 15, a method 1500 can be implemented in a suitable CN and includes determining whether to transmit a second configuration for a paging subgroup to a UE via a RAN based on whether a registration request from the UE indicates support for paging subgrouping. For clarity, the method 1500 is discussed with specific reference to the CN 110, the RAN 105, and the UE 102.

At block 1502, the CN 110 performs an initial registration procedure with a UE 102 via a RAN 105 (e.g., events 392, 491, 505, 690/686, and 790 of FIGS. 3-7D). At block 1504, the CN 110 transmits, to the UE 102, a first configuration for a paging subgroup (e.g., events 310/312, 491, 505, 690, and 790 of FIGS. 3-7D). In some implementations, the CN 110 transmits the configuration during the initial registration procedure. In other implementations, the CN 110 transmits the configuration after the initial registration procedure is complete. At block 1506, the CN 110 receives a subsequent registration request from the UE 102 via the RAN 105 (e.g., events 492 and 692 of FIGS. 4B and 6B). The CN 110 then determines at block 1508 whether the message from the UE 102 including the subsequent registration request further includes an indication of support for paging subgrouping. If the message includes an indication of support, the flow continues to block 1510, where the CN 110 includes a second configuration for the paging subgroup in a subsequent registration accept message (e.g., events 492 and 692 of FIGS. 4B and 6B). If the message does not include an indication of support, the flow continues to block 1512, where the CN 110 refrains from including a configuration in the subsequent registration accept message (e.g., events 492 and 692 of FIGS. 4B and 6B). In some implementations, the CN 110 releases the first paging subgroup configuration if the message does not include an indication of support. After either of blocks 1510 or 1512, the flow continues to block 1514, where the CN 110 transmits the subsequent registration accept message to the UE 102 via the RAN 105 (e.g., events 492 and 692 of FIGS. 4B and 6B). In some implementations, the first configuration for the paging subgroup and the second configuration for the paging subgroup may be the same or different. In further implementations, the UE 102 updates the first configuration with the second configuration.

Figure 16:
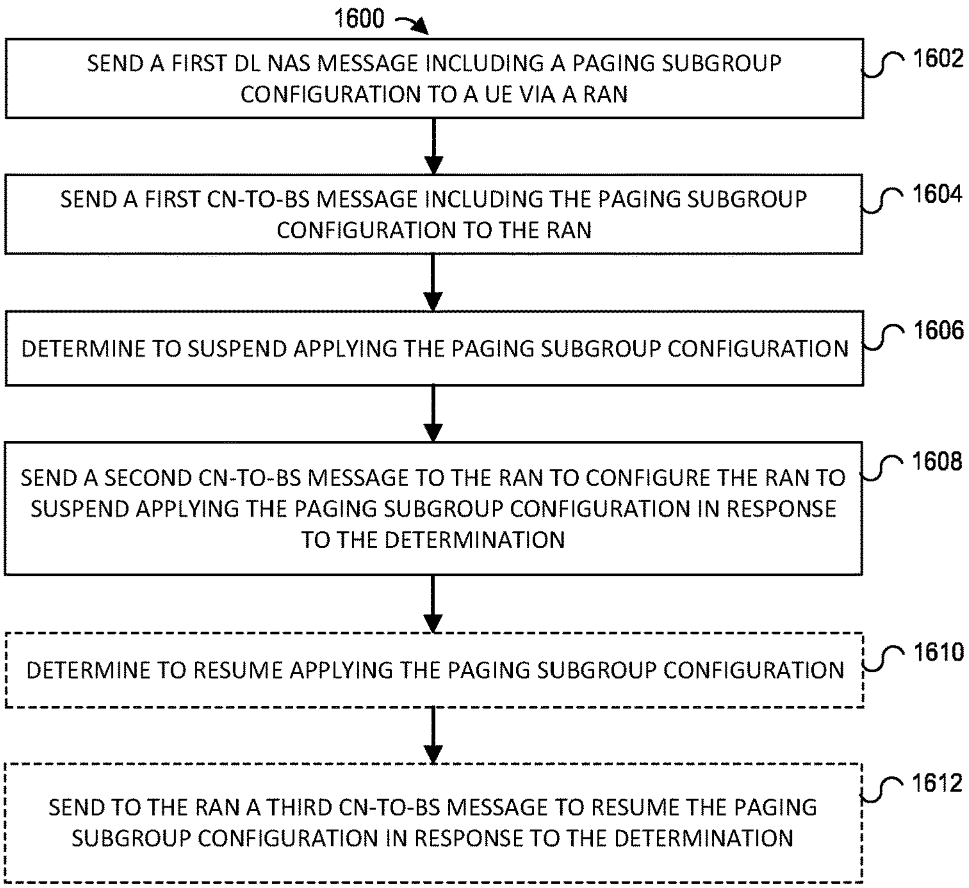
FIG. 16 is a flow diagram of an example method for suspending and subsequently resuming application of a paging subgroup configuration, implemented in a CN.

Referring now to FIG. 16, a method 1600 can be implemented in a suitable CN and includes suspending and subsequently resuming application of a configuration for a paging subgroup. For clarity, the method 1600 is discussed with specific reference to the CN 110, the UE 102, and the RAN 105.

At block 1602, the CN 110 transmits a first downlink NAS message to a UE 102 via a RAN 105, the message including a configuration for a paging subgroup (e.g., events 310/312, 491, 505/517, 690, and 790 of FIGS. 3-7D). At block 1604, the CN 110 then transmits a first CN-to-BS message to the RAN 105, the CN-to-BS message including the configuration (e.g., events 334, 434, 517, 690, and 797/727/729/754/731/734 of FIGS. 3-7D). At block 1606, the CN 110 determines to suspend application of the configuration for the paging subgroup. At block 1608, the CN 110 transmits a second CN-to-BS message to the RAN 105 to configure the RAN 105 to suspend application of the configuration (e.g., events 727/729 of FIGS. 7A-D). In some implementations, the CN 110 determines to configure the RAN to suspend application of the configuration in response to an event known between the UE 102 and the CN 110. In such implementations, the CN 110 may not transmit a downlink NAS message to configure the UE to suspend application of the configuration. The UE 102 may instead suspend application of the configuration and monitor paging without using the configuration. In some implementations, the event known to the UE 102 and the CN 110 is the UE 102 establishing an emergency PDU session with the CN 110.

At block 1610, the CN 110 may determine to resume application of the configuration for the paging subgroup. At block 1612, the CN 110 may transmit a third CN-to-BS message to resume application of the configuration (e.g., events 729, 731, 734, or 754 of FIGS. 7A-D). In some implementations, the CN 110 transmits the third CN-to-BS message after an event known to the UE 102 and the CN 110 has ended.

Figure 17:
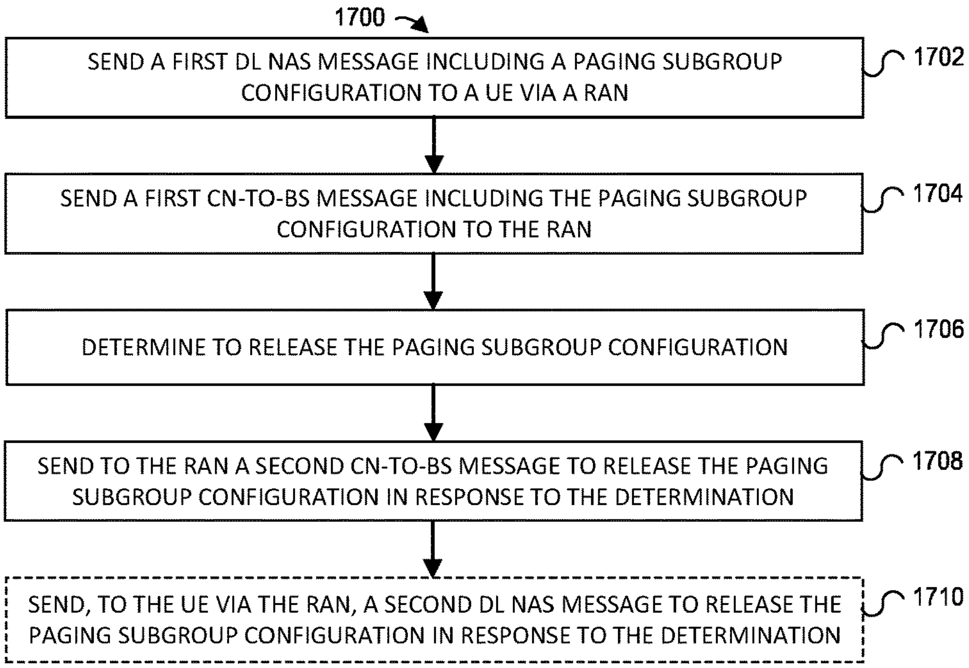
FIG. 17 is a flow diagram of an example method for releasing a paging subgroup configuration, implemented in a CN.

Referring now to FIG. 17, a method 1700 can be implemented in a suitable CN and includes determining to release, and subsequently transmitting to a UE a command to release, a configuration for a paging subgroup. For clarity, the method 1700 is discussed with specific reference to the CN 110, the UE 102, and the RAN 105.

At block 1702, the CN 110 transmits a first downlink NAS message to a UE 102 via a RAN 105, the message including a configuration for a paging subgroup (e.g., events 310/312, 491, 505/517, 690, and 790 of FIGS. 3-7D). At block 1704, the CN 110 transmits a first CN-to-BS message including the configuration to the RAN 105 (e.g., events 334, 434, 517, 690, and 797/727/729/754/731/734 of FIGS. 3-7D). At block 1706, the CN 110 determines to release the configuration. In some implementations, the CN 110 determines to release the configuration in response to an event known between the UE 102 and the CN 110. Depending on the implementation, the event may be the UE 102 establishing an emergency PDU session with the CN 110.

At block 1708, the CN 110 transmits a second CN-to-BS message to the RAN 105 to release the configuration for the paging subgroup. At block 1710, the CN 110 may transmit a second downlink NAS message to the UE 102 via the RAN 105 to release the configuration (e.g., events 727/729 of FIGS. 7A-D). In such implementations, the UE 102 releases the configuration in response to an event as described above. In some implementations, the CN 110 refrains from transmitting a downlink NAS message to release the configuration for the paging subgroup. In such implementations, the UE 102 refrains from using the configuration in response to an event as described above.

Figure 18:
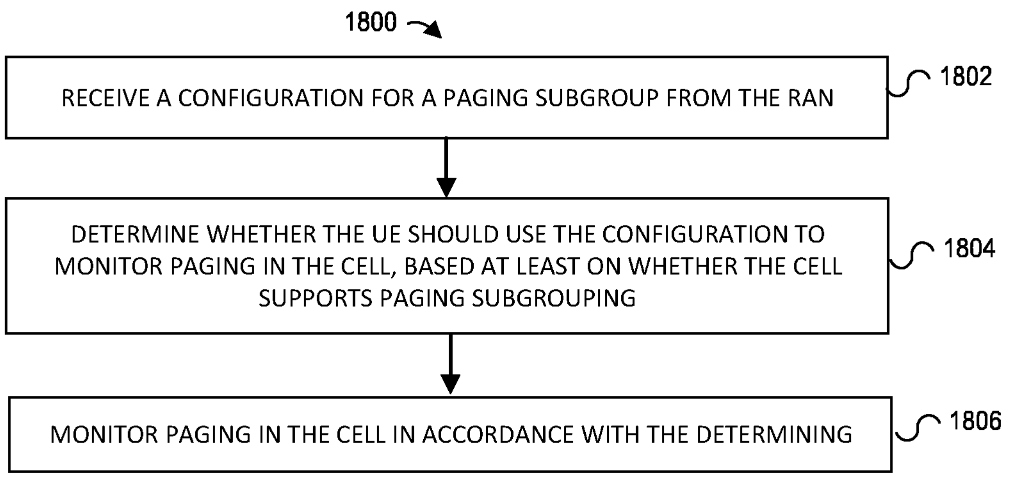
FIG. 18 is a flow diagram of an example method for managing paging subgrouping, which can be implemented in a UE.

Referring now to FIG. 18, a method 1800 is a method in a UE 102 or another suitable UE for managing paging subgrouping.

At block 1802, the UE 102 receives a configuration for a paging subgroup from the RAN 105 (e.g., events 312, 491, 505, 690, 790, 802, 1004, 1102, 1402, 1504, 1602, and 1702 of FIGS. 3-8, 10-11, and 14-17). At block 1804, the UE 102 determines whether the UE 102 should use the configuration to monitor paging in a cell, based at least on whether the cell supports paging subgrouping (e.g., events 328/330/332, 428/430/432, 528/530/532, 628/630/632, 794, 804, and 907 of FIGS. 3-8 and 9B). At block 1806, the UE 102 monitors paging in the cell in accordance with the determining (e.g., events 330/332, 430/432, 530/532, 630/632, 794, and 806/808 of FIGS. 3-8).

Figure 19:
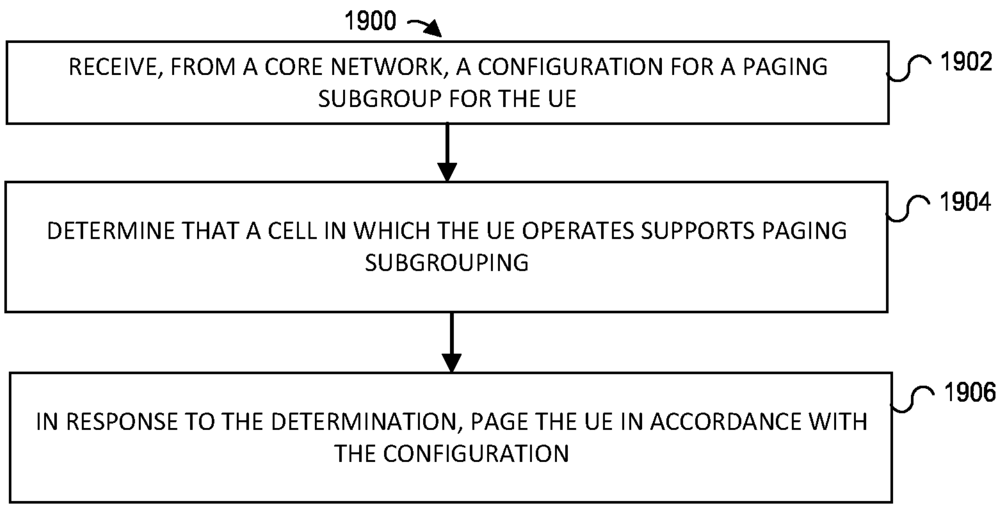
FIG. 19 is a flow diagram of an example method for managing paging subgrouping, which can be implemented in a RAN.

Referring now to FIG. 19, a method 1900 is a method in a RAN 105 or another suitable RAN for managing paging subgrouping.

At block 1902, the RAN 105 receives, from a core network, a configuration for a paging subgroup for a UE 102 (e.g., events 310, 491, 505/517, 690, 790, 802, 1102, 1202, 1302, 1402, 1504, 1602, and 1702 of FIGS. 3-8 and 11-17). At block 1904, the RAN 105 determines that a cell in which the UE 102 operates supports paging subgrouping (e.g., events 328, 428, 528, 628, and 1206 of FIGS. 3-6C and 12A). At block 1906, the RAN 105 pages the UE 102 in accordance with the configuration and in response to determining that a cell in which the UE 102 operates supports paging subgrouping (e.g., events 336/338/340, 496, 596, 696, 798, and 1208 of FIGS. 3-7D and 12A).

Figure 20:
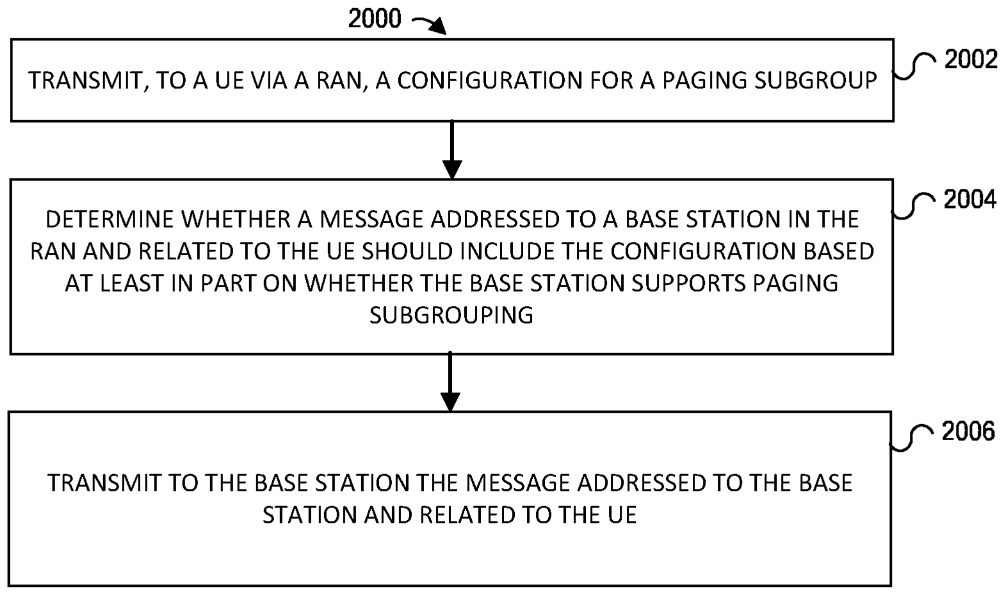
FIG. 20 is a flow diagram of an example method for managing paging subgrouping, which can be implemented in a CN.

Referring now to FIG. 20, a method 2000 is a method in a CN 110 or another suitable CN for managing paging subgrouping.

At block 2002, the CN 110 transmits, to a UE 102 via a RAN 105, a configuration for a paging subgroup (e.g., events 310/312, 491, 505/517, 690, 790, 802, 1102, 1202, 1302, 1402, 1504, 1602, and 1702 of FIGS. 3-8 and 11-17). At block 2004, the CN 110 then determines whether a message addressed to a base station 104 in the RAN 105 and related to the UE 102 should include the configuration based at least in part on whether the base station 104 supports paging subgrouping (e.g., event 1406 of FIG. 14A). At block 2006, the CN 110 then transmits, to the base station 104, the message addressed to the base station 104 and related to the UE 102 (e.g., event 1412 of FIG. 14A).

The following list of examples reflects a variety of the embodiments explicitly contemplated by the present disclosure:

Example 1. A method for managing paging subgrouping implemented in a user equipment (UE) operating in a cell of a radio access network (RAN), the method comprising: receiving, by processing hardware from the RAN, a configuration for a paging subgroup; determining, by the processing hardware, whether the UE should use the configuration to monitor paging in the cell, based at least on whether the cell supports paging subgrouping; and monitoring, by the processing hardware, paging in the cell in accordance with the determining.

Example 2. The method of example 1, further comprising: receiving, by the processing hardware from the RAN, system information including an indication that the cell supports paging subgrouping.

Example 3. The method of example 1, further comprising: receiving, by the processing hardware from the RAN, a message associated with a protocol for controlling radio resources, the message (i) indicating that the UE should transition to an idle or inactive state associated with the protocol and (ii) including a list of cells that support paging subgrouping.

Example 4. The method of example 1, further comprising: determining, by the processing hardware, that the cell supports paging subgrouping in response to receiving the configuration.

Example 5. The method of example 4, including receiving the configuration in a registration accept message.

Example 6. The method of any of examples 1-5, further comprising: subsequent to determining that the cell supports paging subgrouping, selecting or reselecting a new cell; determining that the new cell supports paging subgrouping in response to determining that the cell and the new cell belong to a same RAN notification area.

Example 7. The method of any of examples 1-5, further comprising: subsequent to determining that the cell supports paging subgrouping, selecting or reselecting a new cell; receiving, by the processing hardware in the new cell, a new configuration for a paging subgroup.

Example 8. The method of any of examples 1-7, further comprising: transmitting, by the processing hardware to the RAN, a request for the configuration to the cell; wherein receiving the configuration is in response to the request.

Example 9. The method of example 8, further comprising, subsequent to the monitoring: selecting or reselecting a new cell; transmitting, by the processing hardware to the RAN, a request for configuration for a paging subgroup, to the new cell.

Example 10. The method of any of examples 1-9, further comprising: transmitting, by the processing hardware to the RAN, an indication that the UE supports paging subgrouping.

Example 11. The method of example 10, wherein transmitting the indication includes transmitting the indication in an uplink non-access stratum message.

Example 12. The method of example 11, wherein the non-access stratum message is a registration request.

Example 13. The method of example 10, wherein transmitting the indication includes transmitting the indication in an uplink message associated with a protocol for controlling radio resources.

Example 14. The method of example 13, wherein the uplink message is a capability information message.

Example 15. The method of any of examples 10-14, including transmitting the indication prior to transitioning from a connected state associated with a protocol for controlling radio resources to an idle or inactive state associated with the protocol.

Example 16. The method of any of examples 10-14, including transmitting the indication in response to selecting or reselecting the cell.

Example 17. The method of any of examples 10-16, including transmitting the indication in response to determining that the UE is configured to support paging subgrouping for a public land mobile network (PLMN) with which the cell is associated.

Example 18. The method of any of examples 10-16, including transmitting the indication in response to determining that the cell supports paging subgrouping.

Example 19. The method of any of the preceding examples, wherein the monitoring comprises: monitoring paging in the cell in accordance with the configuration in an idle state associated with a protocol for controlling radio resources.

Example 20. The method of any of the preceding examples, wherein the monitoring comprises: monitoring paging in the cell in accordance with the configuration in an inactive state associated with a protocol for controlling radio resources.

Example 21. The method of example 1, further comprising: determining, by the processing hardware, that the UE should refrain from using the configuration to monitor paging in response to determining that the UE has established an emergency PDU session.

Example 22. The method of example 21, further comprising: determining, by the processing hardware, that the UE should use the configuration to monitor paging in response to determining that the emergency PDU session is released.

Example 23. The method of example 1, further comprising: releasing, by the processing hardware, the configuration in response to determining that the UE has established an emergency PDU session.

Example 24. The method of any of the preceding examples, further comprising: receiving, by the processing hardware and subsequent to the monitoring, a second configuration for the paging subgroup; and updating the configuration for the paging subgroup using the second configuration for the paging subgroup.

Example 25. A user equipment (UE) comprising processing hardware and configured to implement a method according to any of examples 1-24.

Example 26. A method for managing paging subgrouping for a UE, the method implemented in a radio access network (RAN) and comprising: receiving, by processing hardware from a core network (CN), a configuration for a paging subgroup, for the UE; determining, by the processing hardware, that a cell in which the UE operates supports paging subgrouping; and in response to the determining, paging, by the processing hardware, the UE in accordance with the configuration.

Example 27. The method of example 26, wherein the determining further comprises: determining that the UE is not currently engaged in an emergency PDU session.

Example 28. The method of example 26, including: receiving the configuration at a centralized unit (CU) of a distributed base station; and transmitting, by the processing hardware, the configuration to a distributed unit (DU) of the distributed base station.

Example 29. The method of example 28, including: transmitting the configuration to the DU in response to determining that the UE is not currently engaged in an emergency PDU session.

Example 30. The method of either of examples 28 or 29, including: transmitting the configuration to the DU in response to determining that the CU supports paging subgrouping.

Example 31. The method of any of examples 26-30, further comprising: transmitting, by the processing hardware to the UE, system information including an indication that the cell supports paging subgrouping.

Example 32. The method of any of examples 26-30, further comprising: transmitting, by the processing hardware to the UE, a message associated with a protocol for controlling radio resources, the message (i) indicating that the UE should transition to an idle or inactive state associated with a protocol and (ii) including a list of cells that support paging subgrouping.

Example 33. The method of any of examples 26-32, further comprising: receiving, by the processing hardware from the UE, a request for the configuration for the cell; transmitting, by the processing hardware to the UE, the configuration in response to the request.

Example 34. A radio access network (RAN) comprising one or more network nodes and configured to implement a method according to any of examples 26-33.

Example 35. A method for managing paging subgrouping for a UE, the method implemented in a core network (CN) and comprising: transmitting, by processing hardware to a user equipment (UE) via a radio access network (RAN), a configuration for a paging subgroup; determining, by the processing hardware, whether a message addressed to a base station in the RAN and related to the UE should include the configuration based at least in part on whether the base station supports paging subgrouping; and transmitting, by the processing hardware to the base station, the message addressed to the base station and related to the UE.

Example 36. The method of example 35, wherein the determining includes: refraining from including the configuration in the message in response to determining that the base station does not support paging subgrouping.

Example 37. The method of example 35, wherein the determining includes: including the configuration in the message in response to determining that the base station supports paging subgrouping.

Example 38. The method of example 35, wherein determining whether the message should include the configuration is further based on whether the UE is currently engaged in an emergency PDU session.

Example 39. The method of example 35, wherein the message is a CN-to-BS message.

Example 40. A core network (CN) comprising processing hardware and configured to implement a method according to any of examples 35-39.

The following description may be applied to the description above.

In some implementations, “message” is used and can be replaced by “information element (IE)”. In some implementations, “IE” is used and can be replaced by “field”. In some implementations, “configuration” can be replaced by “configurations” or the configuration parameters. In some implementations, “early data communication” can be replaced by “small data communication” and “early data transmission” can be replaced by “small data transmission”.

If a cell is operated in a Time Division Duplex (TDD) mode or on a TDD carrier frequency, a DL BWP and a UL BWP (i.e., associated with the DL BWP) of the cell can be the same BWP. If a cell is operated in a Frequency Division Duplex (FDD) mode or on a pair of FDD carrier frequencies (i.e., UL carrier frequency and DL carrier frequency), a DL BWP and a UL BWP (i.e., associated with the DL BWP) of the cell are different BWPs. In this case, the DL BWP is a BWP of the DL carrier frequency and the UL BWP is a BWP of the UL carrier frequency. In some implementations, one of the UL BWPs of a cell can partially overlap the other or has no overlap with the other. In other implementations, one of the UL BWPs can be entirely within the other. In some implementations, one of the DL BWPs of a cell can partially overlap the other or has no overlap with the other. In other implementations, one of the DL BWPs can be entirely within the other.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may be software modules (e.g., code, or machine-readable instructions stored on non-transitory machine-readable media) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software), may be driven by cost and time considerations.

When implemented in software, the techniques can be provided as part of the operating system, a library used by multiple applications, a particular software application, etc. The software can be executed by one or more general-purpose processors or one or more special-purpose processors.

What is claimed is:

1. A method for managing paging subgrouping implemented in a user equipment (UE) operating in a cell of a radio access network (RAN), the method comprising:
- transmitting, from the UE to a core network (CN), a support message that indicates support of paging subgrouping;
- receiving, at the UE from the CN, a configuration for a paging subgroup;
- receiving, at the UE from the RAN, a configuration parameter indicating resources for the UE to receive a paging early indication (PEI) signal corresponding to the paging subgroup; and
- receiving, at the UE, the PEI signal based at least on the configuration parameter.

2. The method of claim 1, further comprising:
- receiving, at the UE from the CN, a message associated with a protocol for controlling radio resources, the message (i) indicating that the UE should transition to an idle or inactive state associated with the protocol and (ii) including a list of cells that support paging subgrouping.

3. The method of claim 1, wherein receiving the configuration for the paging subgroup includes receiving the configuration for the paging subgroup in a registration accept message.

4. The method of claim 1, further comprising:
- subsequent to receiving the configuration, selecting or reselecting a new cell;
- determining that the new cell supports paging subgrouping in response to determining that the cell and the new cell belong to a same RAN notification area.

5. The method of claim 1, wherein receiving the PEI signal includes:
- receiving, at the UE from the RAN, a paging indication; and
- wherein receiving the PEI signal is further based on the paging indication.

6. The method of claim 1, wherein transmitting the support message includes transmitting the support message in an uplink non-access stratum message.

7. The method of claim 1, including transmitting the support message prior to transitioning from a connected state associated with a protocol for controlling radio resources to an idle or inactive state associated with the protocol.

8. The method of claim 1, including transmitting the support message in response to at least one of: (i) determining that the UE is configured to support paging subgrouping for a public land mobile network (PLMN) with which the cell is associated, (ii) determining that the cell supports paging subgrouping, or (iii) selecting or reselecting the cell.

9. The method of claim 1, wherein receiving the PEI signal comprises:
- receiving the PEI signal in accordance with the configuration parameter in at least one of: (i) an idle state associated with a protocol for controlling radio resources or (ii) an inactive state associated with a protocol for controlling radio resources.

10. The method of claim 1, further comprising:
- determining, at the UE, to stop using the configuration parameter to monitor paging in response to determining that the UE has established an emergency PDU session.

11. A method for managing paging subgrouping for a user equipment (UE), the method implemented in a core network (CN) and comprising:
- receiving, at the CN, a UE support message that indicates support of paging subgrouping;
- transmitting, from the CN to the UE, a configuration for a paging subgroup;
- transmitting, from the CN to a radio access network (RAN, a configuration parameter indicating resources for the UE to receive a paging early indication (PEI) signal corresponding to the paging subgroup; and
- transmitting, by the CN to the RAN, a message to be paged to the UE according to the configuration for the paging subgroup.

12. The method of claim 11, wherein determining whether the message should include the configuration for the paging subgroup is further based on whether the UE does not have an emergency PDU session.

13. The method of claim 11, further comprising:
- determining whether a message addressed to a base station in a RAN associated with the CN and related to the UE should include the configuration for the paging subgroup based at least in part on whether the base station supports paging subgrouping.

14. An apparatus, operating as a user equipment (UE) in a cell of a radio access network (RAN) and configured to manage paging subgrouping, the apparatus comprising:

a transceiver; and processing hardware configured to:

transmit, to a core network (CN), a support message that indicates support of paging subgrouping;

receive, from the CN, a configuration for a paging subgroup;

receive, from the RAN, a configuration parameter indicating resources for the UE to receive a paging early indication (PEI) signal corresponding to the paging subgroup; and receive the PEI signal based at least on the configuration for parameter.

15. The apparatus of claim 14, wherein the processing hardware is further configured to:

receive, from the CN, a message associated with a protocol for controlling radio resources, the message (i) indicating that the UE should transition to an idle or inactive state associated with the protocol and (ii) including a list of cells that support paging subgrouping.

16. The apparatus of claim 14, wherein receiving the configuration for the paging subgroup includes receiving the configuration for the paging subgroup in a registration accept message.

17. The apparatus of claim 14, wherein the processing hardware is further configured to:

subsequent to receiving the configuration, select or reselect a new cell;

determine that the new cell supports paging subgrouping in response to determining that the cell and the new cell belong to a same RAN notification area.

18. The apparatus of claim 14, wherein the processing hardware configured to receive the PEI signal is further configured to:

receive, from the RAN, a paging indication; and wherein receiving the PEI signal is further based on the paging indication.

19. The apparatus of claim 14, wherein transmitting the support message includes transmitting the support message in an uplink non-access stratum message.

* * * * *